US009588961B2

(12) United States Patent
Bruno et al.

(10) Patent No.: US 9,588,961 B2
(45) Date of Patent: Mar. 7, 2017

(54) NATURAL LANGUAGE PROCESSING UTILIZING PROPAGATION OF KNOWLEDGE THROUGH LOGICAL PARSE TREE STRUCTURES

(71) Applicant: International Business Machines Corporation, Armonk, NY (US)

(72) Inventors: Nicholas V. Bruno, Cary, NC (US); Robert L. Nielsen, Chapel Hill, NC (US); Saeid Sakhitab, Rochester, MN (US); Jared M. D. Smythe, Cary, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/506,810

(22) Filed: Oct. 6, 2014

(65) Prior Publication Data

US 2016/0098387 A1 Apr. 7, 2016

(51) Int. Cl.
*G06F 17/20* (2006.01)
*G06F 17/27* (2006.01)

(52) U.S. Cl.
CPC ................ *G06F 17/2785* (2013.01)

(58) Field of Classification Search
CPC .. G06F 17/2247; G06F 17/227; G06F 17/271; G06F 17/2715; G06F 17/218;
(Continued)

(56) References Cited

U.S. PATENT DOCUMENTS 6,741,959 B1 5/2004 Kaiser
6,871,174 B1 3/2005 Dolan et al.
(Continued)

FOREIGN PATENT DOCUMENTS

EP 0907923 A1 4/1999
EP 2082334 A2 7/2009
WO WO2012/122198 A1 9/2012

OTHER PUBLICATIONS

List of IBM Patents or Patent Applications Treated as Related (Appendix P), 2 pages.
(Continued)

*Primary Examiner* — Marivelisse Santiago Cordero
*Assistant Examiner* — Stephen Brinich
(74) *Attorney, Agent, or Firm* — Stephen J. Walder, Jr.; Diana R. Berhardt

(57) ABSTRACT

Mechanisms are provided for processing logical relationships in natural language content. A logical parse of a first parse of a natural language content is generated by identifying latent logical operators within the first parse indicative of logical relationships between elements of the natural language content. The logical parse comprises nodes and edges linking nodes. At least one knowledge value is associated with each node in the logical parse. The at least one knowledge value of at least a subset of the nodes in the logical parse is propagated to one or more other nodes in the logical parse based on propagation rules. A reasoning operation is performed on the logical parse to generate a knowledge output indicative of knowledge associated with one or more of the logical relationships between elements of the natural language content.

21 Claims, 28 Drawing Sheets

(58) Field of Classification Search
CPC .. G06F 17/2282; G06F 17/24; G06F 17/5022; G06F 17/504; G06F 17/2881; G06F 17/272; G06F 17/505
USPC ........ 704/1–10, 257, 245; 715/234–235, 205
See application file for complete search history.

(56) References Cited

U.S. PATENT DOCUMENTS

| | | | |
|---|---|---|---|
| 7,013,264 | B2 | 3/2006 | Dolan et al. |
| 7,027,974 | B1 | 4/2006 | Busch et al. |
| 7,373,597 | B2 | 5/2008 | Hagerty et al. |
| 7,383,169 | B1 | 6/2008 | Vanderwende et al. |
| 7,409,336 | B2 | 8/2008 | Pak et al. |
| 8,065,307 | B2 | 11/2011 | Haslam et al. |
| 8,155,949 | B1 | 4/2012 | Rubin |
| 8,504,355 | B2 | 8/2013 | Ylonen |
| 8,527,443 | B2 | 9/2013 | B'Far et al. |
| 8,639,493 | B2 | 1/2014 | Haug |
| 8,639,497 | B2 | 1/2014 | Eggebraaten et al. |
| 8,666,922 | B2 | 3/2014 | Hohimer et al. |
| 2002/0023113 | A1* | 2/2002 | Hsing ............... G06F 17/30578 715/234 |
| 2002/0032564 | A1 | 3/2002 | Ehsani et al. |
| 2004/0122661 | A1 | 6/2004 | Hawkinson et al. |
| 2005/0065777 | A1 | 3/2005 | Dolan et al. |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2012/0253793 | A1 | 10/2012 | Ghannam et al. |
| 2012/0301864 | A1 | 11/2012 | Bagchi et al. |
| 2013/0007055 | A1 | 1/2013 | Brown et al. |
| 2013/0013547 | A1 | 1/2013 | Brown et al. |
| 2013/0018652 | A1 | 1/2013 | Ferrucci et al. |
| 2013/0066886 | A1 | 3/2013 | Bagchi et al. |
| 2013/0325787 | A1 | 12/2013 | Gerken et al. |
| 2014/0297571 | A1 | 10/2014 | Beamon et al. |
| 2014/0317546 | A1 | 10/2014 | Jacobson et al. |
| 2015/0379013 | A1 | 12/2015 | Purcell et al. |

OTHER PUBLICATIONS

"Bayesian network", Wikipedia, http://en.wikipedia.org/wiki/Bayesian_network, retrieved from the Internet on Jun. 4, 2014, 21 pages.

"Boolean Algebra", Wikipedia, http://en.wikipedia.org/wiki/Boolean_algebra, retrieved from the Internet on Jun. 4, 2014, 25 pages.

"C&C Tool Parser", http://svn.ask.it.usyd.edu.au/trac/candc/wiki/Demo, downloaded from the Internet on Jun. 1, 2014, 1 page.

"Fuzzy logic", Wikipedia, http://en.wikipedia.org/wiki/Fuzzy_logic, retrieved from the Internet on Jun. 4, 2014, 14 pages.

"Three-valued logic", Wikipedia, http://en.wikipedia.org/wiki/Three-valued_logic, retrieved from the Internet on Jun. 4, 2014, 7 pages.

Bellenger, Amandine et al., "An Evidential Approach for Modeling and Reasoning on Uncertainty in Semantic Applications", URSW, vol. 778 of CEUR Workshop Proceedings, CEUR-WS.org, 2011, pp. 27-38.

Dean, Jeffrey et al., "MapReduce: Simplified Data Processing on Large Clusters", OSDI'04: Sixth Symposium on Operating System Design and Implementation, San Francisco, CA, Dec. 2004, pp. 1-13.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages. Dec. 12, 2012.

Horvath, Tamas et al., "A Logic-Based Approach to Relation Extraction from Texts", Presented at the 19th International Conference on Inductive Logic Programming (ILP '09), Jul. 2-4, 2009, 6 pages.

Rubin, Stuart H. et al., "Field-Effect Natural Language Semantic Mapping", Proceedings of the 2003 IEEE International Conference on Systems, Man, and Cybernetics, Washington, D.C., Oct. 5-8, 2003, pp. 1-5.

Yuan, Michael J. et al., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

List of IBM Patents or Patent Applications Treated as Related (Appendix P), Aug. 26, 2015, 2 pages.

"Evidence-based medicine", Wikipedia, https://en.wikipedia.org/wiki/Evidence-based_medicine, last modified Aug. 22, 2015, 16 pages.

McCord, M.C. et al., "Deep parsing in Watson", IBM J. Res. & Dev. vol. 56 No. 3/4 Paper 3, May/Jul. 2012, pp. 3:1-3:15.

U.S. Appl. No. 14/506,855, filed Oct. 6, 2014.
U.S. Appl. No. 14/506,810, filed Oct. 6, 2014.
U.S. Appl. No. 14/506,898, filed Oct. 6, 2014.
U.S. Appl. No. 14/836,067, filed Aug. 26, 2015.

* cited by examiner

| EMR 310 | Natural Language Content 320 |
|---|---|
| MDS:True<br>AHD: False | Patient has MDS or AHD with clear documentation. |

| EMR 310 | Natural Language Content 320 |
|---|---|
| MDS:True<br>AHD: False | Patient has MDS or AHD with clear documentation.<br><br>ANNOTATIONS:<br>- Medical Concept: MDS<br>- Medical Concept: AHD |

*FIG. 3B*

| EMR 310 | Natural Language Content 320 |
|---|---|
| MDS:True<br>AHD: False | Patient has MDS or AHD with clear documentation.<br><br>ANNOTATIONS:<br>- Medical Concept: MDS<br>    -Value: True<br>- Medical Concept: AHD<br>    -Value: False |

*FIG. 3C*

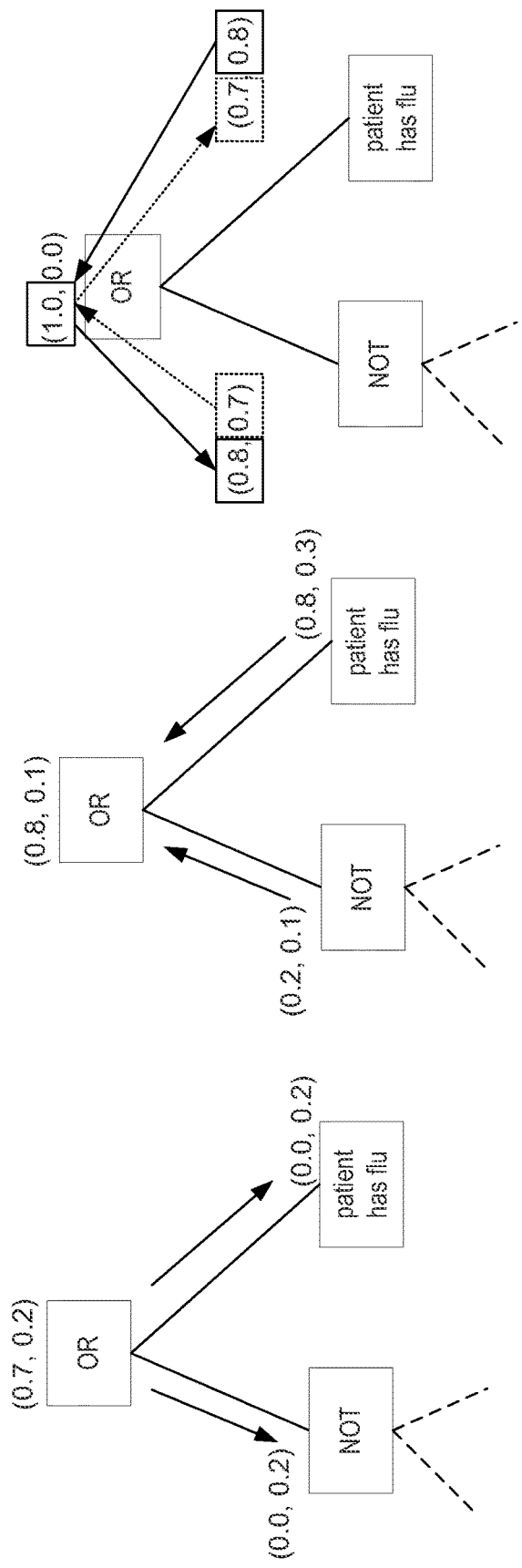

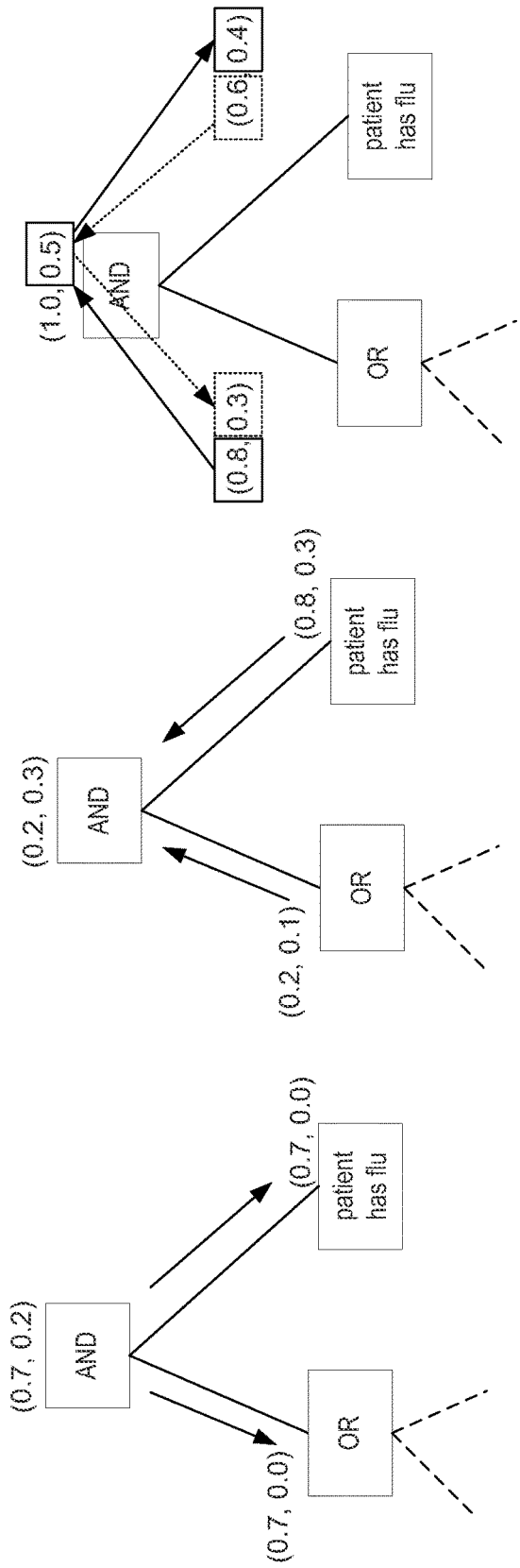

| | DOWN | | | UP | | | SIDEWAYS | |
|---|---|---|---|---|---|---|---|---|
| | OR | AND | NOT | OR | AND | NOT | OR | AND |
| TRUE | NO | YES | SWAP | MAX | MIN | SWAP | CHILD1$_{FALSE}$*OR$_{TRUE}$ = CHILD2$_{TRUE}$ | NO |
| FALSE | YES | NO | SWAP | MIN | MAX | SWAP | NO | CHILD1$_{TRUE}$*AND$_{FALSE}$ = CHILD2$_{FALSE}$ |

NATURAL LANGUAGE PROCESSING UTILIZING PROPAGATION OF KNOWLEDGE THROUGH LOGICAL PARSE TREE STRUCTURES

BACKGROUND

The present application relates generally to an improved data processing apparatus and method and more specifically to mechanisms for performing natural language processing of textual content using propagation of knowledge through logical parse tree structure representations of the logical relationships specified in the subject textual content.

Natural language processing (NLP) is a field of computer science, artificial intelligence, and linguistics concerned with the interactions between computers and human (natural) languages. As such, NLP is often involved with natural language understanding, i.e. enabling computers to derive meaning from human or natural language input, and natural language generation.

NLP mechanisms generally perform one or more types of lexical or dependency parsing analysis including morphological analysis, syntactical analysis or parsing, semantic analysis, pragmatic analysis, or other types of analysis directed to understanding textual content. In morphological analysis, the NLP mechanisms analyze individual words and punctuation to determine the part of speech associated with the words. In syntactical analysis or parsing, the NLP mechanisms determine the sentence constituents and the hierarchical sentence structure using word order, number agreement, case agreement, and/or grammars. In semantic analysis, the NLP mechanisms determine the meaning of the sentence from extracted clues within the textual content. With many sentences being ambiguous, the NLP mechanisms may look to the specific actions being performed on specific objects within the textual content. Finally, in pragmatic analysis, the NLP mechanisms determine an actual meaning and intention in context (of speaker, of previous sentence, etc.). These are only some aspects of NLP mechanisms. Many different types of NLP mechanisms exist that perform various types of analysis to attempt to convert natural language input into a machine understandable set of data.

Modern NLP algorithms are based on machine learning, especially statistical machine learning. The paradigm of machine learning is different from that of most prior attempts at language processing in that prior implementations of language-processing tasks typically involved the direct hand coding of large sets of rules, whereas the machine-learning paradigm calls instead for using general learning algorithms (often, although not always, grounded in statistical inference) to automatically learn such rules through the analysis of large corpora of typical real-world examples. A corpus (plural, "corpora") is a set of documents (or sometimes, individual sentences) that have been hand-annotated with the correct values to be learned.

SUMMARY

In one illustrative embodiment, a method, in a data processing system comprising a processor and a memory, for processing logical relationships in natural language content. The method comprises generating, by the data processing system, a logical parse hierarchical representation of a first parse of a natural language content by identifying latent logical operators within the first parse indicative of logical relationships between elements of the natural language content. The logical parse hierarchical representation comprises nodes and edges linking nodes. The method further comprises associating, by the data processing system, at least one knowledge value with each node in the logical parse hierarchical representation. Moreover, the method comprises propagating, by the data processing system, the at least one knowledge value of at least a subset of the nodes in the logical parse hierarchical representation to one or more other nodes in the logical parse hierarchical representation based on propagation rules. In addition, the method comprises performing a reasoning operation on the logical parse hierarchical representation to generate a knowledge output indicative of knowledge associated with one or more of the logical relationships between elements of the natural language content.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 1A-1J illustrate an example operation of a logical parser of the illustrative embodiments with regard to an example unstructured natural language sentence in accordance with one illustrative embodiment;

FIG. 2 illustrates an example logical parse of an example sentence by the logical parser in accordance with one illustrative embodiment;

FIGS. 3A-3D illustrate one example application of the above method for assigning supporting evidence and relevance values to nodes of a logical parse generated by the logical parser previously described above;

FIGS. 4A-4C illustrate the propagation of supporting evidence measures for an OR logical operator in accordance with one illustrative embodiment;

FIGS. 5A-5C illustrate the propagation of supporting evidence measures for an AND logical operator in accordance with one illustrative embodiment;

DETAILED DESCRIPTION

Figure 1A:
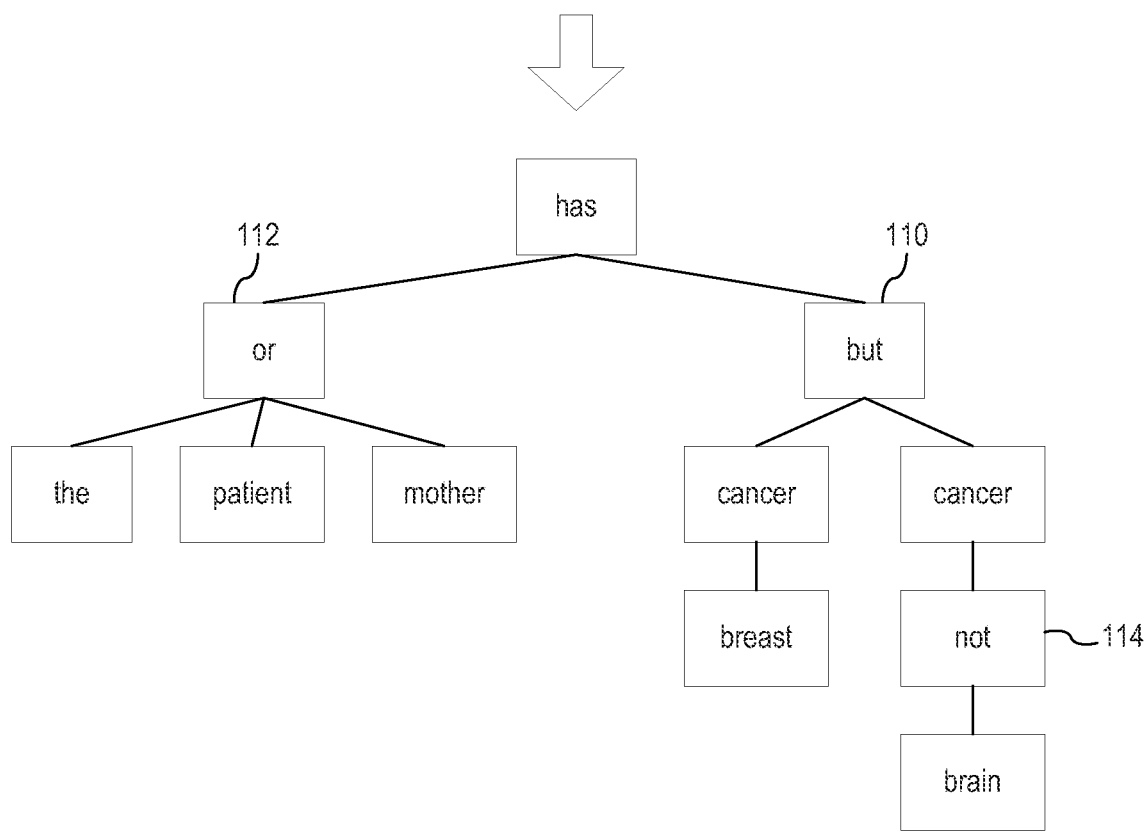

The illustrative embodiments provide mechanisms for performing natural language processing operations utilizing a logical tree structure representation of logical relationships between portions of textual content. That is, the illustrative embodiments address the limits of known natural language processing (NLP) techniques, applied to language understanding, with regard to performing only lexical or dependency parse analysis. Known NLP mechanisms inherently do not have an ability to accurately process logical relationship language (e.g., A is related to B according to a logical relationship specified in the natural language, e.g., A=mother, B=cancer, and A is related to B by the term "has") to determine the affect of the logical relationship language on the semantics of the natural language content. The logical parser mechanisms of the illustrative embodiments generate a hierarchical representation of these logical relationships within natural language content (or textual content) based on an analysis of logical relationship language within the natural language content to thereby model the affect of the logical relationship language on the semantics of the natural language content.

Based on this logical hierarchical model, various operations, as described hereafter, may be performed to spread knowledge throughout the logical hierarchical model (also referred to herein as simply the "logical model"). This knowledge, in some illustrative embodiments, is represented as fuzzy relevance measures and fuzzy supporting evidence measures that are propagated amongst the elements of the hierarchical representation of logical relationships. The fuzzy logic values (i.e. values ranging from 0.0 to 1.0) used to represent relevance and supporting evidence measures (tuples with each value ranging from 0.0 to 1.0) are generated as a result of analysis of natural language content, annotations of the natural language content, and correlation of the results of such analysis without outside sources of information. Various methodologies are provided for governing the manner by which these supporting evidence measures and relevance measures are propagated to other elements within the logical hierarchical model. In some illustrative embodiments, the propagation of these relevance and supporting evidence measures may be accomplished taking into account co-reference resolution as described in greater detail hereafter.

Based on the logical model, these fuzzy supporting evidence measures and relevance measures may be used by an extensible knowledge reasoning framework to utilize the results of the spread of logical relationship information using the logical hierarchical model to achieve additional or improved NLP results. In some illustrative embodiments, the mechanisms of the illustrative embodiments are utilized with a Question and Answer (QA) system, such as the IBM Watson™ QA system available from International Business Machines (IBM) Corporation of Armonk, N.Y.

In order to provide a clear understanding of the various improvements made by the illustrative embodiments over known NLP mechanisms, the following description will first describe the mechanisms for generating the logical hierarchical model from an initial set of NLP generated results. Having generated the logical hierarchical model, the following description will then describe illustrative embodiments for the generation of fuzzy values for representing evidential support and relevance of portions of natural language content utilizing the logical hierarchical model. Thereafter, illustrative embodiments directed to the propagation of these fuzzy evidential support and relevance measures utilizing the logical hierarchical model will be described followed by a description of the extensible knowledge reasoning framework that utilizes logical hierarchical model and the previously mentioned mechanisms to provide a transaction based knowledge representation for purposes of generating improved NLP results. While separate sections for each of these descriptions will be set forth hereafter, it should be appreciated that these separate sections are not intended to state or imply that these various mechanisms cannot be used in conjunction with one another. To the contrary, any combination of these mechanisms may be used without departing from the spirit and scope of the present invention.

Before beginning the discussion of the logical hierarchical model (or logical parse) generation, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

In view of the above, it is clear that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

I. Mechanisms for Generating a Logical Tree from Initial Natural Language Processing Results As mentioned above, natural language processing (NLP) techniques for any task requiring language understanding are often limited to either lexical or dependency parse analysis. This inherently limits the ability to accurately deal with the affect of logical language on the semantics of the natural language content. For example, consider the following two sentences:

1. "Treatment is necessary when the patient is anemic, the patient has a red and bumpy rash, or the patient has diabetes and not hypertension."

2. "The patient has a red rash, but not hypertension."

Now consider that a user submits a question, or third sentence, to a NLP based mechanism requesting to know whether treatment is necessary for this patient:

3. "Is treatment necessary?"

The NLP based mechanism, such as a Question and Answer (QA) system, without a logical interpretation of these sentences, would find it difficult to show why these two sentences do not necessarily imply that treatment is necessary. That is, the lexical similarity of these sentences and the input question should not cause an implication that treatment is necessary/not necessary, e.g., just because the terms "treatment" appear in 1 and 3 above does not necessarily mean that 3 is true (treatment is necessary). On the other hand, a lack of certain terms in the input question should not generally withhold an implication that treatment is necessary/not necessary, e.g., the lack of the terms "anemic," "rash," "diabetes," or "hypertension" in 3 above does not mean that 3 is false (treatment is not necessary).

The illustrative embodiments provide mechanisms that provide for natural language understanding of logical language, such that the logical semantics can be extracted without resorting to the use of controlled natural language techniques that require disregarding much of normal language. Controlled natural language techniques are those that perform processing of only a specific subset of language, i.e. a small portion of language is formalized in logic of the controlled natural language technique and anything outside that subset is disallowed, thereby controlling or formalizing the language.

The foundation of the illustrative embodiments is a logical parser that generates a logical hierarchical model of the natural language content for use in performing NLP operations. In generating the logical hierarchical model, the logical parser parses the natural language content into atomic logical terms (short sentences, phrases, or words) that lack explicit or implicit logic, and connects these atomic logical terms by logical operators to thereby generate a logical expression specifying a logical relationship between two or more of the atomic logical terms. Once the natural language content is converted to one or more logical expressions, these logical expressions may be subjected to Boolean logic, three-valued logic, and other mathematical, or other types of logic reasoning, as well as other semantic analysis of the atomic logical terms.

The logical parser operates on an initial NLP result generated from a syntactic/semantic analysis of the natural language content, which may be unstructured natural language. For example, the unstructured natural language may be processed by an English Slot Grammar (ESG) mechanism that provides a syntactic/semantic parse of the unstructured natural language in accordance with known ESG mechanisms. The syntactic/semantic parse results are then input to the logical parser of the illustrative embodiments which normalizes the logical triggers, e.g., negation identifiers, phrases, noun relations, modifiers, and the like, that are indicative of a logical relationship, within the syntactic/semantic parse results to a predetermined set of known logical operators. The logical operators are used as triggers for a series of specific, ordered, manipulations of the syntactic/semantic parse, as described hereafter, to yield a logical parse and corresponding logical hierarchical model. Although the logical parse is itself the data results generated by the logical parser, the data may be represented as a hierarchical tree graph referred to herein as the logical hierarchical model. However, for ease of understanding in the present description, these will be referred to together as the "logical parse". This resulting logical parse is simplified to remove redundancy to thereby generate a simplified logical parse derived from unstructured natural language content.

FIGS. 1A-1J illustrate an example operation of a logical parser of the illustrative embodiments with regard to an example unstructured natural language sentence in accordance with one illustrative embodiment. As shown in FIG. 1A, for this example operation of the logical parser, it will be assumed that the natural language sentence is "The patient or mother has breast cancer but not brain cancer." Using this natural language sentence as an input, a NLP mechanism generates an initial NLP syntactic/semantic parse of the natural language sentence using known syntactic/semantic analysis mechanisms, such as by way of an ESG mechanism. As a result, the syntactic/semantic parse is generated, shown as a hierarchical model in FIG. 1A in which each word is a node in the hierarchical model and syntactic/semantic relationships between words are shown as edges. Thus, as shown in FIG. 1A, a highest syntactic relationship "has" joins "patient," "or," "mother" with "cancer" and "breast" and "cancer", "not", "brain." Any known or later developed NLP mechanism capable of generating a syntactic/semantic parse of structured or unstructured natural language may be used to generate such an initial syntactic/semantic parse of the natural language input without departing from the spirit and scope of the illustrative embodiments.

The syntactic/semantic parse or syntactic/semantic hierarchical model (hereafter referred to as the "syntactic/semantic parse") is then pre-processed by expanding negation contractions, normalizing latent logical terms or operators in the syntactic/semantic parse to a predetermined set of logical operators, and conjoining comma-delimited lists. Examples of such latent logical terms or operators that are converted to logical operators include, but are not limited to:

A) negation identifiers, such as "not";

B) alternative listing phrases such as "one of the following", "any one of", "at least one of", and the like;

C) complex logical operator terms such as "either/or" and "neither/nor";

D) relative clauses (e.g., in the sentence "It was the patient who was admitted" the clause "who was admitted" is a relative clause of the patient);

E) modifiers such as "that", "whom", or "which"

Such latent logical terms are converted to corresponding logical operators in a predetermined set of logical operators. In one illustrative embodiment, the predetermined set of logical operators are Boolean logic operators, such as AND, OR, and NOT.

Thus, for example, when expanding negation contractions, latent logical terms such as "shouldn't" are expanded to "should not". When normalizing latent logical terms, terms such as "but" are converted to "and", "nor" is converted to "or", "neither" is converted to "not", and the like. When conjoining comma-delimited lists, phrases such as "including A, B, and C" are converted to "including A and B and C" and phrases such as "including A, B, or C" are converted to "including A or B or C." It should be appreciated that these are only examples of how operations that may be encompassed in such pre-processing of the syntactic/semantic parse to expand, normalize, and conjoin latent logical terms and other operations for pre-processing the syntactic/semantic parse may be used in addition to, or in replacement of, these operations without departing from the spirit and scope of the illustrative embodiments.

Figure 1B:
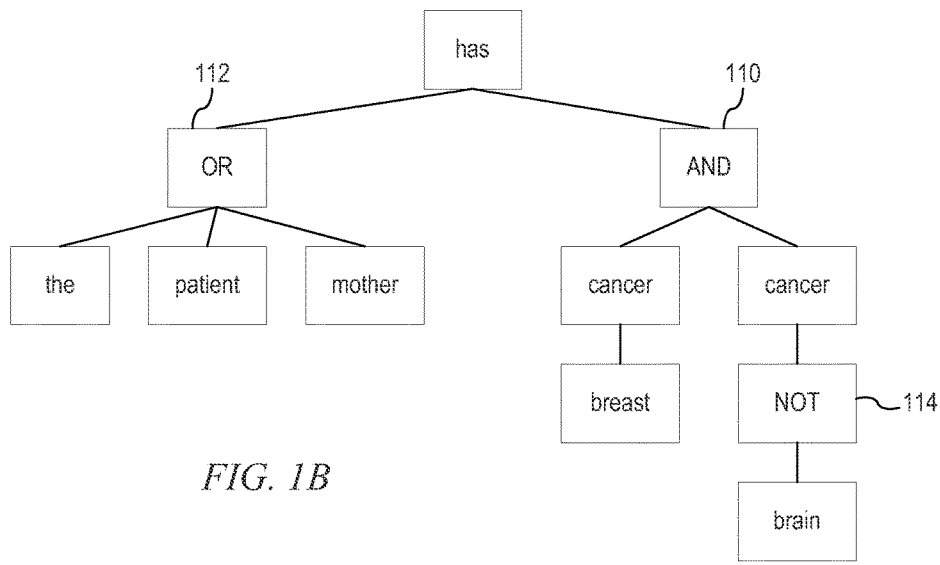

Thus, with reference to FIG. 1B, through this pre-processing operation of the illustrative embodiments, the syntactic/semantic parse shown in FIG. 1A is converted to the pre-processed syntactic/semantic parse shown in FIG. 1B where node 110 has been converted from the latent logical term "but" to the Boolean logic operator AND. It can be seen that even though the term "but" has been changed to the logical operator AND, the meaning of the sentence is not lost since logically the pre-processed syntactic/semantic parse still conveys that either the patient or mother has breast cancer and not brain cancer. Similarly, the latent logical terms "or" and "not" in nodes 112 and 114 are also converted to their logical operator equivalents from the pre-defined set of logical operators, i.e. OR and NOT.

Having generated the pre-processed syntactic/semantic parse as an intermediary result, the logical operators, of the predetermined set of logical operators, in the pre-processed syntactic/semantic parse are then processed within the scope of each of the logical operators. It should be noted that logical operators above a verb (any node corresponding to such a verb in the syntactic sense) are treated as being in the same scope as logical operators below the verb in the syntactic/semantic parse. Upper scopes are processed before lower scopes which essentially elevates a logical operator to above the top un-processed node and sets the sub-tree under the logical operator as an argument and a copy of the sub-tree as a second argument of the logical operator. In one illustrative embodiment, logical OR operators are processed, followed by logical AND operators, and then logical NOT operators. However, in other illustrative embodiments, a different order of processing logical operators may be utilized based on the desired implementation.

Figure 1C:
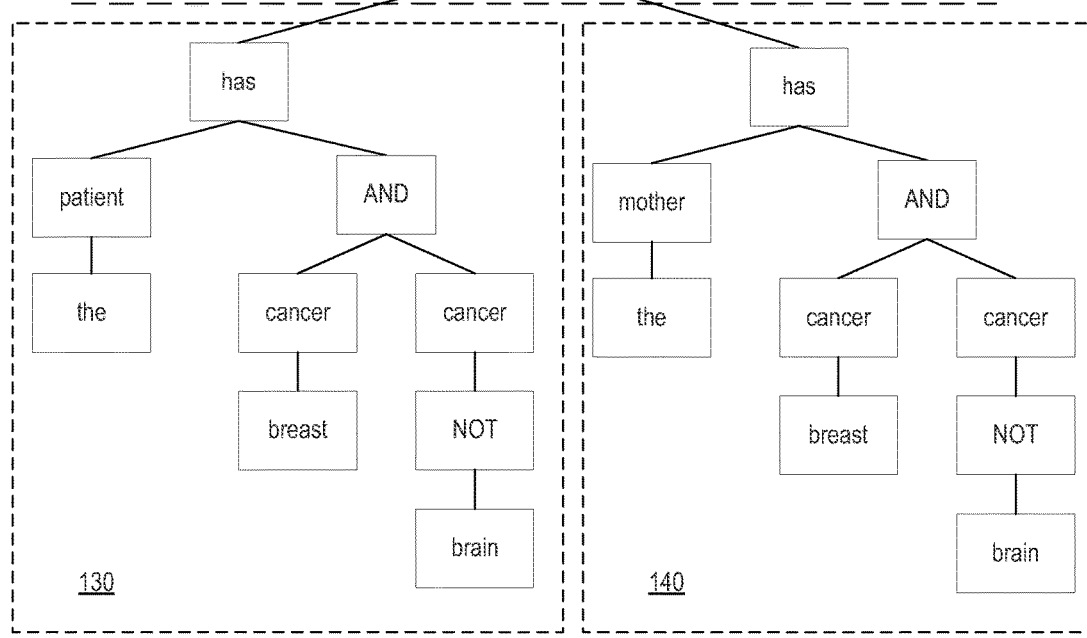

As shown in FIG. 1C, in processing the logical OR operators, the logical OR node 112 is elevated to a highest level node 120 within the scope of the OR operator and the sub-tree structures associated with each of the alternatives of the OR operator are expanded. Thus, in the depicted example, sub-trees 130 and 140 are generated in the syntactic/semantic hierarchical model where each sub-tree 130 and 140 is associated with a separate alternative of the OR operator, e.g., "the patient" and "the mother", respectively, and the remaining portion of the syntactic/semantic parse corresponding to each alternative is replicated, i.e. the portion of the syntactic/semantic parse referring to the alternative having breast cancer and not brain cancer.

Figure 1D:
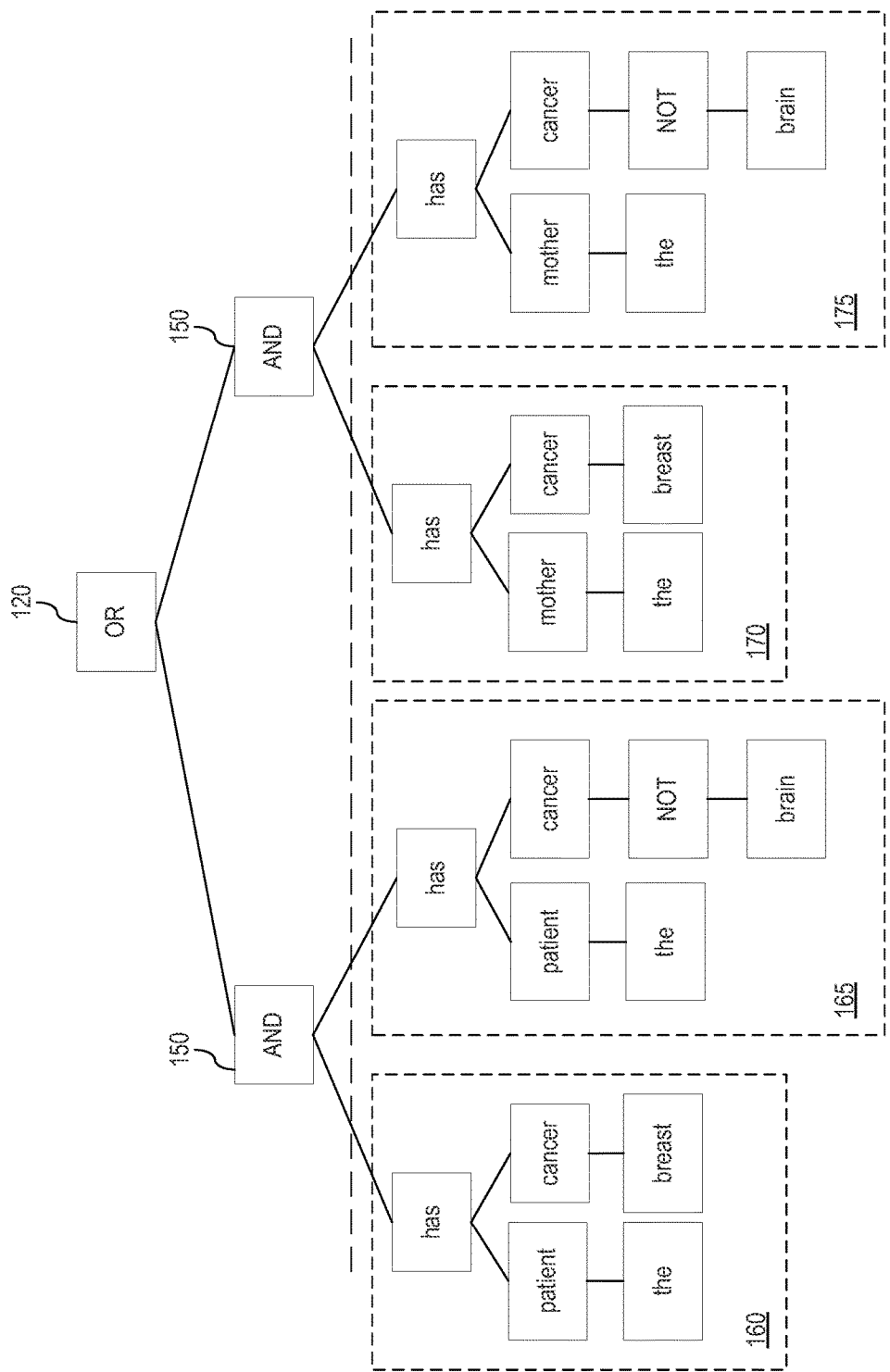

As shown in FIG. 1D, a similar approach is followed for the logical AND operators with these operators being elevated to a highest node within their scope, which is just below the previously processed OR operator. For this example, the AND operator node 150 is replicated for each of syntactic sub-trees with which the AND operator node 150 is related and the corresponding sub-trees are replicated. Thus, two separate sub-tree structures 160, 165 and 170, 175 are generated for each of the AND operators with the sub-tree structures 160, 165 representing the AND operator scope for the patient alternative of the OR operator and sub-tree structure 170, 175 representing the AND operator scope for the mother alternative of the OR operator.

Figure 1E:
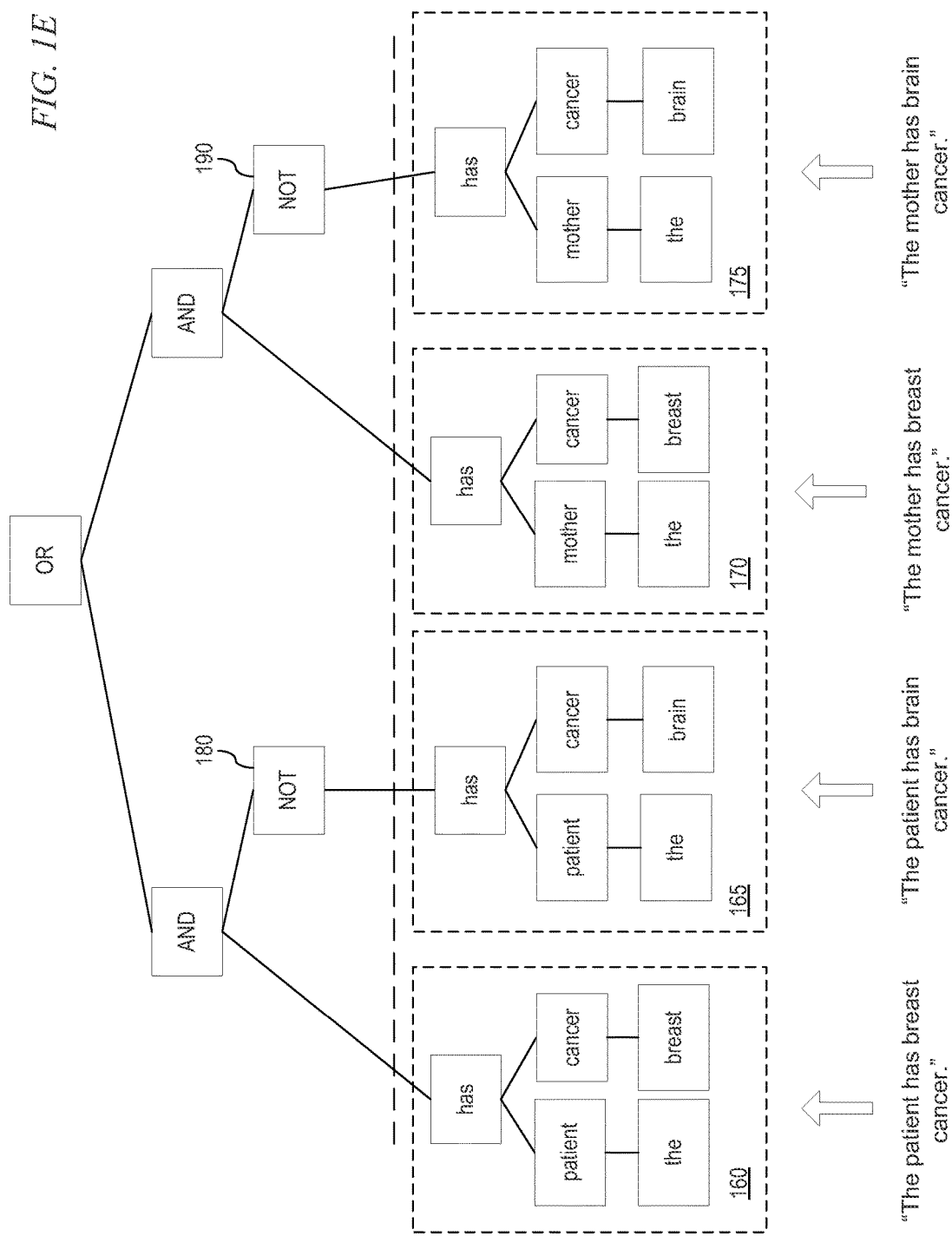

As shown in FIG. 1E, a similar approach is again followed for the logical NOT operators with these operators again being elevated to a highest node within their scope, which in this case is just below the AND operators previously processed. Thus, the NOT operator nodes 180 and 190 are elevated such that each sub-tree under the OR operator represents the logical alternatives set forth in the original natural language sentence, i.e. the patient has breast cancer and not brain cancer OR the mother has breast cancer and not brain cancer.

Figure 1F:
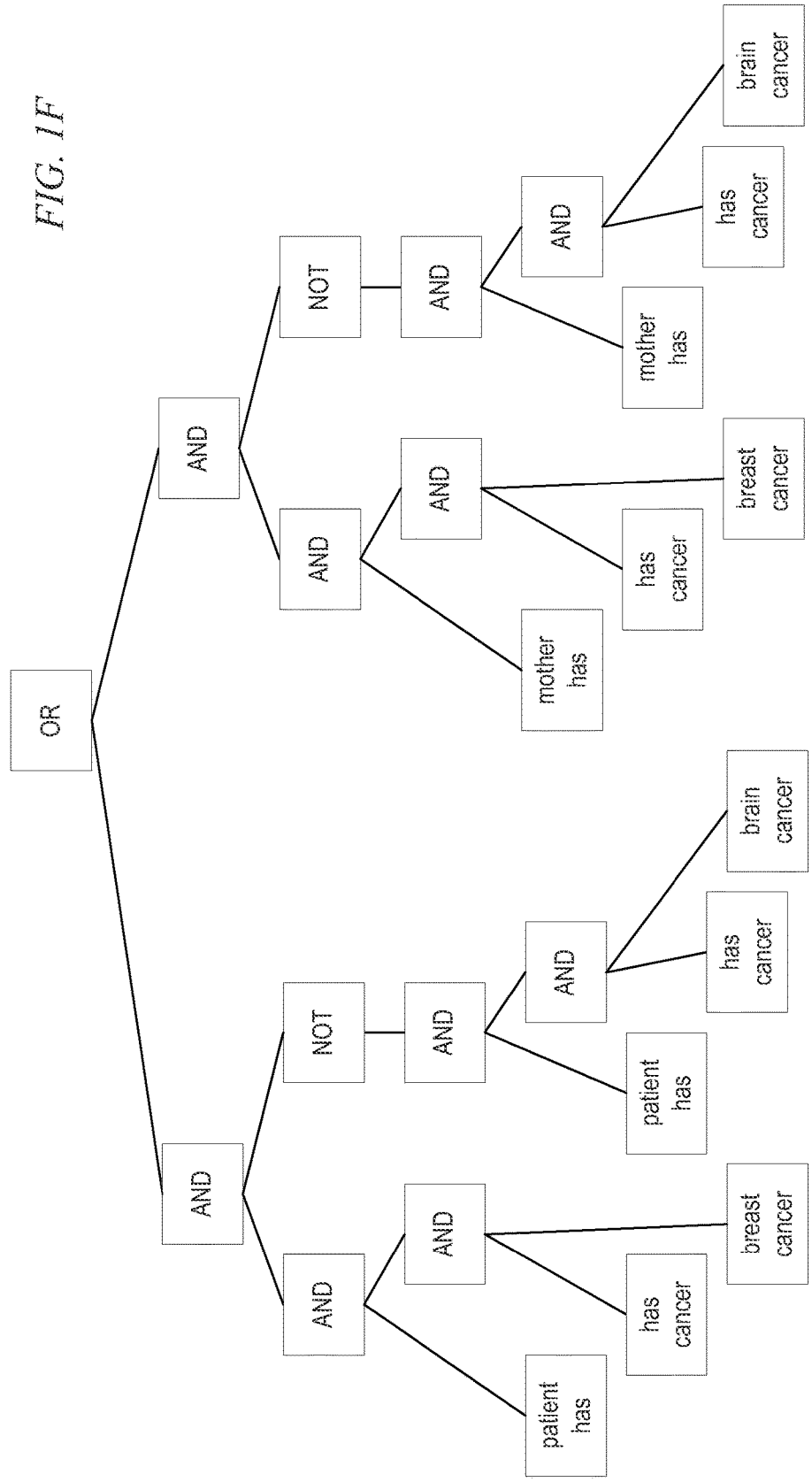

Having processed the logical operators in the pre-processed syntactic/semantic parse, the resulting logical parse or logical hierarchical model (again referred to herein as the "logical parse" for simplicity) is further subjected to primitivization to break down the sub-tree structures into primitive leaf nodes connected to the logical operators. This primitivization process involves implementation of a 1-modifier rule and verb exception. As shown in FIG. 1F, this operation eliminates verb nodes in the sub-tree structures and results in a replication of the logical operators where necessary to enforce the 1-modifier rule being associated with each remaining leaf node of the sub-trees, i.e. only one Boolean logic operator being directly connected to each leaf node.

For example, with AND nodes in the logical parse, AND nodes are node replicated such that new nodes are created to AND together various pairs of nodes. For example, in the statement "the brown mouse ran", the logical parse of this sentence results in two separate statements (represented in nodes of the logical parse), which are combined by a logical AND, of "the mouse is brown" AND "the mouse ran." This is the 1-modifier rule, where all nodes (except a verb) are allowed to only have one modifier. If they have more than one modifier, they are split off and ANDed together. For example, the phrase "the brown, worn shoe" becomes "the shoe is brown" AND "the shoe is worn." The verb exception from the 1-modifier rule is the configuration where the verb is allowed to have more than one modifier, such as a subject, direct object, and indirect object.

The resulting primitivized logical parse is then subjected to simplification operations to simplify the primitivized logical parse to thereby eliminate redundancy in the logical parse. The simplification operation may make use of one or more simplification algorithms or methodologies in an iterative process until no further simplification is achievable. In one illustrative embodiment, the simplification operation comprises the use of DeMorgan's Law, Factorization, and Disjunctive Syllogism. DeMorgan's Law essentially states that the negation of a conjunction is the disjunction of the negations and the negation of a disjunction is the conjunction of the negations, i.e. "not(A and B)" is the same as "(not A) or (not B)" and "not(A or B)" is the same as "(not A) and (not B)."

Factorization is the decomposition of an object into a combination of other objects which, when combined together, give the original object. This may be represented as $(A \land B) \lor (A \land C) \Leftrightarrow A \land (B \lor C)$.

Disjunctive Syllogism is a syllogism having a disjunctive statement for one of its premises, e.g., given the statements "either the breach is a safety violation, or it is not subject to files" and "the breach is not a safety violation" through disjunctive syllogism one can conclude that "therefore, the breach is not subject to fines." In other words, if P or Q is true, and P is false, then Q is true.

Figure 1G:
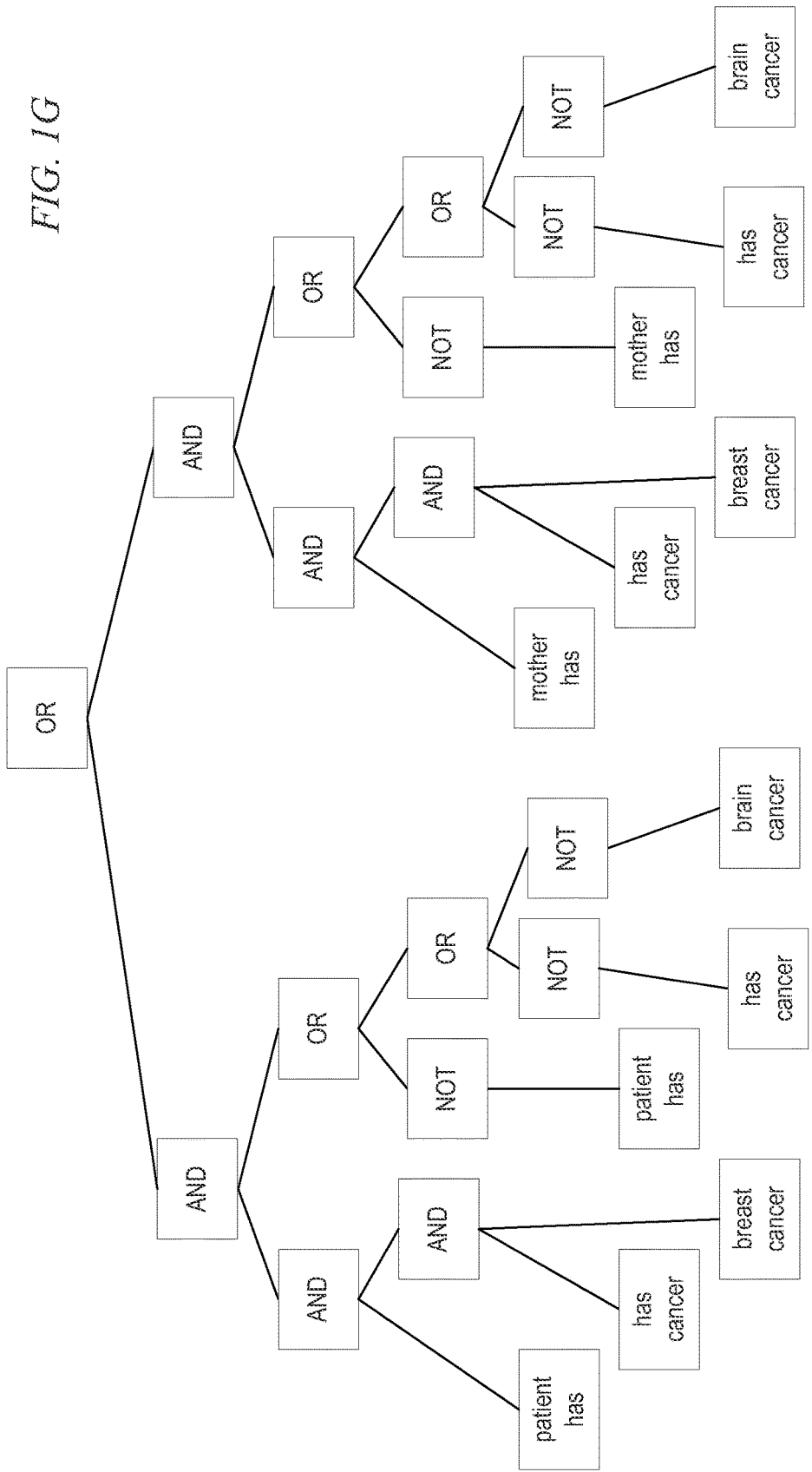

As an example, the results of the application of DeMorgan's Law to the logical parse of FIG. 1F is shown in FIG. 1G. It can be seen from a comparison of FIGS. 1F and 1G, the NOT operator has traversed down to above the leaf node in each case. This is the result of DeMorgan's Law where $\sim(A \land B)$ becomes $\sim A \lor \sim B$. For example, NOT(patient has AND has cancer AND brain cancer) becomes NOT(patient has) OR NOT(has cancer) OR NOT(brain cancer).

Figure 1H:
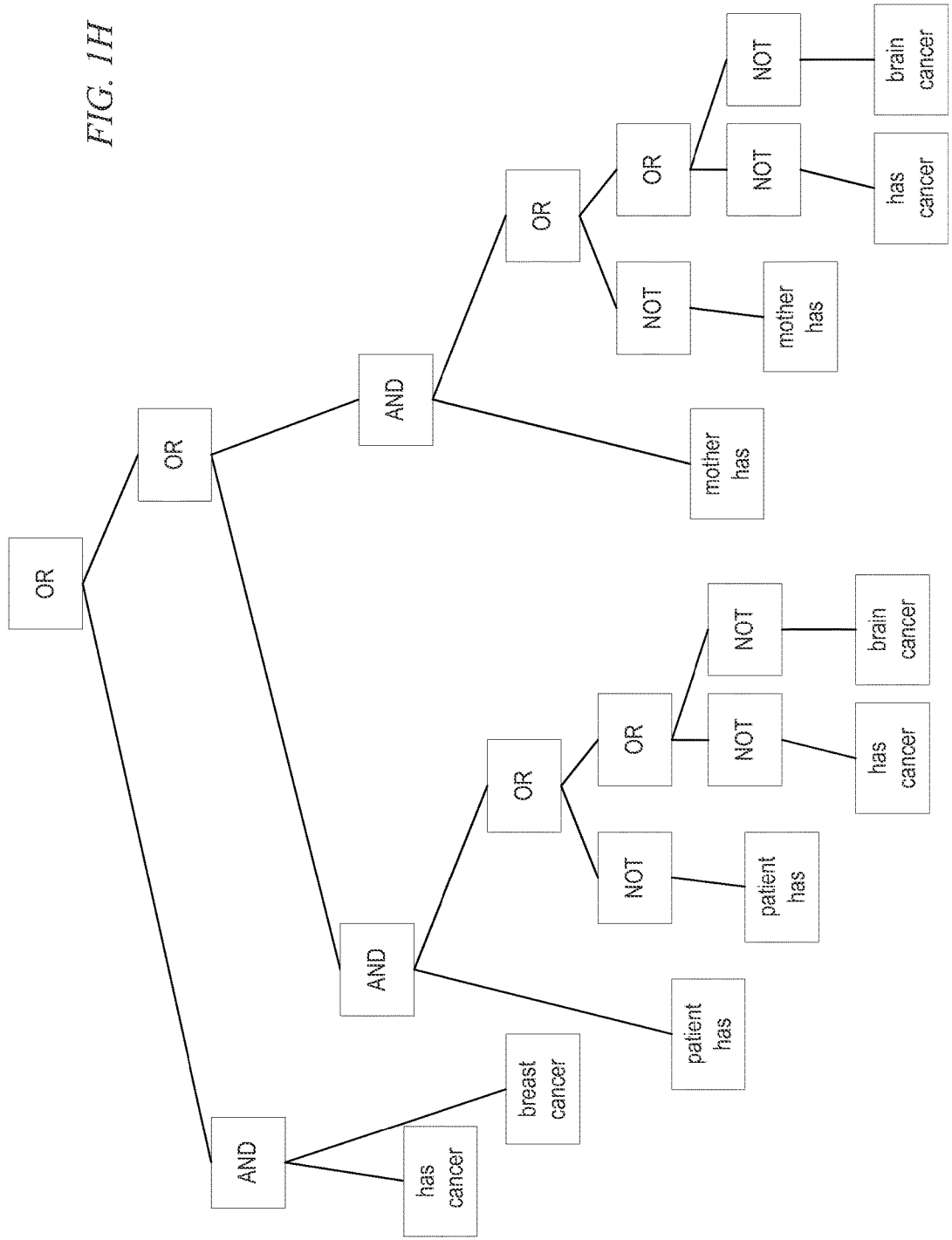

The results of the application of DeMorgan's Law are then subjected to Factorization as shown in FIG. 1H. As shown in FIG. 1H, the node "has cancer" is one of the atomic logical terms that have been factored, as well as the node "breast cancer." This involves these nodes being pulled up further in the logical parse and the logical connective nodes set accordingly.

The results of the application of the Factorization of FIG. 1H are subjected to Disjunctive Syllogism as shown in FIG. 1I. It should be noted in FIG. 1H that there is the subtree for node "patient has" AND (NOT("patient has") OR . . . ) which is of the form A AND (NOT(A) OR (B)). By disjunctive syllogism, this simplifies to A AND B, as shown in FIG. 1I. Thus, the result of disjunctive syllogism in FIG. 1I is the sub-tree comprising nodes "patient has" AND (NOT("has cancer") OR NOT("brain cancer")).

Figure 1J:
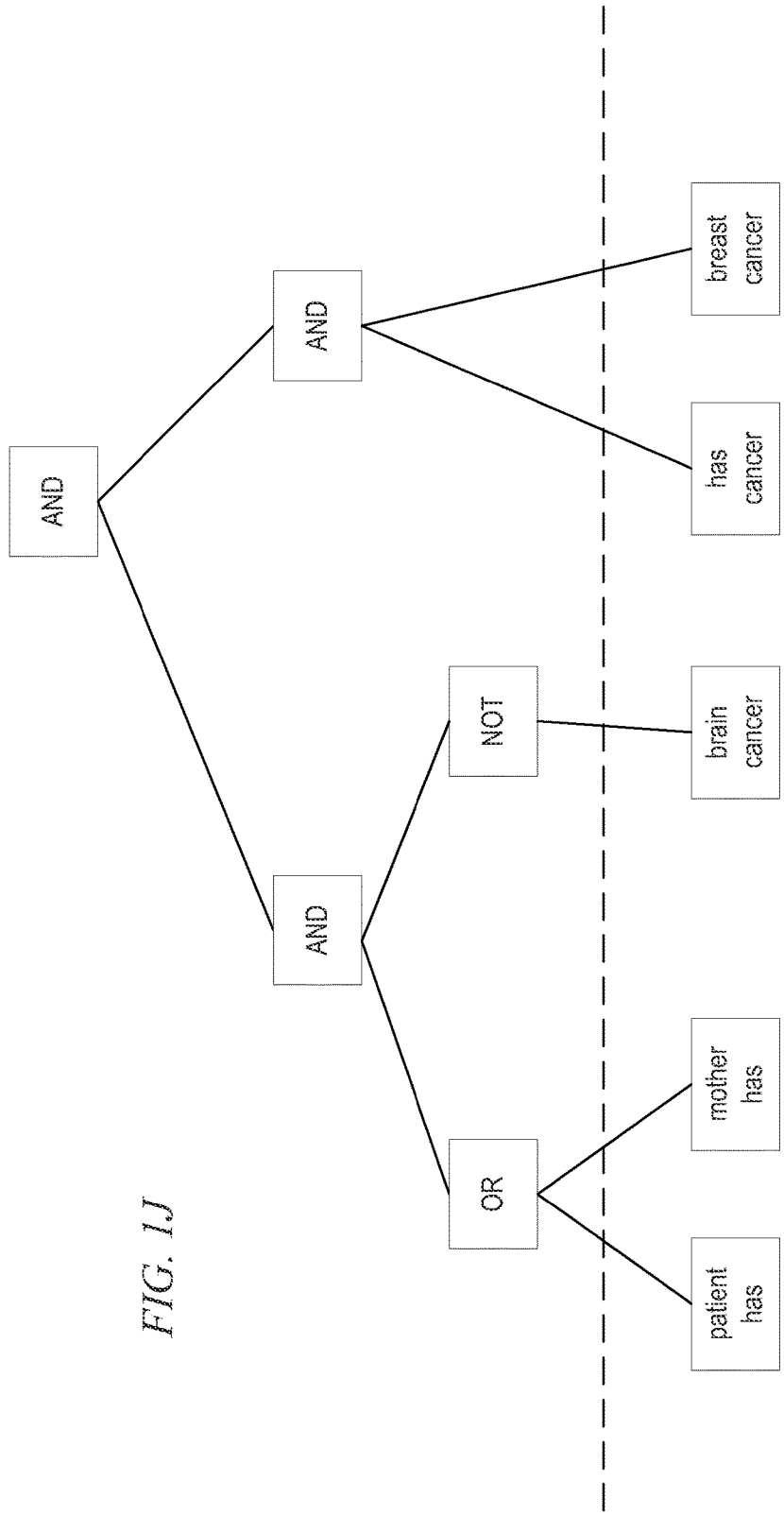

This process is then repeated to achieve greater simplification resulting in the logical parse shown in FIG. 1J. The simplified logical parse illustrates the logical relationship between sub-elements of the original natural language content. In this case, the simplified logical parse specifies that either the patient or the mother has breast cancer but not brain cancer. Thus, the logical relationships are modeled in such a manner that additional NLP operations may be performed using the knowledge of these logical relationships. Examples of these NLP operations include, but are not limited to:

1) determining negated scopes, i.e. determining which part of the sentence is negated (e.g., in the statement "Patient does not have MDS or AML" the "have MDS or AML" is the scope of negation because it is the phrase being negated);

2) condensing language without summarization, i.e. removing exact word redundancy by factoring logical terms out (e.g., in mathematical terms ax+bx becomes x(a+b) which can be done in a similar manner across multiple sentences' logical parse trees which can then be converted back to natural language with less redundant facts; and 3) question analysis to break down natural language queries into more basic queries (e.g., breaking down the question into atomic phrases upon which queries may be generated, such as short simple prepositional phrases or the like). Additional NLP operations that may be performed based on the logical relationships modeled in the manner described above are discussed in greater detail hereafter.

II. Evidential Support and Relevance Values

As mentioned above, the logical parse generated by the logical parser of the illustrative embodiments serves as a basis for performing operations to improve natural language processing (NLP) and the results generated by such NLP mechanisms. Some operations for improving NLP mechanism include the ability to set, propagate, and manage supporting evidence measures and relevance measures for each of the atomic logical terms so that reasoning operations can be performed on these supporting evidence measures and relevance measures. The supporting evidence measures and relevance measures used by the illustrative embodiments permit natural language content to be processed using an open-world view. The open-world view essentially allows natural language processing to be performed under the understanding that one cannot simply make assumptions regarding the truth or falsity of a statement, i.e. just because one does not know something to be true does not mean that it is necessarily false and just because one does not know something to be false does not necessarily mean it is true.

Such an open world view is important in many domains. One example is the medical domain. For example, one can imagine the negative implications if, because a patient was not tested for cancer, a system would present as knowledge that the patient did not have cancer, i.e. because a medical record does not state that the patient has cancer, then the patient must not have cancer. In such a situation, a problem exists in that the system does not have a representation that supports a lack of knowledge. Moreover, an uncertainty representation in such a system is important because the degree of uncertainty is continuous, not discrete.

Furthermore, a representation of confliction in such a system that is separate from a lack of knowledge is also important to implement since confliction has different implications from a lack of knowledge. That is confliction occurs when faced with conflicting data whereas lack of knowledge exists when there is a lack of data. Confliction has implications about the coherence of the data and can lead to a change in trust in some of the sources of data whereas a lack of knowledge does not.

Systems that utilize Boolean truth/false representations (where something is either true (logic 1) or false (logic 0)), while being able to identify confliction, cannot address uncertainty, lack of knowledge, or support an open-world view. Three valued logic systems (where three truth values are used to represent true, false, and some indeterminate, or "unknown," third value) can support an open world view, but cannot support degrees of uncertainty or degrees of confliction. Fuzzy and probabilistic value representations can support uncertainty, but do not offer an open-world view or the ability to identify confliction. In other words, in a fuzzy and probabilistic value representation, falsity is represented as a 0 and truth as a 1 which prevents this representation from simultaneously supporting confliction as separate from a lack of knowledge. That is, lack of knowledge of truth cannot have the truth value 0 (which would violate the open world view). Therefore, the only possible value for lack of knowledge of truth is 0.5, but this prevents confliction from having a value since it cannot be 0.5 and any other value is semantically unjustified.

Additionally, incorporating a representation that supports uncertainty into a reasoning system that supports resolution is problematic, i.e. a general deduction on larger pairs of expressions taken as truth, e.g., taking one set of facts and another set of facts and obtaining a new truth in the form of the resolvent (e.g., ((A∨B) ∧(C∨D) and B∧~C yielding D as the resolvent). Even more so, a reasoning system, i.e. any system taking a set of facts, which may include simple statements or logically connected combinations thereof and an initial mapping of those facts as truth states, and which derives a new fact-to-truth mapping with updated truth states and possibly new facts (with their own truth states), that incorporates an open-world view with uncertainty is especially problematic due to assignment of true and false values. Because of this, any system that seeks to represent knowledge in such a way that it can address uncertainty, contradiction, and an open-world view should also describe how reasoning can happen over that representation.

In addition to these issues with regard to uncertainty, contradiction, and open-world view being represented in reasoning systems, relevancy is also an issue as well. That is, hierarchical models of natural language content used by reasoning systems can provide too many reasoning assertions which may not be relevant to the problem at hand. These superfluous assertions interfere with the reasoning process and can lead to incorrect results.

For example, consider the sentence "patient has MDS or AHD with clear documentation." Even if the patient has MDS or AHD, the reasoning process of a reasoning system cannot conclude if the statement is true/met unless there is explicit evidence of "clear documentation." In real-world applications, "clear documentation" is often assumed when the patient is diagnosed with MDS or AHD. Thus, "clear document" is an irrelevant fact, but in a reasoning system may interfere with the reasoning process by preventing the sentence from being evaluated as true/met. Therefore, any system that seeks to represent knowledge in such a way that reasoning can be accomplished with maximum accuracy should also implement a mechanism for evaluating relevancy of facts/concepts within the natural language content.

The illustrative embodiments set forth herein provide mechanisms for representing uncertainty and contradiction, support an open-world view, and further provide for the consideration of relevancy when performing reasoning operations on natural language content. In order to achieve such representations and provide support for such an open-world view and consideration of relevancy, the illustrative embodiments utilize fuzzy logic values for representing supporting evidence measures and relevancy measures for the atomic logic terms of a logical parse, such as may be generated using the logical parser previously described above. In some illustrative embodiments, the supporting evidence measures comprise a truth fuzzy logic value and a false fuzzy logic value indicating, respectively, an amount of supporting evidence that the atomic logic term is true/met and an amount of supporting evidence that the atomic logic term is false/not met. In addition, a fuzzy relevance logic value is associated with the atomic logic term that presents a measure of relevancy of the atomic logic term to the reasoning operations operating on the natural language content. Thus, each node in a logical parse may have three fuzzy logic values associated with it, i.e. a truth fuzzy logic value, a false fuzzy logic value, and a relevancy fuzzy logic value, e.g., (t:0.0 to 1.0, f:0.0 to 1.0, r:0.0 to 1.0).

Using such fuzzy logic values, with regard to supporting evidence measures, a value of 0.0 represents a lack of evidence or knowledge. A value of 1.0 represents an absolute evidence of truth or falsity. Confliction is indicated whenever there is some evidence for truth and some evidence for false, e.g., the truth and false fuzzy values are both non-zero. It should be appreciated that the fuzzy logic values for supporting evidence measures are representative of evidential support, not probabilities or degrees of truth. Thus, the sum of the fuzzy value for truth and the fuzzy value for false do not necessarily sum to 1.0, e.g., the sum may be greater than or less than 1.0.

With regard to the relevance measure, a fuzzy value of 0.0 represents that the corresponding atomic logical term is fully irrelevant to the reasoning operation. On the other hand, a fuzzy value of 1.0 represents that the corresponding atomic logical term is fully relevant to the reasoning operation. A fuzzy value between 0.0 and 1.0 is representative of a percentage of relevance of the node with the inverse of the fuzzy relevance value being indicative of a measure of irrelevance of the node, e.g., a value of 0.60 is indicative of a 60% relevance, or 40% irrelevance. The measure of irrelevance in this manner will become important when discussing propagation of irrelevance measures from node to node hereafter.

The supporting evidence measures and relevance measures are set and propagated throughout the logical parse in accordance with the results of analysis that may be at least partially based on information obtained from one or more outside sources of information, e.g., a corpus of documents. The propagation of these measures follows pre-defined rules of propagation established for the supporting evidence measures and the relevance measures, with the propagation rules potentially being different for supporting evidence measures than for relevance measures. Hereafter, a description of the process for setting the fuzzy logic values for these measures will be described followed by a description of the manner by which these fuzzy logic values are propagated throughout the logical parse generated by the logical parser of the illustrative embodiments.

III. Setting Supporting Evidence and Relevance Measure Values

In some illustrative embodiments, the setting of these supporting evidence measures and relevance measures is performed using one or more external sources of information. A mapping mechanism is then employed to associate these values with nodes, or atomic logic terms, within the logical parse.

Figures 2, 3A:
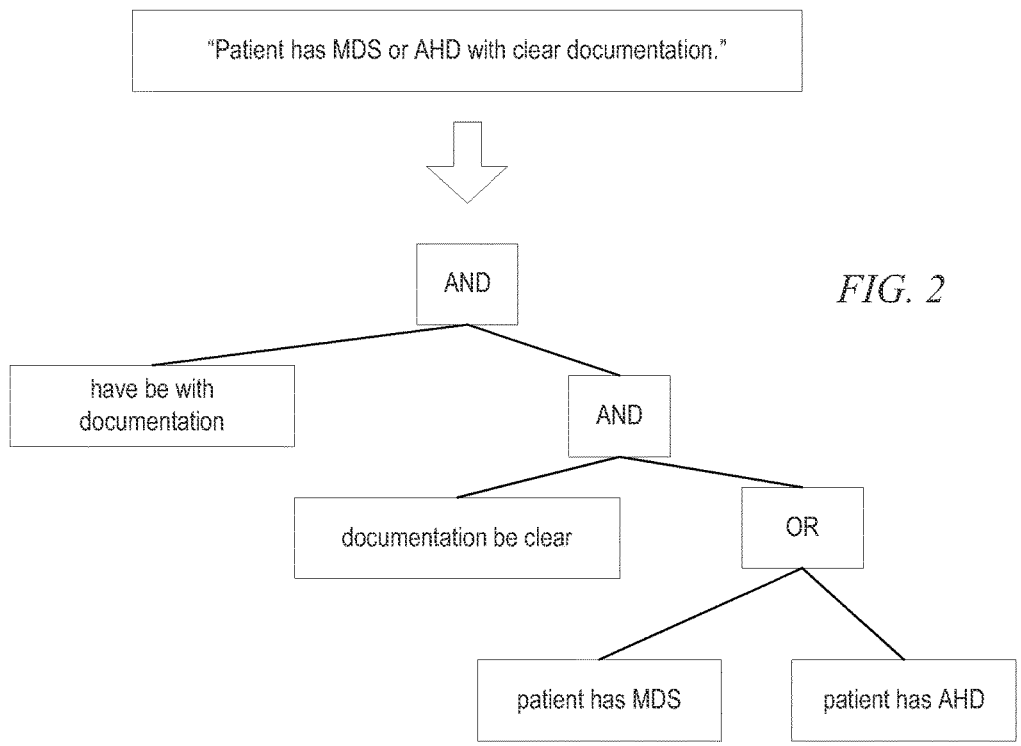

For example, consider the sentence "Patient has MDS or AHD with clear documentation." A logical parse of this sentence by the logical parser of the illustrative embodiments is illustrated in FIG. 2. Using an external source of information, such as a medical record database, for example, one or more queries, generated based on the input sentence, may be applied to the external source to find related information, such as the patient's known illnesses. From the information obtained from the external source, it may be determined that the patient has MDS as one of its known illnesses and given this fact, the evidential support measure value(s) and relevance measure value for the node "Patient has MDS" in the logical parse of FIG. 2 needs to be set to an appropriate fuzzy logic value indicating that there is some amount of supporting evidence for the conclusion that the patient does in fact have MDS. However, in order to do this, a mapping between two separate domains is required, i.e. a mapping between the logical parse and the knowledge gained from the external source. The illustrative embodiments provide mechanisms for setting such values based on such a mapping.

In one illustrative embodiment, during the initial NLP processing of the unstructured natural language content, the NLP mechanisms generate annotations that are added to the nodes of the syntactic/semantic parse generated by the NLP mechanisms. For example, the terms MDS and AHD may each be associated with a predetermined annotation of "Medical Concept" such that specific annotations of "Medical Concept: MDS" and "Medical Concept: AHD" are generated, i.e. Annotation: Value pairs. The particular annotations may be specific to the domain or subject matter area in which the unstructured natural language input is being processed. The annotations may be used to correlate or map portions of the input natural language content with content of the external source. The use of annotations during natural language processing is generally known in the art and therefore, a more detailed explanation of how annotations are added to the analyzed natural language content will not be provided herein.

Thus, the syntactic/semantic parse generated by the NLP mechanisms comprises annotations associated with the semantic terms such that the annotations are utilized to delimit spans of text that are critical in the reasoning process. The annotations in the syntactic/semantic parse may be used as a basis for querying an external data source in order to calculate the amount of evidential support for each annotation (both for truth and falsity). The result of the evidential support calculation may then be associated with the NLP annotations. The evidential support calculation indicates the degree to which the annotation is met (truth) or is not met (false) based on the additional information obtained from the external source in support of, or against, the annotation being correct. In a medical context, it should be appreciated that when it is stated that an annotation is met or has "truth" or is not met, i.e. "false," this is referring to the implied semantic relationship that the "patient has [medical concept]" such that if the annotation is met (truth) then the implied semantic relationship is true, i.e. the patient has that medical concept, whereas if the annotation is not met (false) then the implied semantic relationship is false, i.e. the patient does not have that medical concept. Similar implied semantic relationships may be evaluated using the annotations being met/not met (truth/false) in other domains as well depending upon the particular implementation of the illustrative embodiments.

The syntactic/semantic parse is then subjected to the logical parsing by the logical parser to extract logical operators and atomic logical terms in the manner previously described above to generate a logical parse. The evidential support measures associated with the annotations are mapped to corresponding atomic logical terms in the logical parse using an overlap of text indices, i.e. the bit locations of the atomic logical terms and the bit locations to which the annotations correspond are maintained so that the atomic logical terms in the logical parse may be mapped to annotations corresponding to those atomic logical terms, and their associated evidence measures. Thus, for example, an annotation of "Medical Concept: MDS" may be mapped to the atomic logical term "Patient has MDS" in the logical parse. Based on the mapping, the evidence measure value calculated as well as any relevance measure may be transferred or associated with the atomic logical term. Reasoning operations may then be performed based on the evidence measures and relevance measures associated with the various atomic logic terms of the logical parse.

In calculating the supporting evidence measure values, various types of calculations may be utilized to generate such supporting evidence measure values based on the evidence found in one or more external sources of information. Evidential support calculations are generally known in the art of Question and Answer (QA) systems which look to a corpus of information to provide support for candidate answers that are generated for input questions. Similar calculations may be performed in the present invention for calculating supporting evidence measures for annotations. These evidence measure calculations may be based on the types and number of occurrences of matching key terms and annotations within the external source of information, an analysis of the context in which key terms or annotations are utilized within the external source of information, e.g., negative contexts may be indicative of a lower supporting evidence measure whereas positive contexts may be indicative of a higher supporting evidence measure, the use of synonyms or antonyms, related concepts or terms being present, e.g., symptoms of a disease being related to the disease, and the like.

Different degrees of support may be calculated based on the nature of the evidence such that, for example, if exact term matching is found, then a higher degree of supporting evidence is determined to exist than if only a synonym is found or related concepts/terms are found. This is true for both supporting evidence for, and supporting evidence against, an atomic logical term. Thus, if a patient medical record states that the patient does not have MDS, then the supporting evidence measure fuzzy value for falsity of the annotation "Medical Concept: MDS" is relatively large and is mapped to the corresponding atomic logical term "Patient has MDS."

With regard to relevance measures, the mechanisms of the illustrative embodiments, by default, consider all atomic logical terms in the logical parse, i.e. all nodes in the logical hierarchical model of the natural language content, to be fully relevant, i.e. relevance measure fuzzy logic value of 1.0. Then, for each atomic logical term in the logical parse, a determination is made as to whether the atomic logical term intersects with any NLP annotations generated by the NLP mechanisms during the initial syntactic/semantic parse of the natural language content, i.e. a determination is made as to whether the atomic logical term has an associated annotation. If not, then the relevance measure for the atomic logical term and its corresponding node is re-set to 0.0, i.e. fully irrelevant, thereby removing the atomic logical term and node from further consideration during the reasoning process.

An external source of information, such as the corpus of documents or the like used to generate the supporting evidence measures, may be used to calculate a fuzzy value for the relevance measure of each of the atomic logical terms and corresponding nodes still remaining, i.e. those that intersect with an annotation generated by the NLP mechanisms. For example, an inverse document frequency (IDF) value may be calculated for the occurrence of the atomic logical terms in the documents of the outside source or corpus, and this IDF value may be used to calculate a measure of relevance. That is, an IDF value that is high indicates a high level of relevance since the atomic logical term occurs rarely in the documentation and thus, is more likely to be relevant, whereas an IDF value that is low indicates a relatively higher frequency of use of the atomic logical term and thus, a lower relative relevance. Other measures for calculating relevance may be used without departing from the spirit and scope of the illustrative embodiments. For example, an external dictionary of domain terms that may be used to determine domain-relevance of terms may be utilized to identify and associated relevance measures for terms. Other external data structures identifying known sets of terms or syntactic modifiers which have little practical impact on the semantics of a sentence in a domain may be used to mark terms as irrelevant to the relevance measures. For example, in the medical domain, one could mark all atomic terms that lack medical terms as irrelevant or one could train a classifier on features of atomic medical terms to determine relevance.

Thus, in order to set the values for supporting evidence measures and relevance measures of nodes/atomic logical terms of a logical parse, in one illustrative embodiment, the following operations are followed:

1. Initially the mechanisms of the illustrative embodiments receive a natural language text as input which is then syntactically and semantically parsed and analyzed;

2. Annotations are placed on spans of text that are known to be relevant for reasoning, i.e. corresponding to previously defined annotations and corresponding terms specified for the particular domain with which the natural language text is associated or the domain in which the mechanisms of the illustrative embodiments are designed to operate, e.g., a medical domain, financial domain, legal domain, etc.;

3. Each annotation is then associated with a support value indicating the degree to which the annotation is or is not met, i.e. found in outside documentation, as may be determined from a comparison of text of the annotation with text of an outside source or corpus of information (e.g., patient medical records);

4. The mechanisms of the illustrative embodiments then logically parse the input natural language text to extract logical operators and logical atomic terms using the logical parser previously described above;

5. The mechanisms then intersect the annotations with the atomic logical terms based on the indices (bit indices) of the text of the annotations. Relevance measures for the atomic logical terms that intersect with annotations are then calculated (i.e., when producing the logical parse tree, link tokens are retained in each logical term to the original text from which the logical term originated and this operation takes annotations on the original text and identifies the terms that contain intersecting tokens);

6. Based on the intersection of the annotations with the atomic logical terms, supporting evidence measures and relevance measures are transferred from the annotations to the atomic logical terms—possibly combining measures from various annotations to generate a combined measure of supporting evidence and/or relevance (e.g., the measures may be AND'd, OR'd, or averaged together; in one illustrative embodiment the measures are AND'd together, e.g., "True, True=True", "True, True, False=False", "True, Missing=Missing", "False, True, Missing=False," etc.); and 7. Reasoning operations may then be performed based on the supporting evidence values and relevance values associated with the nodes of the logical parse.

FIGS. 3A-3D illustrate one example application of the above method for assigning supporting evidence and relevance values to nodes of a logical parse generated by the logical parser previously described above. As shown in FIG. 3A, in this example an external source of information comprises an electronic medical record (EMR) system which provides an EMR 310 in which the patient is indication to have MDS, i.e. "MDS: true", but is also indicated to not have AHD, i.e. "AHD: false". A natural language text or content 320 that contains logic that is to be reasoned about is received by the mechanisms of the illustrative embodiments which, in this example, is the statement "Patient has MDS or AHD with clear documentation." For example, this statement may be a requirement for inclusion in a medical trial and the mechanisms of the illustrative embodiments may be searching through electronic medical records to identify which patients are valid candidates for participation in the medical trial.

As shown in FIG. 3B, as part of operation 2 above, NLP annotations are created on the natural language text according to an ontology for the particular domain of interest, e.g., a medical domain in the present example. In the depicted example, "Medical Concept" annotations are generated such that the annotations "Medical Concept—MDS" and "Medical Concept—AHD" are associated with the natural language text. The annotations have associated bit indicies (not shown) indicating the starting bits of the natural language text for the terms with which the annotations correspond. Similarly, the terms in the natural language text have corresponding indicies specifying where in the natural language text the term exists. This allows a mapping of annotations to individual terms within the natural language text.

As shown in FIG. 3C, as part of operation 3 above, the EMR is then cross-referenced with the annotations generated in operation 2. Thus, for the EMR for the patient, a value of "true" (or 1.0) is associated with the annotation "Medical Concept—MDS" and a value of "false" (or 0.0) is associated with annotation "Medical Concept—AHD." It should be appreciated that while fully true (1.0) and fully false (0.0) fuzzy values are being used in the depicted example, these values may be between 0.0 and 1.0 depending upon the supporting evidence present in the EMR 310, e.g., if there is evidence for or against the Medical Concept—MDS being true, then a value of 0.5 may be associated with MDS in the EMR 310.

Figure 3D:
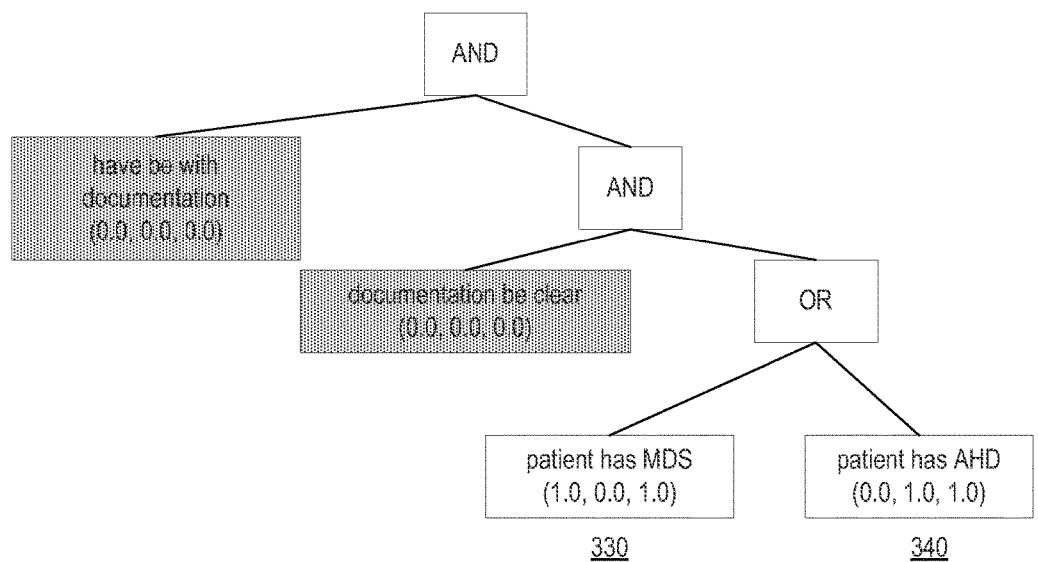

The natural language text is then parsed, in accordance with operation 4 above, by the logical parser of the illustrative embodiments to generate the logical parse shown in FIG. 3D. It should be noted that the terms in the logical parse trees are not necessarily human-readable text but instead represent a logical breakdown of from the syntax of the language which may produce extraneous terms which are correct but awkward for humans, e.g., "have be with documentation"

In accordance with operation 5 above, the atomic logical terms in the logical parse of FIG. 3D are intersected with the natural language text and associated annotations using the text indices. This creates a bridge between the logical parse of FIG. 3D and the natural language text. Since each of the atomic logical terms maintain the indices of the terms from which they were derived from the original natural language text, mappings may be generated between annotations and the atomic logical terms' corresponding nodes in the logical parse of FIG. 3D. For example, in the depicted example, the following mappings may be generated:

1. Annotation "Medical Concept—MDS" fully intersect with logical node "Patient has MDS".

2. Annotation "Medical Concept—AHD" fully intersects with logical node "Patient has AHD".

Furthermore, a relevance measure fuzzy logic value may be calculated for each of the logical nodes of the logical parse based on the intersection of annotations with the atomic logical terms. That is, for those logical nodes that do not intersect with an annotations, i.e. an annotation does not correspond to any of the terms of the atomic logical term, the relevance measure fuzzy logic is set to a fully irrelevant value, e.g., 0.0. For those logical nodes that do intersect with an annotation, the relevance measure is set by comparing the terms of the atomic logical term of the logical node and/or annotation to text in an outside source, e.g., corpus or the like. The relevance measure may be calculated according to any suitable function for the particular implementation. In one illustrative embodiment, relevance is measured according to the inverse document frequency (IDF).

In accordance with operation 6 above, supporting evidence measures and relevance measures are transferred from the annotations to the corresponding logical nodes based on the determined mappings. Thus, in this case, supporting evidence measure of "true" is transferred to logical node 330 and supporting evidence measure of "false" is transferred to logical node 340. Similarly, relevance measures, which are initially set to a fully relevant value for all nodes of the logical parse, are re-set based on the intersection with annotations. In this example, only nodes 330 and 340 intersect with annotations and thus, all other nodes of the logical parse are re-set to a relevance measure of fully irrelevant, effectively removing them from further consideration during the reasoning process. In this example, this removes the consideration of whether clear documentation is present as this, as noted above, has been determined to be an irrelevant fact.

The remaining nodes 330 and 340 have their supporting evidence values set according to the transfer of values from the annotations. Again, these may be fuzzy values that are calculated based on a combination of supporting evidence measure fuzzy values for all of the annotations that apply to the particular node 330 or 340. In this simplified example, node 330 is given a truth supporting evidence measure of 1.0 (known to be true) and a false truth supporting evidence measure of 0.0 (known to not be false). Moreover, the relevance measure of nodes 330 and 340 are set to 1.0 since the EMR, which is the outside source for this example, has a single instance of each of the terms "MDS" and "AHD" and thus, the IDF of these terms is 1.0. Thus, node 330 may have a knowledge tuple of (1.0, 0.0, 1.0) whereas node 330 may have a knowledge tuple of (0.0, 1.0, 1.0) set, where the knowledge tuple comprises the format (truth fuzzy logic value, false fuzzy logic value, relevance fuzzy logic value). The knowledge tuple represents the knowledge of the supporting evidence for the node being considered true or false, i.e. supportive or not supportive of the node being true or false, and the relevance of the node to reasoning operations that may operate on the logical parse.

Having generated the logical parse and associated each of the nodes of the logical parse with an initial set of supporting evidence measure fuzzy logic values and relevance measure fuzzy logic values, these values may be propagated throughout the logical parse in accordance with propagation methodologies and pre-established rules to distribute knowledge of logical relationships, evidence, and relevance throughout the logical parse. As a result, reasoning can be performed on the logical parse to derive additional knowledge contained within the logical language of the input natural language content as discussed hereafter.

IV. Propagation of Supporting Evidence Measure Fuzzy Logic Values

Propagation of supporting evidence measures is important in a reasoning system, such as is provided by the mechanisms of the illustrative embodiments, because as facts become known in a logical parse of a natural language content, logical deductions can be made. To make such logical deductions, the support of learned facts is propagated through the logical parse such that the propagation improves the support of logical terms in the logical parse, i.e. new_value=max(old_value, computed_value). It should be noted that propagation of supporting evidence measures never decreases the supporting evidence measure of an atomic logical term but only either increases the supporting evidence measure or maintains the previously generated supporting evidence measure. Such is not true of relevance measure fuzzy logic values as will be described hereafter.

With the mechanisms of the illustrative embodiments, as discussed above, a portion of natural language content or text is received and processed through NLP mechanisms to generate an initial syntactic/semantic parse which is then used as a basis for generating a logical parse by a logical parser of the illustrative embodiments that represents the original natural language content or text as atomic logical terms and logical operators connecting such atomic logical terms. Initial supporting evidence measure fuzzy logic values and relevance measure fuzzy logic values are associated with the nodes of the logical parse, at least partially based on comparisons of terms and annotations with one or more outside sources of information. Thus, a logical parse with an initial assessment of support and relevance for each of the nodes of the logical parse is generated.

In accordance with further aspects of the illustrative embodiments, these initial fuzzy logic values for supporting evidence measures and relevance measures are propagated throughout the logical parse until no updates are further propagated. The propagation results in updates to the supporting evidence measure fuzzy logic values and relevance measure fuzzy logic values that then represent the new state of support and relevance for those corresponding nodes of the logical parse.

With regard to propagation of supporting evidence measure fuzzy logic values, again consider the illustrative embodiments as representing supporting evidence of a node of the logical parse as two separate supporting evidence fuzzy logic values, one for truth and one for falsity, each value being between 0.0 and 1.0. For example, using a format of (truth, falsity) for such supporting evidence measures, an example supporting evidence measure may be (0.9, 0.0) indicating 90% confident that the corresponding node is true. If a node is true, this means that the subtree of which it is the head is true. Similarly, as another example, a supporting evidence measure of (0.2, 0.9) indicates a 20% confidence that the node is true (weak evidence), and a 90% confidence that the node is false. In the case of an evidence measure of (0.1, 0.1) it is highly uncertain if the node is true or false (very weak evidence either way) and in the case of an evidence measure of (0.9, 0.9) there is highly conflicting evidence that the node is both true and false. This representation of supporting evidence measures is referred to herein as evidential support.

As noted above, it should be observed from the above, that using this representation of evidential support, lack of evidence or knowledge is specified by a value of 0.0 and absolute evidence is indicated by a value of 1.0. Confliction is again indicated whenever there is some evidence for truth and some evidence for falsity, although the degree of confliction may be measured by the similarity of the conflicting truth or false supporting evidence measures and where on the spectrum from 0.0 to 1.0 these values lie, e.g., conflicting values at the lower end of the spectrum may be more indicative of simply weak supporting evidence either way rather than an actual conflict whereas conflicting values at the higher end of the spectrum may be more indicative of actual conflicts. It is again important to recognize that these values are not probabilities or degrees of truth and thus, do not necessary sum to 1.0, i.e. simply because the truth value is 0.8 does not mean that the false value must be 0.2. To the contrary, these values represent a degree of confidence that the conditions of a node are met or not based on a correlation with external sources of information and thus, the values are not necessarily tied to one another and are in fact separate and independent measures of supporting evidence for or against the conditions of the node being met.

With the mechanisms of the illustrative embodiments, evidential support fuzzy logic values are propagated across logical operators of the logical parse and may be propagated downwards, upwards, and sideways in the logical parse's hierarchical representation, from node to node. The manner by which these evidential support fuzzy logic values are propagated may be different dependent upon the particular logical operator over which the propagation is being performed. Thus, for example, in the logical parser discussed above, the logical parse is comprised of atomic logical terms connected by logical operators of the type OR, AND, and NOT. Different propagation rules may be established for each of these logical operators such that propagation rules for OR logical operators are different than propagation rules for AND logical operators, and propagation rules for NOT logical operators may be different from one or both of the propagation rules for OR and AND logical operators.

FIGS. 4A-4C illustrate evidential support fuzzy logic value propagation rules for OR logical operators in accordance with one illustrative embodiment. In the depictions in FIGS. 4A-4C, it should be appreciated that while the nodes representing the logical operators themselves are shown as having supporting evidence measures, these are in fact the supporting evidence measures of the parent node of the logical operator node, which is not shown in these figures for simplicity. Thus, the logical operator node itself gains supporting evidence measures by inheriting the supporting evidence measures of its parent through propagation. Similarly, when the figures show propagation values associated with the logical operator nodes, these are propagated to the parent of the logical operator node.

With regard to downward propagation of evidential support fuzzy logic values for OR logical operators, the truth supporting evidence measure fuzzy logic value (hereafter referred to as the "truth value") of child nodes of the logical OR operator is not updated based on the parent's truth value, but instead the falsity supporting evidence measure fuzzy logic value (hereafter referred to as the "falsity value") of the child nodes are updated to match the parent node's falsity value. Thus, as shown in FIG. 4A, the parent node 410 has a supporting evidence measures (truth, falsity) of (0.7, 0.2) and the 0.2 falsity value is propagated to nodes 412 and 414.

With regard to upward propagation of evidential support fuzzy logic values for OR logical operators, the maximum truth value of the child nodes is propagated up to the parent node and the minimum false value of the child nodes is propagated up to the parent node. Thus, as shown in FIG. 4B, child node 422 has supporting evidence measures of (0.2, 0.1) while child node 424 has supporting evidence measures of (0.8, 0.3). The maximum of the truth values of these two nodes is 0.8 while the minimum false value of these two nodes is 0.1. Thus, these values being propagated upward causes the parent node 420 to have supporting evidence measure of (0.8, 0.1).

With regard to sideways propagation of evidential support fuzzy logic values for OR logical operators, a sibling node (node at same level of hierarchical representation) has its truth value updated as the product of the source node's falsity value and the parent node's truth value. This is a projection of disjunctive syllogism onto a truth/falsity representation, however it should be appreciated that other functions for updating sibling node truth values may be used without departing from the spirit and scope of the present invention.

Thus, in the example shown in FIG. 4C, the supporting evidence measures of node 432 are (x, 0.7) where the value of x is irrelevant to the example, and node 434 are (y, 0.8) where again the value of y is irrelevant to the example. The supporting evidence measure of the parent node 430 is (1, 0). Thus, the truth value for child node 432 is set to the product of the falsity value of sibling child node 434 and the truth value of parent node 430. Thus, the truth value for child node 432 is set to 0.8 (0.8*1). Similarly, the truth value for child node 434 is set to the product of the falsity value of sibling child node 432 and the truth value of parent node 430 such that the truth value for child node 434 is set to 0.7 (0.7*1).

FIGS. 5A-5C illustrate evidential support fuzzy logic value propagation rules for AND logical operators in accordance with one illustrative embodiment. As shown in FIG. 5A, with regard to downward propagation of evidential support fuzzy logic values for AND logical operators, the falsity value of child nodes of the logical AND operator is not updated based on the parent's falsity value, but instead the truth value of the child nodes are updated to match the parent node's truth value. Thus, as shown in FIG. 5A, the parent node 510 has a supporting evidence measures (truth, falsity) of (0.7, 0.2) and the 0.7 truth value is propagated to nodes 512 and 514.

With regard to upward propagation of evidential support fuzzy logic values for AND logical operators, the minimum truth value of the child nodes is propagated up to the parent node and the maximum false value of the child nodes is propagated up to the parent node. Thus, as shown in FIG. 5B, child node 522 has supporting evidence measures of (0.2, 0.1) while child node 524 has supporting evidence measures of (0.8, 0.3). The minimum of the truth values of these two nodes is 0.2 while the maximum falsity value of these two nodes is 0.3. Thus, these values being propagated upward cause the parent node 520 to have supporting evidence measure of (0.2, 0.3).

With regard to sideways propagation of evidential support fuzzy logic values for AND logical operators, a sibling node has its falsity value updated as the product of the source node's truth value and the parent node's falsity value. Again, this is a projection of disjunctive syllogism onto the truth/falsity representation and other functions may be used without departing from the spirit and scope of the illustrative embodiments. Thus, in the example shown in FIG. 5C, the supporting evidence measures of node 532 are (0.8, x) where the value of x is irrelevant to the example, and node 434 are (0.6, y) where again the value of y is irrelevant to the example. The supporting evidence measure of the parent node 530 is (1, 0.5). Thus, the falsity value for child node 532 is set to the product of the truth value of sibling child node 534 and the falsity value of parent node 530. Thus, the falsity value for child node 532 is set to 0.3 (0.6*0.5). Similarly, the falsity value for child node 534 is set to the product of the truth value of sibling child node 532 and the falsity value of parent node 530 such that the falsity value for child node 534 is set to 0.4 (0.8*0.5).

Figure 6:
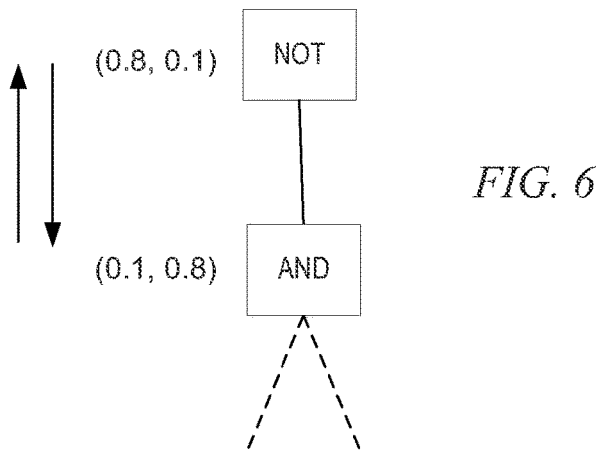
FIG. 6 illustrates the propagation of supporting evidence measures for a NOR logical operator in accordance with one illustrative embodiment.

FIG. 6 illustrates evidential support fuzzy logic value propagation rules for NOT logical operators in accordance with one illustrative embodiment. As shown in FIG. 6, downwards and upwards propagation is accomplished for NOT logical operators by swapping the truth and falsity values of the parent and child nodes. Thus, as part of a downward propagation, if parent node 610 has supporting evidence values of (0.8, 0.1), then child node 620 has supporting evidence values of (0.1, 0.8) where the truth and falsity values of the parent node have been swapped. Similarly, as part of an upward propagation, if the child node 620 has supporting evidence values of (0.1, 0.8), then the parent node 610 has supporting evidence values of (0.8, 0.1) where the child node's truth and falsity values are swapped.

Figure 7A:
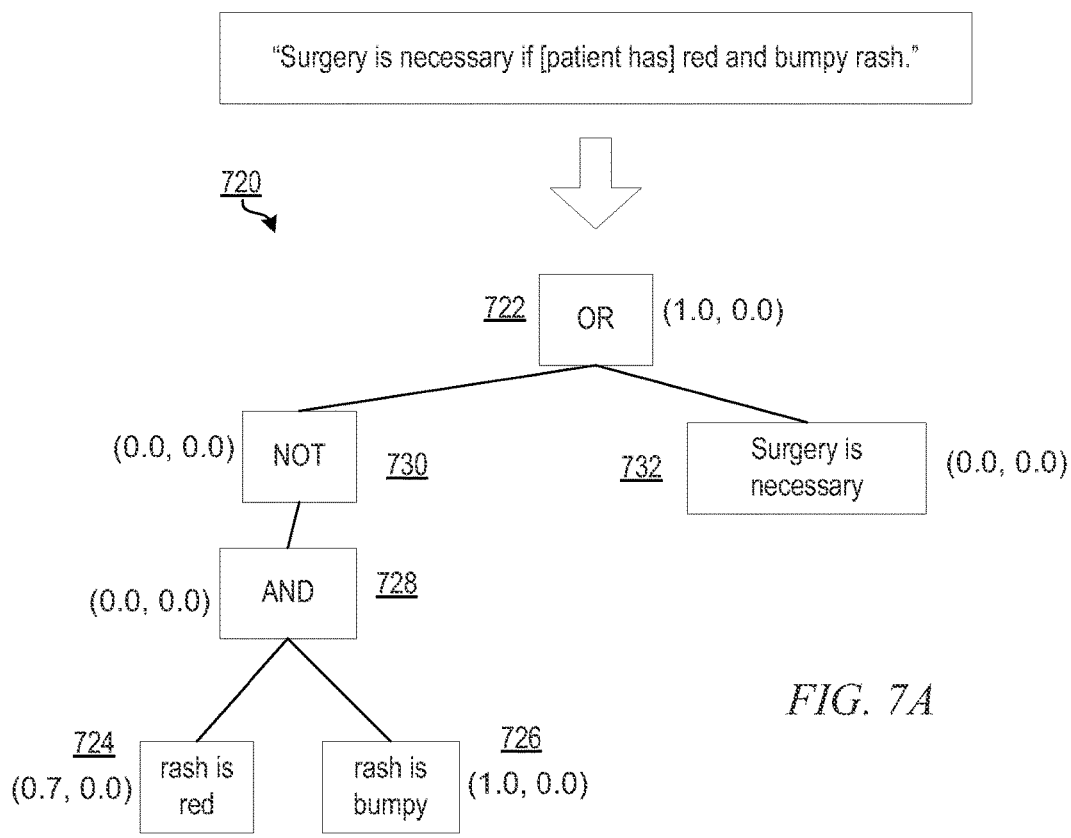
FIGS. 7A-7B illustrates an example in which the propagation rules outlined in FIGS. 4A-6 are applied in accordance with one illustrative embodiment.
Figures 7B, 8:
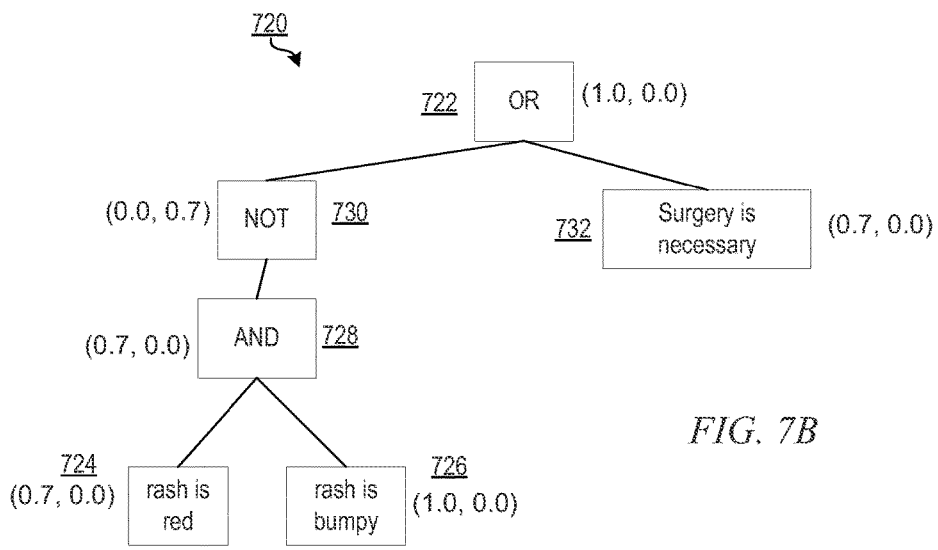
FIG. 8 is an example table diagram illustrating a summary of the propagation rules applied to the various logical operators in accordance with one illustrative embodiment.

FIGS. 7A-7B illustrates an example in which the propagation rules outlined in FIGS. 4A-6 are applied in accordance with one illustrative embodiment. FIG. 7A illustrates an initial state of the logical parse while FIG. 7B illustrates the resulting logical parse after application of the propagation rules discussed above.

As shown in FIG. 7A, a subject passage 710 is submitted to the mechanisms of the illustrative embodiments which results in the logical parse 720 shown in FIG. 7A being generated to represent the subject passage 710, i.e. the passage "surgery is necessary if [patient has] red and bumpy rash." Initially, all of the truth and falsity values for the nodes of the logical parse 720 are set to (0.0, 0.0). As shown in FIG. 7A, from this initial zero setting, a set of initial truth values is generated by comparison of the atomic logical terms with an outside source of information. In one illustrative embodiment, this may be a ground truth table, a corpus of documents, and/or the like. As shown in FIG. 7A, through the operations of the illustrative embodiments, initial supporting evidence measure values are set for the nodes of the logical parse 720 such that node 722 has supporting evidence measure values of (1.0, 0.0), node 724 has supporting evidence measure values of (0.7, 0.0), node 726 has supporting evidence measure values of (1.0, 0.0), node 728 has supporting evidence measure values of (0.0, 0.0), as do nodes 730 and 732. Again, it should be appreciated that the logical operator nodes have supporting evidence measure values as determined by the evidential support propagated from the parent atomic logical term nodes.

As shown in FIG. 7B, propagation is performed downward, upward and sideways for each of the logical operators. With regard to downward propagation, through application of the OR logic operator propagation rules from node 722, the falsity value of node 722 is propagated down to nodes 724 and 726 which causes their falsity values to remain 0.0. Through upward propagation, the maximum true value and minimum false value is propagated upward but since node 722 already has the maximum true value of 1.0 and the minimum falsity value 0.0, the supporting evidence measures of node 722 do not change. For sideways propagation, the product of the falsity value of child node 724 with the truth value of parent node 722 results in a truth value of 0.0 for node 722 and the product of the falsity value of child node 726 with the truth value of parent node 722 results in a truth value of 0.0 for node. However, as noted above, supporting evidence fuzzy logic values are not decreased. Thus, the truth and falsity values for node 722 remain (1.0, 0.0).

Applying the AND propagation rules for node 728, upward propagation takes the minimum true value and maximum false value of nodes 724 and 726 and propagates those up to the AND node 728. Thus, the truth and false values of node 728 become (0.7, 0.0) where the 0.7 value comes from this being the minimum of 0.7 (from node 724) and 1.0 (from node 726) and where 0.0 comes from this being the maximum of the two 0.0 false values for nodes 724 and 726. Applying the propagation rules for the NOT node 730, the truth and false values for the node 728 are swapped to generate the values for the node 730, i.e. (0.7, 0.0) is swapped to generate the tuple (0.0, 0.7) for node 730.

For sideways propagation for the OR logic operator, to propagate the values of nodes 730 and 732, the truth value of the second child node is set through sideways propagation as the product of the first child node's false value and the true value of the OR node 722. Thus, in this case, since node 730's false value is 0.7 and the OR node 722 has a truth value of 1.0, the truth value of node 732 is set to 0.7. Similarly, since the node 732 has a false value of 0.0 and the OR node 722 has a truth value of 1.0, the truth value of node 730 is set to 0.0, but it is already 0.0 and thus, would not be changed. If the truth value of node 730 had been a non 0.0 value, the value still would not have been changed since supporting evidence fuzzy logic values are not decreased through propagation.

FIG. 8 is an example table diagram illustrating a summary of the propagation rules applied to the various logical operators in accordance with one illustrative embodiment. In this table, the rows represent the truth value and falsity value of a node, respectively. The columns represent the operations for downward, upward, and sideways propagation of supporting evidence measure fuzzy logic values, i.e. truth value and falsity value, for the various logical operators OR, AND, and NOT. It should be noted that there is no column for the NOT logical operator in the sideways propagation column because there is no sideways propagation of supporting evidence measure fuzzy logic values for NOT logical operators.

V. Propagation of Relevance Measure Fuzzy Logic Values

In addition to propagation of supporting evidence measure fuzzy logic values, e.g., the truth and falsity values previously mentioned above, the mechanisms of the illustrative embodiments further provide for the propagation of the relevance measure fuzzy logic values associated with nodes of the logical parse throughout the logical parse. Through this mechanism, the relevance measure of each node in the logical parse can be managed so as to identify the nodes of the logical parse that are actually relevant to the reasoning operations being performed and eliminate the nodes of the logical parse that have little relevance from consideration during the reasoning operation.

With the mechanisms of the illustrative embodiments, each node in the logical parse generated by the logical parser is assigned an initial relevance measure fuzzy logic value. Initially all of the nodes are determined to be fully relevant, i.e. fuzzy logic value of 1.0. However, through an initial evaluation of the nodes, comparison of annotations and terms with external sources, or the like, these relevance measure fuzzy logic values (hereafter referred to as "relevance values") are modified to reflect a determined relevance of the node. A node's relevance value asserts how much influence the node has during the reasoning process and is ultimately consumed by downstream reasoner algorithms to effect how knowledge is computed and propagated throughout a knowledgebase.

With regard to propagation of relevance values, as with the supporting evidence fuzzy logic value propagation described above, propagation rules may be established for defining the way in which the relevance values are propagated from one node to the next in the logical parse. In one illustrative embodiment, the following propagation rules are implemented for relevance values:

1. The relevance value of a parent is set to the maximum relevance value of its children; and 2. The relevance value of a child must be less than or equal to the relevance value of its parent.

If one of these propagation rules is violated, then relevance propagation is considered "incomplete." As a result, these rules will be repeatedly applied until neither rule is violated by any of the nodes of the logical parse, such that relevance propagation is complete.

Figure 9A:
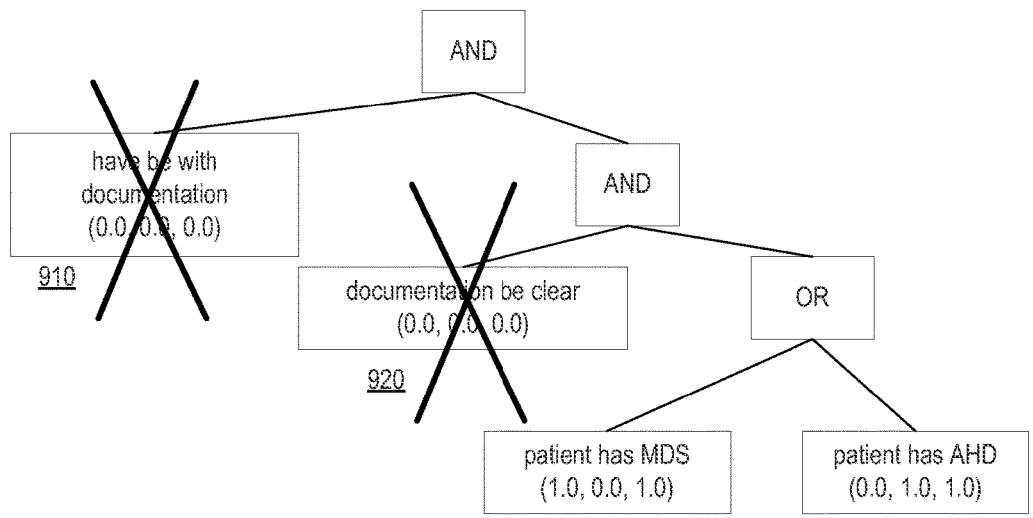
FIG. 9A illustrates the use of relevance values to eliminate irrelevant nodes of a logical parse in accordance with one illustrative embodiment.

FIG. 9A illustrates the use of relevance values to eliminate irrelevant nodes of a logical parse in accordance with one illustrative embodiment. The example illustrated in FIG. 9A uses the previously mentioned example statement "Patient has MDS or AHD with clear documentation." As shown in FIG. 9A, after generation of a logical parse by the logical parser of the illustrative embodiments, relevance values are assigned to the nodes of the logical parse in accordance with comparisons of terms, annotations, and/or the like, with one or more external sources of information. In the depicted example, a relevance value of 0 is assigned to the nodes 910 and 920 because they do not intersect with an annotation generated by the NLP mechanisms, whereas non-zero relevance values are assigned to nodes 930 and 940. The assignment of the relevance value of 0 to nodes 910 and 920 effectively removes these nodes from the logical parse for reasoning operations since it is determined that these nodes do not have significant relevance to the reasoning being performed.

As previously described above, supporting evidence measure fuzzy logic values are assigned to nodes of the logical parse. Using the example previously discussed above, since the EMR for the patient indicates that the patient has MDS and not AHD, the supporting evidence for node 930 is a non-zero fuzzy logic value. Since the relevance of nodes 910 and 920 eliminate those nodes from consideration during the reasoning operation, the relevance of nodes 930 and 940 are non-zero, and the supporting evidence of node 930 is non-zero while the supporting evidence of node 940 is zero or close to zero, the conditions of the statement "Patient has MDS or AHD with clear documentation" are satisfied even though there is no explicit evidence of "clear documentation" since the EMR indicates that the patient does have or most likely has MDS. Thus, additional reasoning may be made based on further reasoning statements or analysis, e.g., if a further reasoning statement is provided of the nature "if the patient has MDS or AHD, treatment is recommended" then a conclusion that treatment should be recommended may be generated based on the knowledge obtained from analysis of the natural language content "Patient has MDS or AHD with clear documentation."

Figure 9B:
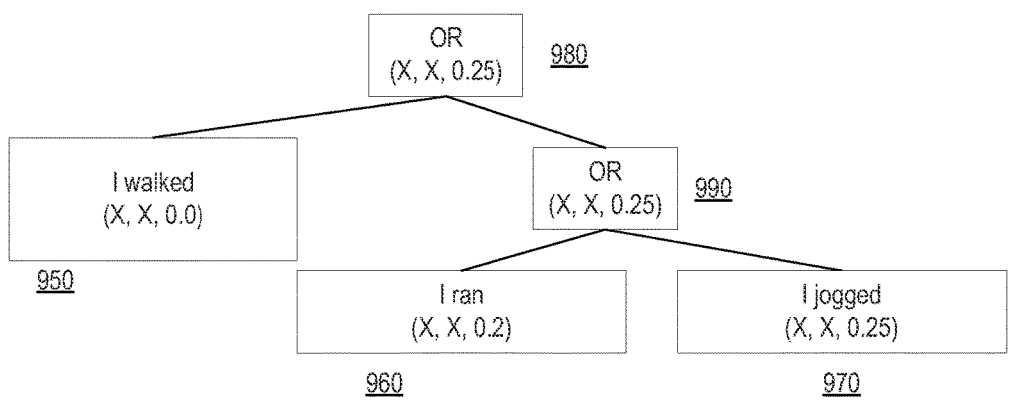
FIG. 9B illustrates the use of relevance propagation rules to propagate relevance values between nodes of a logical parse in accordance with one illustrative embodiment.

FIG. 9B illustrates the use of relevance propagation rules to propagate relevance values between nodes of a logical parse in accordance with one illustrative embodiment. In FIG. 9B, since the propagation of relevance fuzzy logic values is being demonstrated, values for the truth and false supporting evidence fuzzy logic values are set to "X" indicating that they are not of concern in this depiction. However, it should be appreciated that the setting and propagation of the supporting evidence fuzzy logic values would follow the operations previously described above.

The logical parse shown in FIG. 9B is for the statement "I walked, ran, or jogged." Assume that the relevance for node 950 "I walked" is initially set to 0, the relevance value for node 960 "I ran" is initially set to 0.2, and the relevance value for the node 960 "I jogged" is set to 0.25. Applying the relevance fuzzy logic value propagation rules, the parent OR node 990 of nodes 950 and 960 is set to the maximum of the relevance fuzzy logic values of nodes 960 and 970, i.e. 0.25, and the relevance value for node 980 is set to the maximum of nodes 950 and 990, i.e. 0.25.

Assume, as a new example, that the OR node 990 is now set to a relevance value of 0.25 but the relevance values for node 960 and 970 remain at their original initial setting of 1.0 (remembering above that all nodes are initially considered to be fully relevant). Through application of the propagation rules discussed above, the child nodes of node 990 must have a relevance score equal to or less than the parent node. As a result, in this example, nodes 960 and 970 would have their relevance values reduced to 0.25 so that they are equal to their parent node's relevance value. Nodes 950 and 980 may maintain their previous relevance values since they are not child nodes of node 990.

In essence, if a relevance value is assigned to a node and that relevance value is less than 1.0, the child node relevance values will be decreased to not exceed that of their parent node recursively. It should be noted that this will not affect any child node whose relevance value is already less than their parent node's relevance value.

Thus, in addition to the mechanisms previously described above for generating a logical parse, setting supporting evidence and relevance values, and propagating supporting evidence values throughout the logical parse, the illustrative embodiments further provide mechanisms for propagating the relevance values of the nodes of the logical parse. The relevance value determines how much influence a node may have during the reasoning process. A fully irrelevant node is effectively removed from the reasoning process. This facilitates reasoning over language in practical applications by ignoring superfluous facts, assertions, and logical relationships within natural language.

VI. Co-Reference Resolution in Logical Parse to Facilitate Knowledge Transfer

The above mechanisms of the illustrative embodiments provide for the ability to set and propagate supporting evidence values and relevance values amongst explicitly linked nodes in a logical parse in order to identify and propagate knowledge. In addition, the mechanisms of the illustrative embodiments provide additional functionality and operations for transferring knowledge between inherently connected nodes in disparate parts of the logical parse to thereby facilitated co-reference resolution. These additional mechanisms address the situation where two logical nodes convey the same or related knowledge, then their knowledge state can be combined such that if one node becomes true or false, the other node similarly becomes true or false. Stated another way, the supporting evidence measures of one node may be mapped to its inherently connected nodes in disparate portions of the logical parse. Doing so increases the connectivity of the knowledgebase and allows more logical deductions to be made during a reasoning process.

For example, consider these statements:
"If I'm not healthy, I will have to go to the doctor"
"I'm only healthy if I diet and exercise."
"I exercise but I don't diet."

By human intuition, one knows from these sentences and the knowledge they provide that this person needs to see a doctor because he is not healthy, i.e. because he does not both diet and exercise and only diets, as stated in statement 3 above, this person is not healthy in accordance with statement 2 above and thus, in accordance with statement 1 the person should see a doctor.

Figure 10:
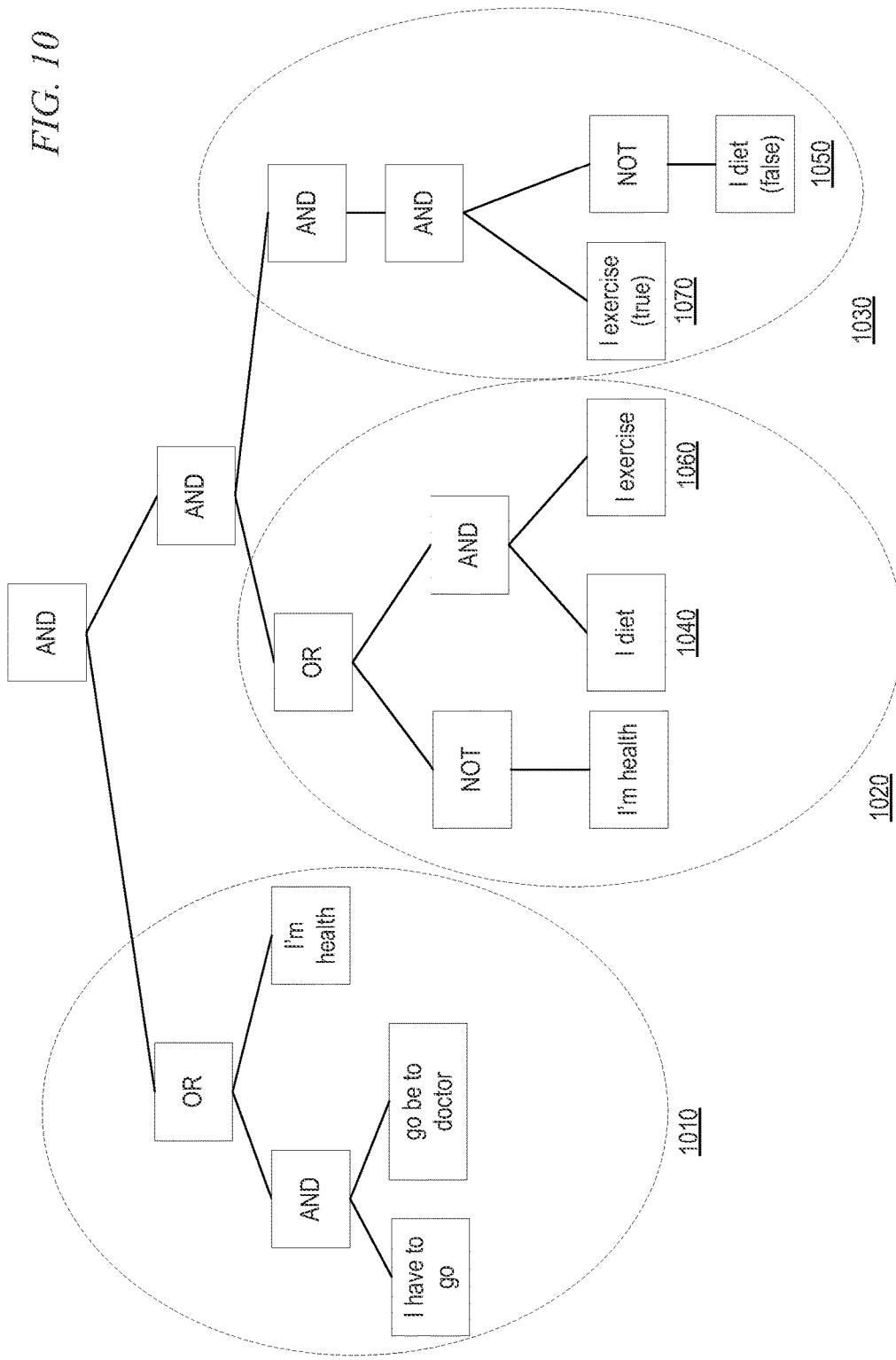
FIG. 10 is an example diagram for illustrating the issue associated with co-references in a logical parse.
Figure 11:
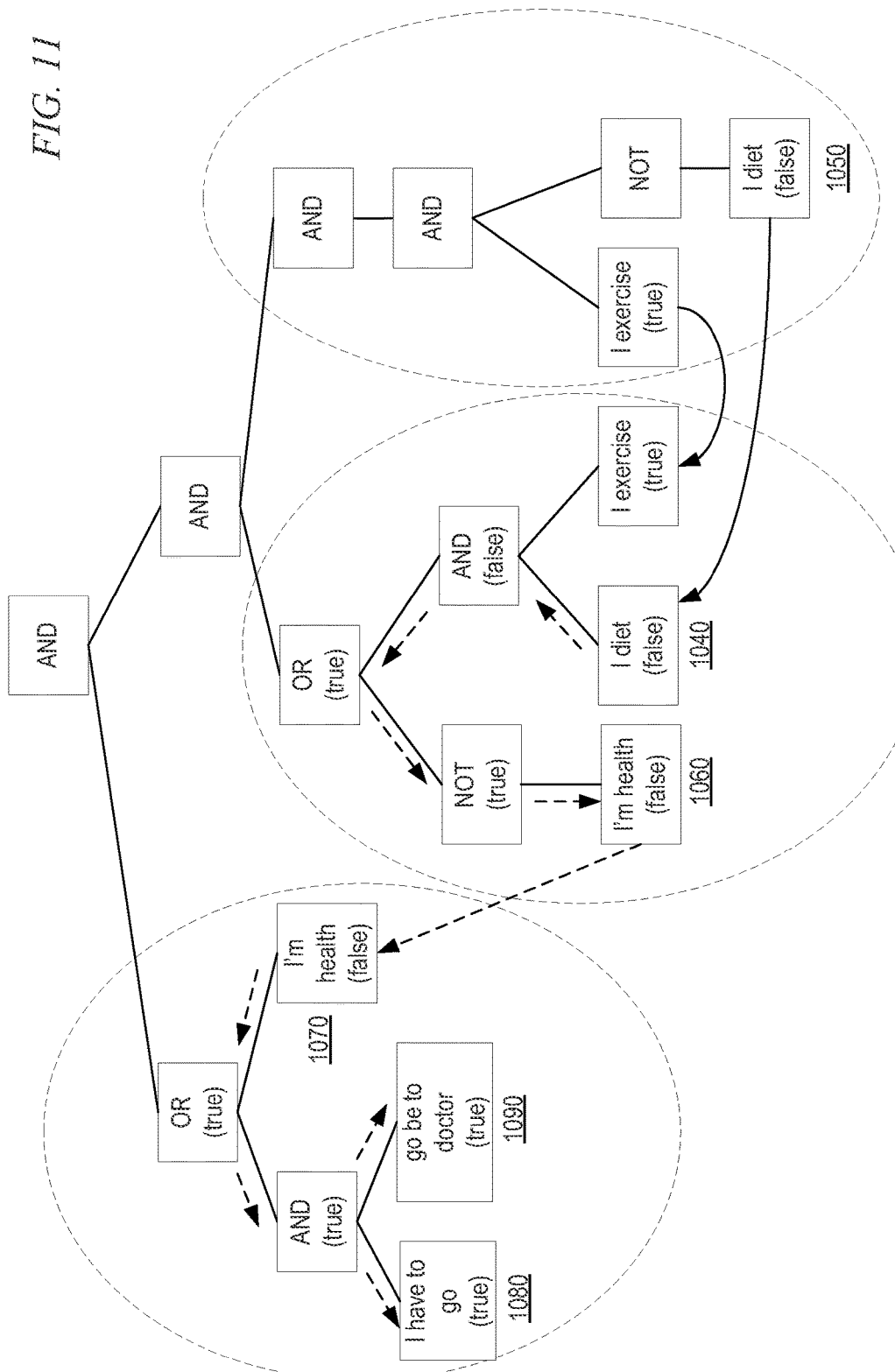

However, if one were to apply the previously described mechanisms for generating a logical parse of the statements, setting supporting evidence values and relevance values, and propagating these values, one arrives at the logical parse and knowledge state depicted in FIG. 10. In FIG. 10, sub-tree 1010 represents the logical parse and knowledge obtained from the first statement, sub-tree 1020 represents the logical parse and knowledge obtained from the second statement, and sub-tree 1030 represents the logical parse and knowledge obtained from the third statement.

It should be noted in FIG. 10 that there are two instances of the node and atomic logical term "I diet" in the logical parse, i.e. nodes 1040 and 1050. However, only one of these nodes has an associated non-zero supporting evidence value which, in this case, indicates that node 1050 has a false state, i.e. the falsity value associated with node 1050 is non-zero (represented in the figure by the parenthetical statement "false"). This knowledge needs to be transferred to the other "I diet" node 1040, which conveys the same meaning, otherwise the reasoning process may be incomplete since additional deductions could be made but are not without the transfer of this knowledge. The same is true of nodes 1060 and 1070, associated with atomic logical terms "I exercise", where node 1070 has a different level of evidential support (represented by a different type of shading in FIG. 10), but which must nonetheless be transferred to node 1060 due to the similarity of node 1060 conveying similar information.

For example, the knowledge that "I diet" node is false causes "I diet" node 1040 to be false as well which influences the deduction (as shown through the dashed arrows) "I'm healthy" node 1060 to be false. This in turn causes the "I'm healthy" node 1070 to be false which in turn influences the deduction of nodes 1080 and 1090 that the person needs to go to the doctor.

The illustrative embodiments provide mechanism for transferring such knowledge, or supporting evidence values, of one node to other inherently related nodes conveying the same meaning by connecting all of the nodes in a logical parse with a directional fuzzy match score. The fuzzy match score represents the strength of the match between a source node and a target node as expressed by the contents of the nodes, i.e. the content of the atomic logical terms. As a knowledge state is assigned to a node in the logical parse, e.g., a supporting evidence value or relevance value, this knowledge may be transferred across the match scores to disparate nodes in the logical parse's hierarchical model to achieve global connectedness of the concepts within the logical parse.

In one illustrative embodiment, the fuzzy match score of a node is represented as two independent fuzzy values, i.e. a matchTrue value and a matchFalse value. The matchTrue value represents how much of the truth value should be transferred from the source node to the target node and the matchFalse value represents how much of the falsity value should be transferred from the source node to the target node. A pair of matchTrue and matchFalse values may be provided for each directional relationship between a pair of nodes, i.e. each pair of source/target nodes, with a node being potentially a source for one pair and a target for another pairing of the same two nodes, e.g., given nodes A and B, two match relationships exist a match from A to B and a match from B to A. Both matchTrue and matchFalse values may be inversed, where truth from the source is transferred as falsity to the target and vice versa. Relevance values may be transferred from the source node to the target node as a factor of the maximum absolute match score.

The match score for a source/target node pair may take the form of two independent scores {matchTrue, matchFalse} as previously stated where each independent score may have a value ranging from −1 to 1, in one illustrative embodiment (where negative values mean an inverse match of truth to falsity and vice versa). The particular value of the matchTrue and matchFalse scores may be determined differently based on whether the nodes involved are nodes corresponding to atomic logical terms or nodes corresponding to logical operators. For nodes corresponding to atomic logical terms, the matchTrue and matchFalse scores may be calculated based on one or more comparisons of the atomic logical term of the source node and the atomic logical term of the target node. In performing such comparisons, various aspects of the atomic logical terms may be compared including, but not limited to:

1. Literal token strings;
2. Lemmatized token strings;
3. Synonyms/Antonyms of terms within the atomic logical terms;
4. Related concepts corresponding to the atomic logical terms, such as may be identified from an ontology, for example;
5. Similar semantic relationships;
6. Similar entities, as may be determined from entity/anaphora resolution, for example; and/or
7. Other NLP techniques for comparing the syntactic and semantic content of text.

From the evaluation of these various factors, a degree of matching of two portions of text is calculated with calculations both for and against a match between the two portions of text being generated. Thus, for example, a comparison of literal token strings may generate matchTrue and matchFalse score values indicating that the literal strings are not the same and do not match, i.e. matchFalse is higher than matchTrue, but then an evaluation based on synonyms/antonyms of terms within the two portions of text may indicate that in fact there is a greater amount of matching due to a synonym being used in one of the portions of text and thus, matchTrue is elevated higher than matchFalse. Various evaluations of the textual content of the atomic logical terms of nodes of a logical parse may be performed to determine a value to be applied to the matchTrue and matchFalse scores for a match relationship between two nodes of the logical parse's hierarchical model.

It should be appreciated, however, that the match score for a match relationship in one direction between two nodes is not necessarily the same for a match relationship between the same two nodes going in the opposite direction, i.e. with the source and target nodes switched. For example, consider two logical terms, "I drove a car" and "I drove a vehicle." The match score between these two terms should be very high because they are expressing very similar information, i.e. driving a vehicle of some sort, and in one case explicitly a car. However, it should be noted that the match score for the match relationship going from "I drove a car" (source) to "I drove a vehicle" (target) should be higher than the match score from "I drove a vehicle" (source) to "I drove a car" (target) because a car is necessarily a vehicle, but a vehicle is not necessarily a car.

Based on the match score for a match relationship between two nodes of a logical parse, an amount of the knowledge tuple is transferred from the source to the target as discussed above. For example, assume that node A has the following knowledge tuple (truth value, falsity value, relevance value) of supporting evidence values and relevance values (1.0, 0.0, 1.0). Further assume that the match score between node A and node B is [1, 1], i.e. a perfect match. In accordance with the illustrative embodiments, node B would be assigned the same knowledge tuple as node A, i.e. (1.0, 0.0, 1.0).

Consider another example where the two terms are "Vehicle is big" (node A) and "Car is small" (node B). Assume that node A has the knowledge tuple (1.0, 0.0, 0.5) and node B has the knowledge tuple (0.0, 0.0, 1.0). Further assume that the match score between node A and node B is

[−0.75, −0.75]. This match score makes sense because vehicle to car match may only be a 0.75 match since 75% of the time the term "vehicle" is referring to a car but 25% of the time, it may be reference another type of vehicle. Moreover, these two statements are expressing opposite things and thus, the negative match score value is indicative of an inverse match meaning that node A's truth value influences node B's falsity value, i.e., if the vehicle is big, then the car is not small. Thus, applying the match score to transfer knowledge from node A to node B would yield a knowledge tuple for node B of (0.0, 0.75, 0.625). The 0.75 is computed by 1.0 (node A's truth value)*0.75 (match score)=0.75 (node B's false value). The 0.625 value is computed as follows: node A's relevance score is 0.5 (or 0.5 irrelevant); 75% (0.75) of node A's irrelevance can be transferred to node B thereby giving a irrelevance value of 0.375 (0.75*0.50=0.375) which can be transferred to node B; Node B's relevance is 1.0 and thus, it is decreased by 0.375 which yields 0.625.

With regard to generating match score values for matchTrue and matchFalse scores in the case of nodes corresponding to logical operators, the mechanisms of the illustrative embodiments may further utilize various matching rules that compare the knowledge entailed by the children of the logical operator nodes in question. In one illustrative embodiment, the following match rules may be implemented.

In a first rule, if node A and node B are OR logical operators, and the knowledge entailed by node A's child nodes is a subset of the knowledge entailed by B's child nodes (as may be determined by the various comparisons previously discussed above), then node A's truth value is matched to node B. For example, if "I run or walk" is true (where "I run" and "I walk" are children of node A which is an OR logic operator), then "I run, walk, or jog" (where "I run", "I walk", and "I jog" are children of node B which is an OR logic operator) is also necessarily true because run and walk are entailed by both statements.

In a second rule, if node A and node B are AND operators, and the knowledge entailed by node A's children is a subset of the knowledge entailed by node B's children, then node A's falsity value is matched to node B. For example, if "I run and walk" is false, then "I run, walk, and jog" is also necessarily false because run and walk are entailed by both statements.

In a third rule, if node A is an OR operator and node B is an AND operator, and the knowledge entailed by node A's children is a subset of the knowledge entailed by node B's children, then the node A's truth value is matched to node B's falsity value. For example, if "I walk or run" is true, then "I do not walk, run or jog" is necessarily false because the latter entails opposite information (the former parses as OR and the latter parses as AND).

In a fourth rule, if node A is an AND operator and node B is an OR operator, and the knowledge entailed by node A's children is a subset of the knowledge entailed by node B's children, then node A's falsity value is matched to node B. For example, if "I walk and run" is false, then "I do not walk, run, and jog" is necessarily true because the latter entails opposite information (the former parses as AND and the latter parses as OR).

It should be noted that while additional matching scenarios are possible, they are unnecessary because they may be ultimately handled by the matching between logical terms or the matching between logical operators in the logical parse.

Figure 11:
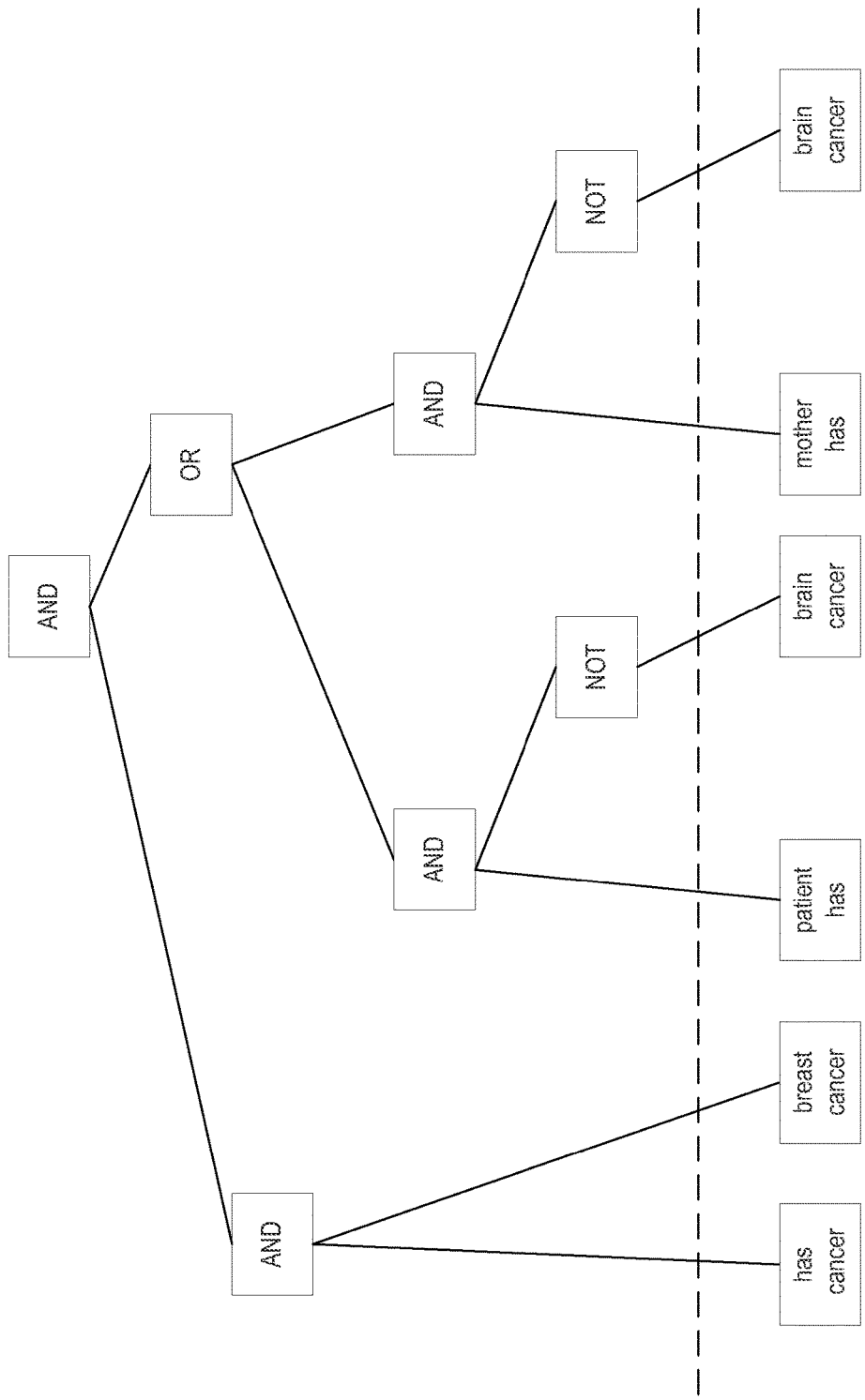
FIG. 11 is an example diagram illustrating a transfer of knowledge among co-references in a logical parse in accordance with one illustrative embodiment.

Thus, applying the above match score calculations and match score transfer mechanisms to the example shown in FIG. 10, the resulting logical parse as shown in FIG. 11 is generated. As shown in FIG. 11, one can see that the supporting evidence and relevance values for node 1050 have been transferred to node 1040. In this case, since these are nodes corresponding to atomic logical terms, rather than logical operators, the comparison of the text of the two atomic logical terms results in a perfect match of the atomic logical terms, i.e. "I diet" is the same in both nodes 1040 and 1050. Thus, the match score for the match relationship going from node 1050 to 1040 is [1, 1] and thus, the knowledge tuple of node 1050 is transferred to node 1040. It should be noted that if the match score were not representative of a perfect match, the maximum match value, e.g., either matchTrue or matchFalse, would be used to provide a factor for the amount of irrelevance of node 1050 being transferred to node 1040, e.g., if the match score were [0.5, 0.2], then the relevance (or irrelevance) value indicates that 50% of node 1050's irrelevance is transferred to node 1040. Thus, for example if node 1050's relevance is 0.6 (0.4 irrelevance), then 50% of 0.4=0.2 (20%) irrelevance is transferred to node 1040. This means that node 1040's relevance would be set to the minimum of its current relevance or 0.8.

It should be noted that truth/false values in the knowledge tuples only increase during propagation. Relevance values only decrease during propagation. Such increases and decreases are order independent. Thus, for example, assume that node A and nod B have a perfect match score and that node A is relevant (1.0) and node B is irrelevant (0.0). If node A is processed first, such that support is transferred from node A to node B, then node B's relevance will remain 0.0 because it never increases (relevance only decreases during propagation). Later in the process, node B will be processed and its support transferred to node A. During this operation, node A's relevance will decrease because of node B. Thus, the order of operations for processing nodes does not affect the propagation of knowledge and relevance values associated with the nodes.

Thus, in addition to the mechanisms described above with regard to the generation of a logical parse and the setting and propagation of supporting evidence (i.e. an evidential support reasoner) and relevance values (i.e. a relevance reasoner), the illustrative embodiments further provide mechanisms for resolving co-references (co-reference or intra-parse knowledge reasoner) in natural language content by providing directional fuzzy match score evaluation mechanisms for determining how knowledge associated with nodes in disparate portions of the logical parse may be influenced by one another due to similarity of information conveyed by those nodes. As a result, a higher connectivity in the resulting knowledgebase is achieved.

VII. Extensible Knowledge Reasoning Framework

In the above description of the illustrative embodiments, various knowledge reasoners operating on a logical parse of natural language content have been described, i.e. an evidential support reasoning mechanism, a relevance reasoning mechanism, and a co-reference (or intra-parse) knowledge reasoning mechanism, where these reasoning mechanisms or "reasoners" are logic that derive new knowledge from the logical parse. Each of these reasoners may be invoked to spread knowledge, i.e. logical deductions, throughout a logical parse by contributing knowledge state, e.g., the knowledge tuple, to individual logical nodes of the logical parse. However, invoking each of these reasoners may not fully maximize the logical deductions that can be made because the reasoners are inherently interdependent, i.e. the deductions in one reasoner may permit new deductions in any other reasoner. Thus, all reasoners must be repeatedly invoked to maximize all deductions without, of course, looping infinitely.

This is further complicated by the desire to keep records where the knowledge contributions from each reasoner may be tracked and observed in isolation from the other reasoners. This affords accountability and helps explain how knowledge spreads throughout a logical parse. Moreover, this is complicated by the fact that while the above three example reasoners are described herein, new reasoners may be developed which propagate knowledge in new ways and it is important to allow the addition of new knowledge reasoners in an extensible framework.

Thus, in addition to the mechanisms previously described, the illustrative embodiments further provide an extensible framework and method of iteratively invoking an extensible set of knowledge reasoners until knowledge stabilization is achieved, i.e. no further logical deductions can be made. Stabilization may be detected by the presence of an empty transaction when the reasoners are invoked, as will be described in greater detail hereafter. Furthermore, the illustrative embodiments provide a mechanism for representing knowledge within a set of transactions, wherein the collective set of transactions represents the current state of the knowledgebase. Each transaction is produced from exactly one invocation of a knowledge reasoner, wherein the transaction contains the knowledge contributions from that reasoner.

In one illustrative embodiment, a logical parse is obtained from natural language in a NLP system, such as previously described above. External knowledge is assigned to the logical parse via an initial transaction which sets the initial supporting evidence and relevance values to initial values as previously described above. A suite of reasoners, such as the evidential support reasoner, relevance reasoner, and/or coreference or intra-parse knowledge reasoner, as described above, are iteratively invoked to facilitate the reasoning process by propagating the knowledge tuples throughout the logical parse. This propagation is a type of reasoning because the propagating provides a resolution algorithm which is functionally equivalent to deduction. That is, reasoning is the process of taking existing knowledge, resolving this knowledge, and obtaining new knowledge from the resolution of the existing knowledge to form a new truth/falsity state of the nodes of the logical parse, which is the process discussed above. Each invocation of each reasoner produces exactly one transaction which is added to a knowledgebase, where the transaction comprises the knowledge updates and the order of the knowledge updates. The iteration terminates when all of the reasoners in the suite of reasoners produce an empty transaction. The final state of the knowledgebase is represented as the collective knowledge among all transactions, where the knowledge state of any given node is determined by the most recent transaction to assign evidential support to the node.

Figure 12:
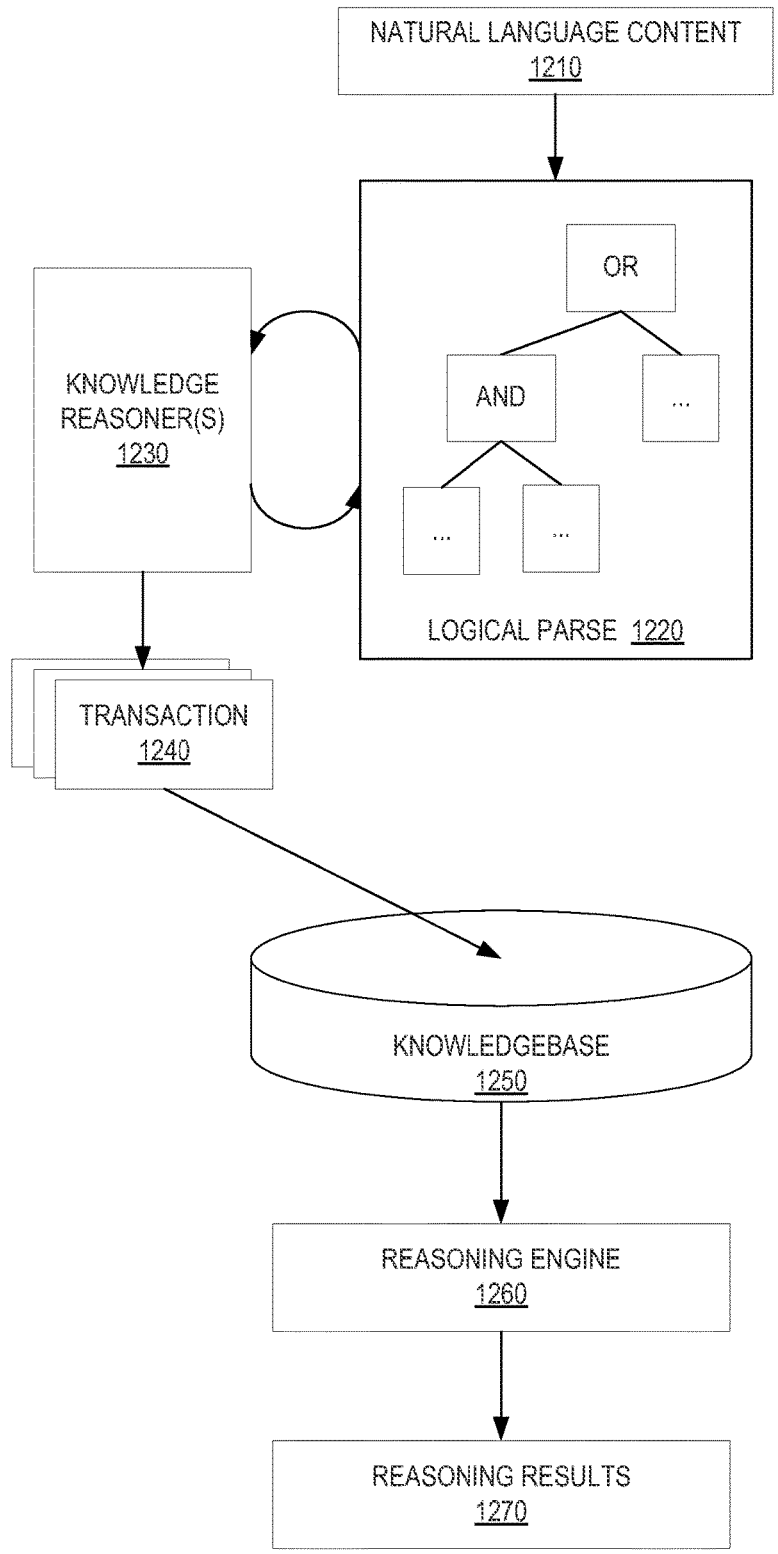
FIG. 12 illustrates a process for generating a knowledge-base using an extensible knowledge reasoning framework and transaction-based knowledge representation in accordance with one illustrative embodiment.

FIG. 12 illustrates a process for generating a knowledgebase using an extensible knowledge reasoning framework and transaction-based knowledge representation in accordance with one illustrative embodiment. As shown in FIG. 12, a logical parse 1220 of an input natural language content 1210 is generated using the logical parser 1215 previously described above. Initial evidential support and relevance values are assigned to the nodes of the logical parse 1220.

Then, in an iterative fashion, a suite of knowledge reasoners 1230 are applied to the logical parse 1220 to thereby spread knowledge, e.g., a knowledge tuple or portion of a knowledge tuple, throughout the logical parse 1220. The invocation of each knowledge reasoner 1230 on the logical parse 1220 results in a single transaction 1240 being generated for that knowledge reasoner 1230. The transaction itself maintains identifiers of a set of nodes affected by the corresponding knowledge reasoner 1230 and the new knowledge states of those identified nodes, e.g., new knowledge tuple.

Since the transactions 1240 store the set of nodes that are affected by a corresponding knowledge reasoner 1230, the iterative process may repeatedly apply the knowledge reasoners 1230 until all of the transactions 1240 generated by the application of the knowledge reasoners 1230 are empty, i.e. no nodes are affected by any of the knowledge reasoners 1230. The transactions 1240 are then added to a knowledgebase 1250. The current state of any node in the knowledgebase is determined by the most recent transaction that affected the node or some default state if no transaction has affected the node. The most recent transaction to affect a node may be determined, for example, by holding transactions on a stack such that the newest transactions are toward a top of the stack and oldest transactions are toward the bottom of a stack, thereby allowing the most recent (or newest) transactions to affect a node to be determined. The knowledgebase 1250 may then be processed by a reasoning engine 1260 that performs one or more reasoning operations on the information stored in the knowledgebase to extract and produce reasoning results based on the knowledge conveyed by the transactions stored in the knowledgebase in conjunction with the logical parse hierarchical model.

In this way, the current state of the knowledgebase 1250 is comprised of the collective knowledge within its transactions 1240. Moreover, one can analyze the transaction record in the knowledgebase 1250 to identify individual contributions to the knowledgebase state from the specific knowledge reasoners 1230 due to the separate transactions generated by each of the knowledge reasoners 1230. Furthermore, extensibility is made possible in that additional knowledge reasoners 1230 may simply be added to the suite of knowledge reasoners used with their application to the logical parse 1220 being separately identifiable by a corresponding individual transaction 1240.

Figure 13:
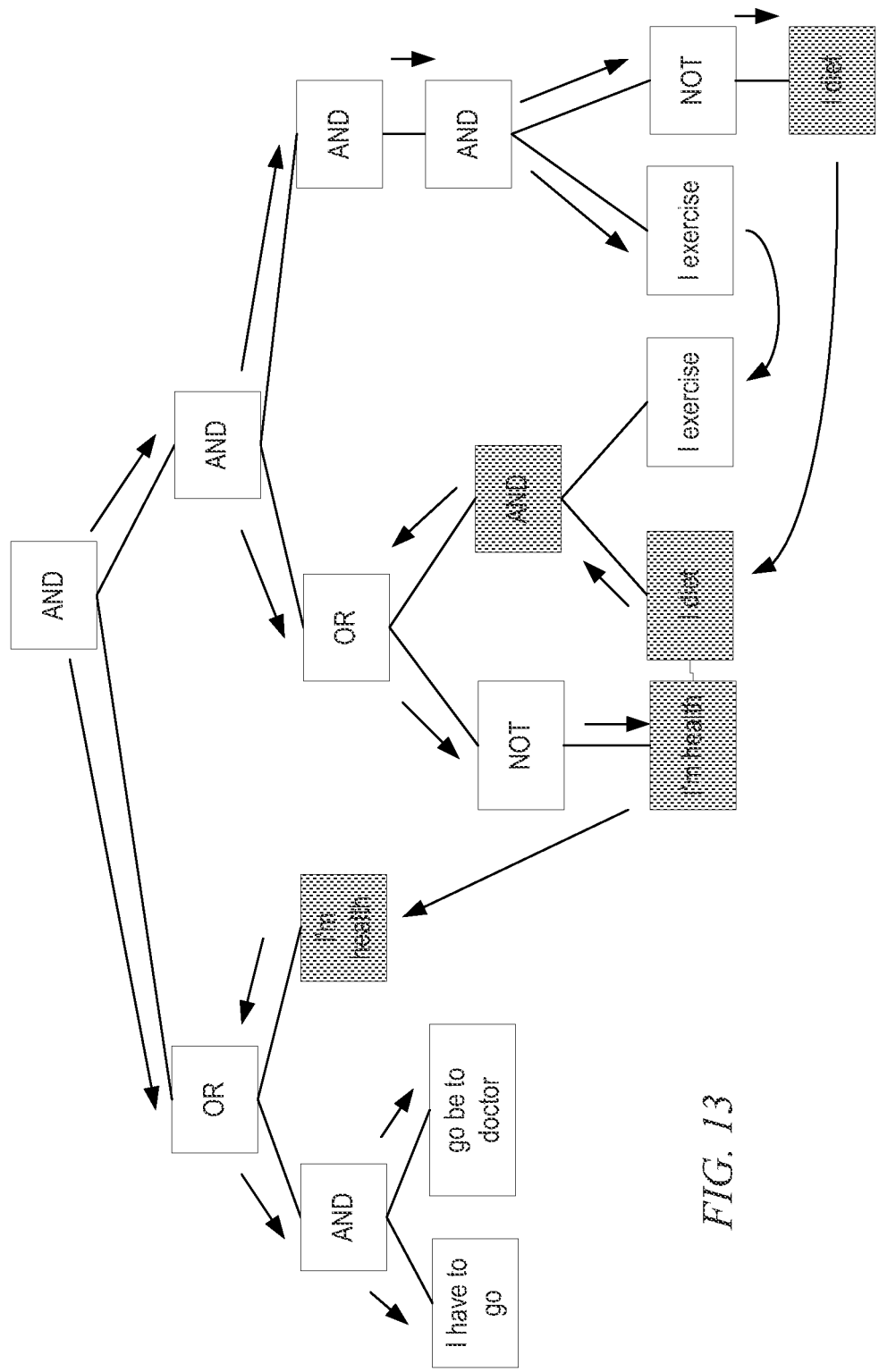
FIG. 13 illustrates the results of the application of an extensible framework and transaction-based representation to a previous example natural language content in accordance with one illustrative embodiment.

To further illustrate the operation of the transaction-based knowledge representation and extensible knowledge reasoning framework of the illustrative embodiments, FIG. 13 illustrates the results of the application of such a framework and representation to the previous example natural language scenario having the statements "If I'm not healthy, I will have to go to the doctor. I'm healthy only if I diet and exercise. I exercise but I don't diet." This is a similar logical parse tree as shown in FIG. 11, however in this depiction the nodes that result in the nodes being "true" are show as white boxes while the nodes that result in the nodes being "false" due to the propagation of supporting evidence fuzzy logic values are shown as shaded boxes. The arrows shown in FIG. 13 represent the propagation direction of the true and false values through application of the propagation rules previously described above. From this propagation the system is able to determine that the particular individual represented by the statements does not diet and thus, is not healthy, and therefore should go to the doctor. Hence the system is able to make the same deduction as a human being through application of the setting of fuzzy logic supporting evidence and relevance rules as well as the application of propagation rules for propagating these fuzzy logic values.

Thus, through the use of a transaction-based knowledge representation and extensible framework, the mechanisms of the illustrative embodiments provide accountability, reversibility, extensibility, and performance improvements in a reasoning system. More particularly, since the changes to the logical parse are stored as individual transactions within a knowledgebase, with each transaction being associated with a particular reasoner, accountability is accomplished in that each transaction maintains a record of knowledge contributed by a particular reasoner. Reversibility is accomplished in that each reasoner can have its contribution to knowledge spreading in the logical parse quickly undone by simply deleting the transaction corresponding to that reasoner, thereby enabling dynamic reasoning with backtracking Extensibility is accomplished in that new reasoners can be easily added to the knowledge reasoning framework due to each reasoner essentially being normalized via the transaction-based knowledge representation. Performance is improved by providing a clear indication of an end of the iterative process through the identification of empty transactions as a terminating state for the iterative process.

VIII. System and Methodology Overview

Having provided a detailed description of the logical parser, knowledge reasoners, and extensible framework and transaction-based knowledge representation, it should be appreciated that these mechanisms may be implemented in any suitable hardware logic, software logic, or combination of hardware and software logic. With regard to software logic, it should be appreciated that this software logic, in order to provide the functionality and perform the operations set forth herein, is executed by one or more instruction and data processing units, such as one or more central processing units, of one or more data processing systems. The software logic may be embodied in computer readable instructions stored in one or more computer readable storage media that is loaded into memory of a data processing system for execution by the one or more processing units of the data processing system. The data processing system(s) may be coupled to other data processing systems by one or more data networks and may work in conjunction with these other data processing systems via the one or more data networks.

Figure 14:
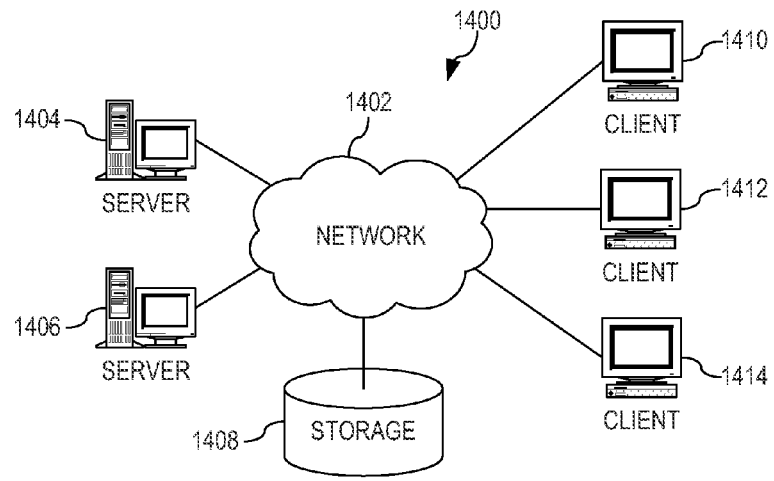
FIG. 14 is an example diagram of a distributed data processing system in which aspects of the illustrative embodiments may be implemented.
Figure 15:
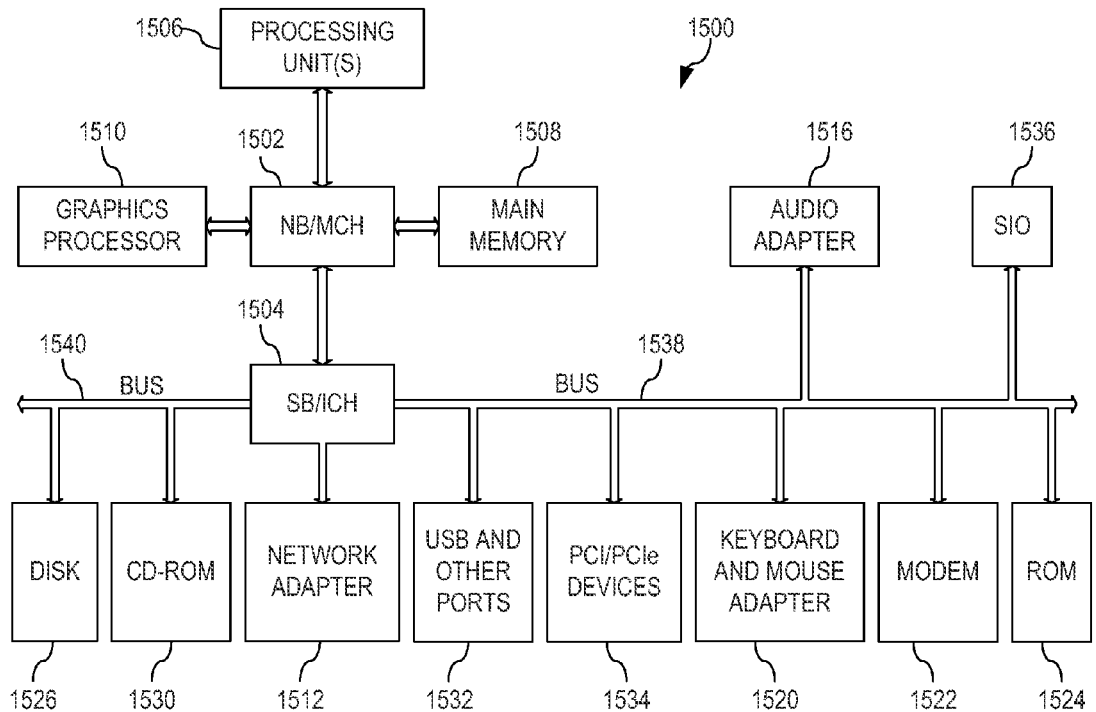
FIG. 15 is an example block diagram of a computing device in which aspects of the illustrative embodiments may be implemented.

In other words, the illustrative embodiments may be utilized in many different types of data processing environments. In order to provide a context for the description of the specific elements and functionality of the illustrative embodiments, FIGS. 14 and 15 are provided hereafter as example environments in which aspects of the illustrative embodiments may be implemented. It should be appreciated that FIGS. 14 and 15 are only examples and are not intended to assert or imply any limitation with regard to the environments in which aspects or embodiments of the present invention may be implemented. Many modifications to the depicted environments may be made without departing from the spirit and scope of the present invention.

FIG. 14 depicts a pictorial representation of an example distributed data processing system in which aspects of the illustrative embodiments may be implemented. Distributed data processing system 1400 may include a network of computers in which aspects of the illustrative embodiments may be implemented. The distributed data processing system 1400 contains at least one network 1402, which is the medium used to provide communication links between various devices and computers connected together within distributed data processing system 1400. The network 1402 may include connections, such as wire, wireless communication links, or fiber optic cables.

In the depicted example, server 1404 and server 1406 are connected to network 1402 along with storage unit 1408. In addition, clients 1410, 1412, and 1414 are also connected to network 1402. These clients 1410, 1412, and 1414 may be, for example, personal computers, network computers, or the like. In the depicted example, server 1404 provides data, such as boot files, operating system images, and applications to the clients 1410, 1412, and 1414. Clients 1410, 1412, and 1414 are clients to server 1404 in the depicted example. Distributed data processing system 1400 may include additional servers, clients, and other devices not shown.

In the depicted example, distributed data processing system 1400 is the Internet with network 1402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 1400 may also be implemented to include a number of different types of networks, such as for example, an intranet, a local area network (LAN), a wide area network (WAN), or the like. As stated above, FIG. 14 is intended as an example, not as an architectural limitation for different embodiments of the present invention, and therefore, the particular elements shown in FIG. 14 should not be considered limiting with regard to the environments in which the illustrative embodiments of the present invention may be implemented.

FIG. 15 is a block diagram of an example data processing system in which aspects of the illustrative embodiments may be implemented. Data processing system 1500 is an example of a computer, such as server 1404 in FIG. 14, in which computer usable code or instructions implementing the processes for illustrative embodiments of the present invention may be located.

In the depicted example, data processing system 1500 employs a hub architecture including north bridge and memory controller hub (NB/MCH) 1502 and south bridge and input/output (I/O) controller hub (SB/ICH) 1504. Processing unit 1506, main memory 1508, and graphics processor 1510 are connected to NB/MCH 1502. Graphics processor 1510 may be connected to NB/MCH 1502 through an accelerated graphics port (AGP).

In the depicted example, local area network (LAN) adapter 1512 connects to SB/ICH 1504. Audio adapter 1516, keyboard and mouse adapter 1520, modem 1522, read only memory (ROM) 1524, hard disk drive (HDD) 1526, CD-ROM drive 1530, universal serial bus (USB) ports and other communication ports 1532, and PCI/PCIe devices 1534 connect to SB/ICH 204 through bus 1538 and bus 1540. PCI/PCIe devices may include, for example, Ethernet adapters, add-in cards, and PC cards for notebook computers. PCI uses a card bus controller, while PCIe does not. ROM 1524 may be, for example, a flash basic input/output system (BIOS).

HDD 1526 and CD-ROM drive 1530 connect to SB/ICH 1504 through bus 1540. HDD 1526 and CD-ROM drive 1530 may use, for example, an integrated drive electronics (IDE) or serial advanced technology attachment (SATA) interface. Super I/O (SIO) device 1536 may be connected to SB/ICH 1504.

An operating system runs on processing unit 1506. The operating system coordinates and provides control of various components within the data processing system 1500 in FIG. 15. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 1500.

As a server, data processing system 1500 may be, for example, an IBM® eServer™ System p® computer system, running the Advanced Interactive Executive (AIX®) operating system or the LINUX® operating system. Data processing system 1500 may be a symmetric multiprocessor (SMP) system including a plurality of processors in processing unit 1506. Alternatively, a single processor system may be employed.

Instructions for the operating system, the object-oriented programming system, and applications or programs are located on storage devices, such as HDD 1526, and may be loaded into main memory 1508 for execution by processing unit 1506. The processes for illustrative embodiments of the present invention may be performed by processing unit 1506 using computer usable program code, which may be located in a memory such as, for example, main memory 1508, ROM 1524, or in one or more peripheral devices 1526 and 1530, for example.

A bus system, such as bus 1538 or bus 1540 as shown in FIG. 15, may be comprised of one or more buses. Of course, the bus system may be implemented using any type of communication fabric or architecture that provides for a transfer of data between different components or devices attached to the fabric or architecture. A communication unit, such as modem 1522 or network adapter 1512 of FIG. 15, may include one or more devices used to transmit and receive data. A memory may be, for example, main memory 1508, ROM 1524, or a cache such as found in NB/MCH 1502 in FIG. 15.

Those of ordinary skill in the art will appreciate that the hardware in FIGS. 14 and 15 may vary depending on the implementation. Other internal hardware or peripheral devices, such as flash memory, equivalent non-volatile memory, or optical disk drives and the like, may be used in addition to or in place of the hardware depicted in FIGS. 14 and 15. Also, the processes of the illustrative embodiments may be applied to a multiprocessor data processing system, other than the SMP system mentioned previously, without departing from the spirit and scope of the present invention.

Moreover, the data processing system 1500 may take the form of any of a number of different data processing systems including client computing devices, server computing devices, a tablet computer, laptop computer, telephone or other communication device, a personal digital assistant (PDA), or the like. In some illustrative examples, data processing system 1500 may be a portable computing device that is configured with flash memory to provide non-volatile memory for storing operating system files and/or user-generated data, for example. Essentially, data processing system 1500 may be any known or later developed data processing system without architectural limitation.

With reference again to FIG. 14, in accordance with the illustrative embodiments, one or more of the data processing or computing systems shown in FIG. 14 may implement a natural language processing system that implements the logical parser, knowledge reasoners, and/or extensible knowledge reasoning framework and transaction-based knowledge representation previously described above. In one illustrative embodiment, the mechanisms of the illustrative embodiments are implemented with a Question and Answer (QA) system that utilizes natural language processing of a corpus and/or input questions to facilitate the answer of such input questions based on evidential support in the corpus for various hypotheses generated and applied to the corpus based on the input question. Such a QA system implements a QA system pipeline which comprises a plurality of stages for processing an input question, a corpus of data, and generating answers for the input question based on the processing of the corpus of data. The QA system pipeline will be described in greater detail hereafter with regard to FIG. 16.

It should be appreciated that the mechanisms of the illustrative embodiments are a general purpose component such that they may be implemented in various elements of a QA system and/or QA system pipeline. Thus, for example, the mechanisms of the illustrative embodiments may be implemented in as a pre-processor of documents in a corpus that a QA system operates upon to generate logical parse trees for the various documents. Moreover, the illustrative embodiments may be implemented in a QA system pipeline when parsing and analyzing the input question or statement to generate queries to be applied against a corpus for candidate answer generation. Moreover, the illustrative embodiments may be utilized as part of candidate answer scoring and supporting evidence evaluation so as to generate a ranked listing of candidate answers.

In some illustrative embodiments, the QA system may be the IBM Watson™ QA system available from International Business Machines Corporation of Armonk, N.Y., which is augmented with the mechanisms of the illustrative embodiments described above. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In particular, with regard to runtime processing of an input question submitted by a user of a client computing device, e.g., client 1410, to a server 1404 or set of servers 1404, 1406, implementing a QA system, the input question may be utilized as a natural language text upon which reasoning is to be performed and a corpus of documents may serve as an external source of information for use in providing supporting evidence measures and relevance measures for performing the reasoning operations. The mechanisms of the illustrative embodiments may operate to parse and analyze the input question using a natural language processing (NLP) mechanism to extract the features of the input question to generate a syntactic/semantic parse and hierarchical model of the input question. The syntactic/semantic parse may then be processed by the logical parser of the illustrative embodiments to generate a logical parse and corresponding logical hierarchical model representing the logical relationships set forth in the input question. Thereafter, the mechanisms of the illustrative embodiments, as part of the reasoning performed by the QA system, may apply one or more knowledge reasoners in accordance with the illustrative embodiments, to spread knowledge throughout the logical parse. This may be done in an iterative fashion using the transaction-based knowledge representation and extensible knowledge reasoning framework described above. The knowledgebase that is generated as a result may be used to perform reasoning operations to extract reasoned conclusions regarding the input question and its corresponding evidential support from the corpus to thereby generate candidate answers for the input question.

Figure 16:
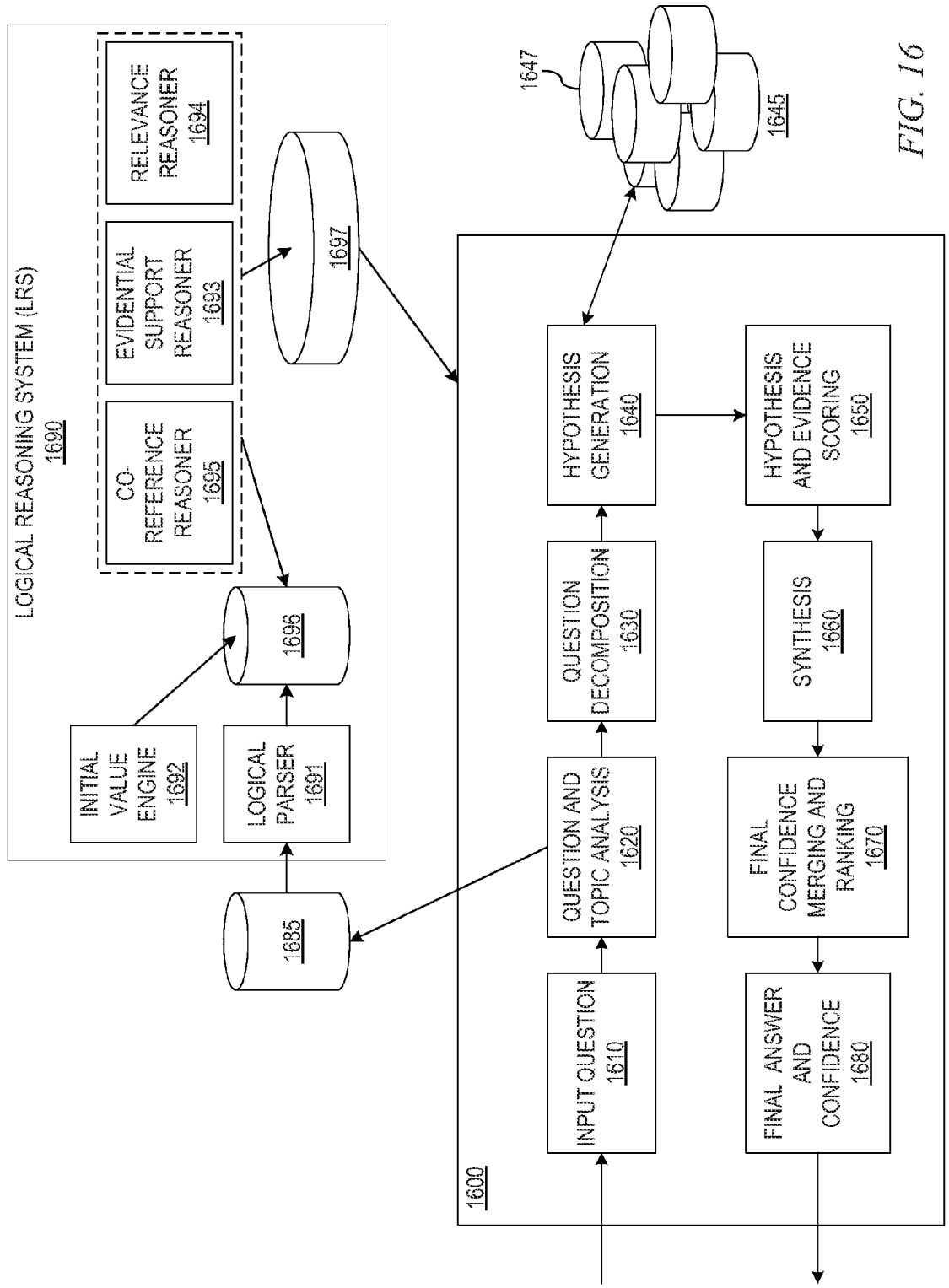
FIG. 16 illustrates a QA system pipeline for processing an input question in accordance with one illustrative embodiment.

FIG. 16 illustrates a QA system pipeline for processing an input question in accordance with one illustrative embodiment. The QA system pipeline of FIG. 16 may be implemented, for example, as QA system pipeline of QA system in FIG. 14. It should be appreciated that the stages of the QA system pipeline shown in FIG. 16 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 16 may be augmented, for example, in one or more of the stages to implement the improved mechanism of the illustrative embodiments described hereafter, additional stages may be provided to implement the improved mechanism, or separate logic from the pipeline 1600 may be provided for interfacing with the pipeline 1600 and implementing the improved functionality and operations of the illustrative embodiments As shown in FIG. 16, the QA system pipeline 1600 comprises a plurality of stages 1610-1680 through which the QA system operates to analyze an input question and generate a final response. In an initial question input stage 1610, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 1600, i.e. the question and topic analysis stage 1620, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 1630 to decompose the question into one or more queries that may be applied to the corpora of data/information 1645 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 1645. That is, these various sources themselves, different collections of sources, and the like, may represent a different corpus 1647 within the corpora 1645. There may be different corpora 1647 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 1647 within the corpora 1645.

The queries may be applied to one or more databases storing information about the electronic texts, documents, articles, websites, and the like, that make up the corpus of data/information. The queries being applied to the corpus of data/information at the hypothesis generation stage 1640 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 1640, to generate hypotheses for answering the input question. These hypotheses are also referred to herein as "candidate answers" for the input question. For any input question, at this stage 1640, there may be hundreds of hypotheses or candidate answers generated that may need to be evaluated.

The QA system pipeline 1600, in stage 1650, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis.

Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 1660, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 1670 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 1680, a final answer and confidence score, or final set of candidate answers and confidence scores, may be generated and output to the submitter of the original input question.

As shown in FIG. 16, the QA system pipeline 1600 is further augmented to include the logical reasoning system (LRS) 1690 of the illustrative embodiments. The LRS 1690 implements an extensible knowledge reasoning framework and transaction-based knowledge representation. The LRS 1690 includes a logical parser 1691, initial supporting evidence and relevance measure engine (initial value engine) 1692, and one or more knowledge reasoners 1693-1695. The LRS 1690 receives the results 1685 of an initial natural language parse of the input question 1610 from the stage 1620. The NLP parse 1685 is processed by the logical parser 1691 to generate a logical parse 1696. The initial supporting evidence and relevance measure engine 1692 generates an initial set of supporting evidence values and relevance values for nodes in the logical parse 1696 using the corpus or corpora, a subset of the corpus/corpora, or the like, by comparing textual terms, annotations, and the like. Thereafter, knowledge reasoners 1693-1695 are applied to the logical parse 1696 in an iterative manner to spread knowledge throughout the logical parse 1696.

In particular a first knowledge reasoner 1693 operates to spread supporting evidence knowledge throughout a logical parse 1696 generated by the logical parser 1691. A second knowledge reasoner 1694 operates to spread relevance knowledge throughout a logical parse 1696 generated by the logical parser 1691. A third knowledge reasoner 1695 operates to spread supporting evidence and relevance knowledge amongst co-references in the logical parse.

As mentioned above, the application of the knowledge reasoners 1693-1695 to the logical parse 1696 is performed in an iterative manner using a transaction-based approach where each iteration of each knowledge reasoner generates a single transaction specifying the nodes affected by the operation of the knowledge reasoner. The transactions are stored in a knowledgebase 1697 associated with the logical parse 1696. This information may be accessed by the QA system pipeline 1600 and utilized during evidence scoring, candidate answer generation, final merge, or any other stage to evaluate the candidate answers.

It should be noted that the mechanisms of the illustrative embodiments are not limited to use with QA systems. To the contrary, any natural language processing (NLP) system may be augmented to include the mechanisms of the illustrative embodiments to generate logical parse trees, set supporting evidence fuzzy logic values and relevance fuzzy logic values, and propagate those fuzzy logic values to facilitate deduction and reasoning operations. For example, in one illustrative embodiment, there may be a database of thousands of clinical trial documents that outline inclusion and exclusion criteria for enrolling patients into the clinical trial studies. The logical reasoning system (LRS) of the illustrative embodiments may be used to parse each inclusion/exclusion criteria into logical parse trees. The logical parse trees may then be populated with knowledge from external resources (e.g., the patient's medical record) to determine if each criteria is met or not met by that particular patient's information. In this way, the LRS of the illustrative embodiments are used to compare the patient data to clinical trial criteria to determine met/not met status for each criteria and may be used to present an output to a user indicative of whether the patient is suitable for a particular clinical trial, present a listing of patients that are suitable and that are not suitable for the clinical trial, or the like. While not necessary to the mechanisms of the illustrative embodiments, this functionality may be implemented in a QA system pipeline at the scoring stage of the pipeline, for example.

As mentioned above, the LRS comprises mechanisms for performing logical parsing of natural language content, setting and propagating fuzzy logic values representing supporting evidence and relevance of nodes of a logical parse, and mechanisms for supporting an extensible knowledge reasoning framework and transaction-based knowledge representation. Each of these have been detailed above. However, in summary, and to outline these operations again, the flowcharts in FIGS. 17-22 are hereafter provided.

Figure 17:
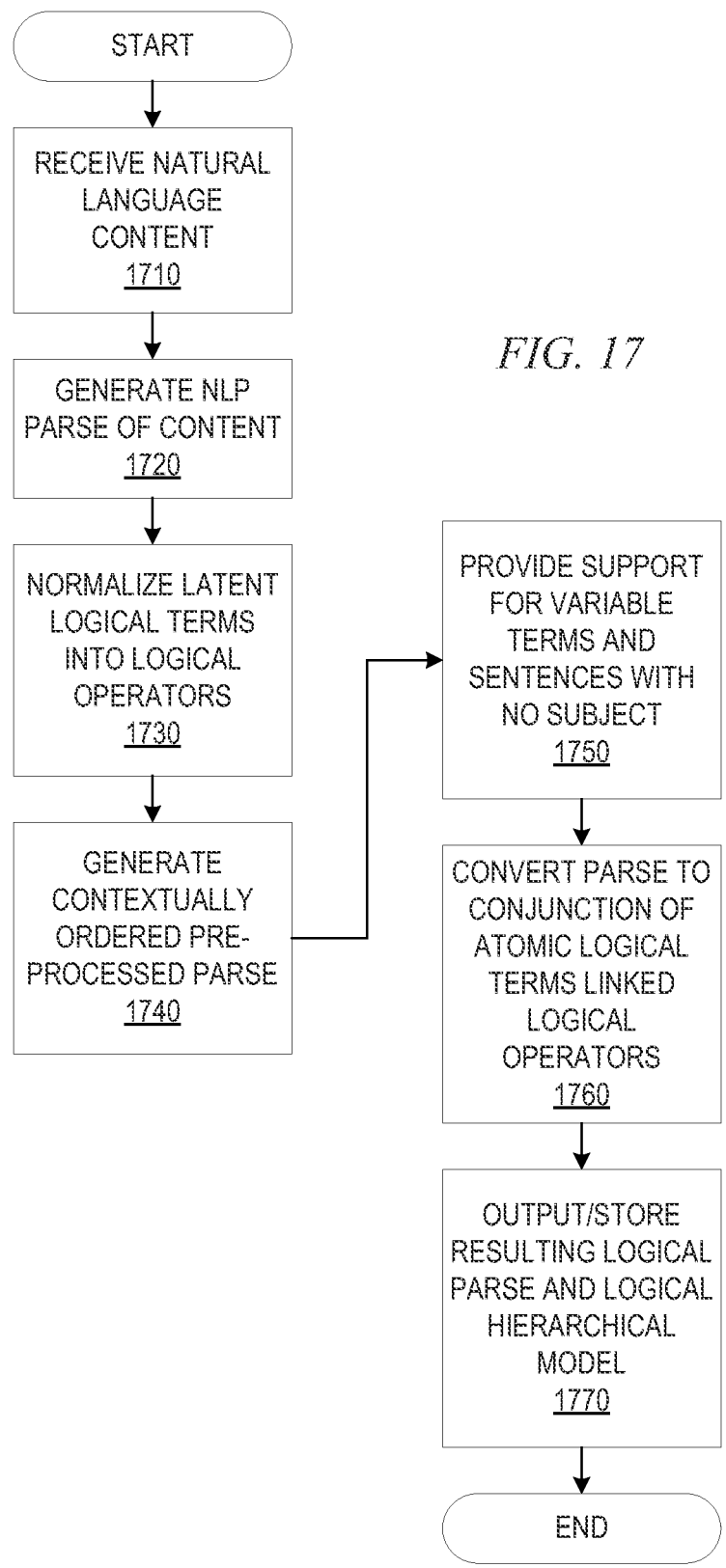
FIG. 17 is a flowchart outlining an example operation of a logical reasoning system with regard to the generation of a logical parse of natural language content in accordance with one illustrative embodiment.

FIG. 17 is a flowchart outlining an example operation of a logical reasoning system with regard to the generation of a logical parse of natural language content in accordance with one illustrative embodiment. The operations outlined in FIG. 17 may be performed, for example, by a logical parser, such as logical parser 1691 for example, in conjunction with a natural language processing system.

As shown in FIG. 17, the operation starts by receiving a natural language content upon which a reasoning operation is to be performed (step 1710). The reasoning operation may take many different forms including, but not limited to, performing question answering using a QA system with which the natural language processing system and logical parser operates. In such an embodiment, the natural language content may be an input question that is to be processed by the QA system, for example.

The natural language content is parsed and analyzed by the natural language processing system to generate a syntactic/semantic parse (step 1720). The latent logical operators in the syntactic/semantic parse are made explicit in the syntactic/semantic parse by normalizing these latent logical operators to a pre-defined set of logical operators (e.g., AND, OR, NOT, etc.) to thereby generate a pre-processed syntactic/semantic parse (step 1730). In generating the pre-processed syntactic/semantic parse, various identifications of latent logical operators may be performed based on analysis of the content of the syntactic/semantic parse including negation identifiers, such as "not", phrases similar to "one of the following", more involved logical operators such as "either/or" and "neither/nor", noun relations, modifiers such as "that", "whom", or "which", and the like.

A contextual order of operations for the pre-defined set of natural language logical operators is then introduced to the pre-processed syntactic/semantic parse to thereby generate a contextually ordered pre-processed syntactic/semantic parse (step 1740). This process treats pre-processed logical operators above a verb as in the same scope as pre-processed logical operators below the verb in the syntactic/semantic parse. Upper scopes are parsed before lower scopes. Essentially, this elevates a logical operator to above the top un-parsed node and sets the sub-tree under the logical operator as an argument with a copy of the sub-tree as a second argument (only for AND and OR). For example, the following process is performed recursively to generate the contextually ordered pre-processed syntactic/semantic parse:

1. If there is a NOT in the left modifier of the verb, the NOT is parsed into a logical form first before other logical operators, then any OR logical operators are parsed into a logical form followed by ANDs and AND alternate forms, such as noun relation phrases;
2. If there is no negation (NOT) in the left modifier of the verb, the parse order is Ors, ANDs, NOTs, and then noun relation phrases; and
3. Other logical operators (quantifiers, temporal, etc.) are inserted into the above contextual ordering to support other logics (temporal, predicate, etc.).

Support for variable terms and sentences with no subject is provided by creating a subject placeholder that acts as a wildcard (step 1750). For example, consider the statement "took medicine" from a patient EMR. This statement lacks a subject such that a placeholder subject is created which will become a wild card subject. As a result, this statement would match against "John took medicine" or "he took medicine" or any other varying subject phrase where the remainder of the logical terms matched.

Thereafter, the resulting parse is converted into a conjunction of atomic logical terms linked by at least one logical operator from the normalized pre-defined set of logical operators (step 1760). In general, the atomic logical terms consist of two concepts which are mutually descriptive. The resulting logical parse is then output and/or stored for further processing (step 1770). The operation then terminates.

Figure 18:
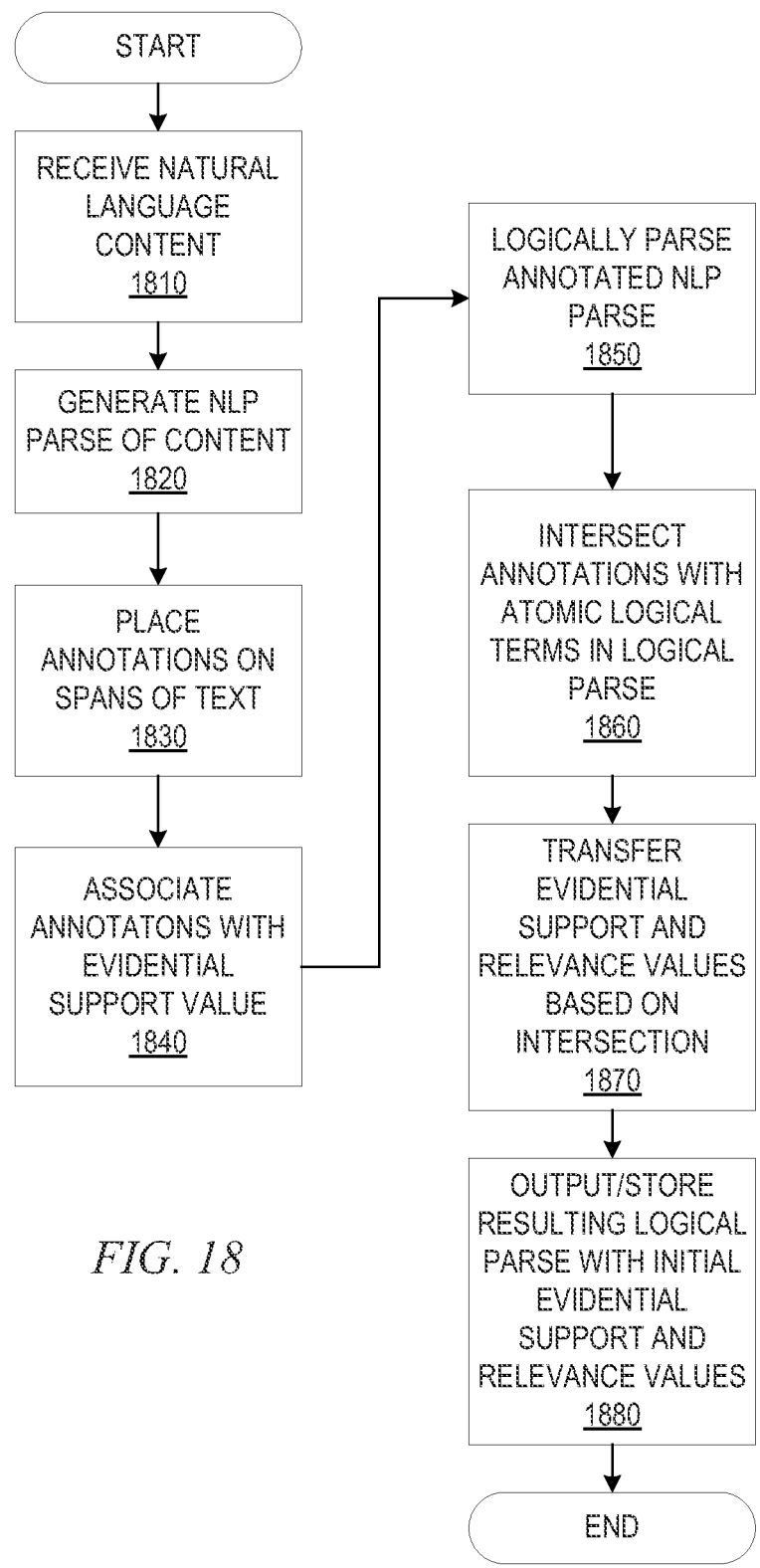
FIG. 18 is a flowchart outlining an example operation for setting initial supporting evidence and relevance values for nodes of a logical parse in accordance with one illustrative embodiment.

FIG. 18 is a flowchart outlining an example operation for setting initial supporting evidence and relevance values for nodes of a logical parse in accordance with one illustrative embodiment. The operation outlined in FIG. 18 may be performed, for example, by the initial supporting evidence and relevance measure engine 1692 in FIG. 16, based on a logical parse generated by the logical parser 1691. It should be appreciated that the operation outlined in FIG. 18 may overlap, and be performed in combination with, the operation outlined in FIG. 17 above.

As shown in FIG. 18, a natural language content upon which a reasoning operation is to be performed is received (step 1810) and a natural language processing of the received natural language content is performed to generate a syntactic/semantic parse (step 1820) in a similar manner to that of steps 1710-1720 of FIG. 17. When the natural language processing is performed to generate the syntactic/semantic parse of the natural language content annotations are placed on spans of text that are determined to be relevant for reasoning (step 1830). Spans of text that are determined to be relevant for reasoning based on a pre-defined set of annotations, keywords, key phrases, etc., as may be specified in an ontology, annotation database, or the like.

Each annotation associated with the natural language content is associated with an evidential support value indicating the degree to which the annotation is or is not met (step 1840). Again, terms being "met" or "not met" refers to how well the concept/semantic meaning of the annotation is satisfied given the knowledge that is currently known in the system. For example, there may be an annotation over the term "Diabetes", and an external resource could inform the system that the patient is known to have Diabetes with an 80% confidence, such that the term in the annotation is mostly met or satisfied. Associating annotations with an evidential support value may be done, for example, by comparing the text of the annotation to text of an external source of information, such as a corpus, to identify matching annotations, matching text and supporting evidence, etc.

The annotated syntactic/semantic parse is then logically parsed to extract the logical operators and atomic logical terms in the manner described above with regard to FIG. 17 (step 1850). The annotations generated by the natural language processing of the natural language content are then intersected with the atomic logical terms based on indices of the text of the annotations (step 1860). As mentioned previously, each atomic logical term in the logical parse maintains the text indices in the original natural language content from which the atomic logical term's text, or token, was derived. Similarly, the annotations have associated indices identifying to which text in the original natural language content they apply. Thus, the indices provide a bridge from the natural language processing annotations to specific atomic logical terms in the logical parse.

Based on the intersection of the annotations with the atomic logical terms of the logical parse, evidential support and relevance values are transferred from the annotations to their corresponding atomic logical terms (step 1870). In transferring relevance values, as previously described above, any nodes of the logical parse that do not intersect an annotation are considered irrelevant to the reasoning operations and thus, are given a relevance value of 0 while, for other nodes of the logical parse that do intersect at least one annotation, an external source of information may be utilized to calculate a fuzzy relevance value, e.g., using an inverse document frequency (IDF) score or other calculated measure of relevance. The resulting logical parse with initial evidential support values and relevance values associated with nodes of the logical parse is then output and/or stored for later use in a reasoning operation (step 1880). The operation then terminates.

Figure 19:
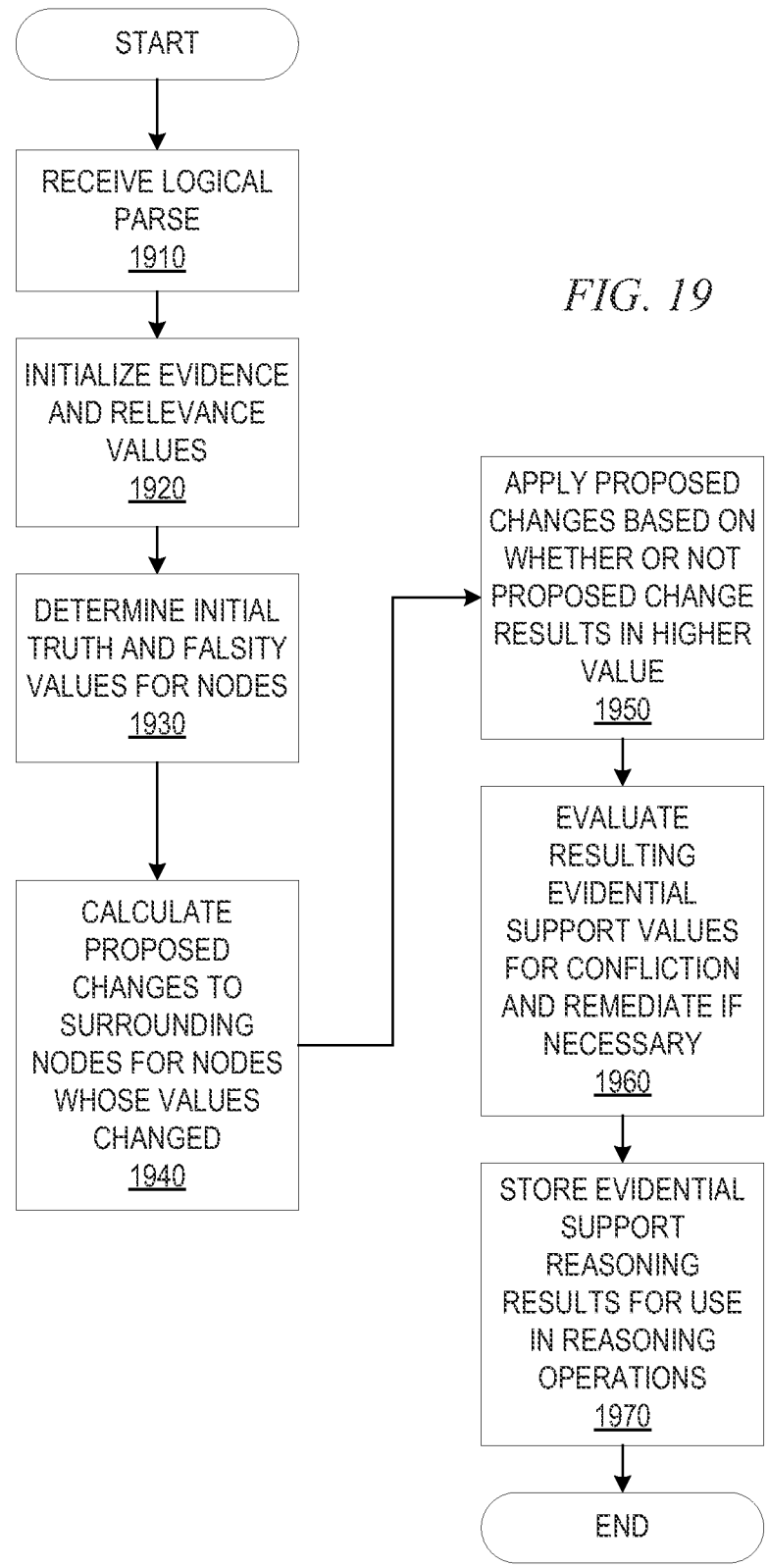
FIG. 19 is a flowchart outlining an example operation of a logical reasoning system with regard to propagation of evidential support values in accordance with one illustrative embodiment.

FIG. 19 is a flowchart outlining an example operation of a logical reasoning system with regard to propagation of evidential support values in accordance with one illustrative embodiment. The operation of FIG. 19 may be performed, for example, using a logical reasoner of the logical reasoning system, such as logical reasoner 1693, for example. The operation outlined in FIG. 19 assumes that a logical parse of natural language content has been generated using the operations outlined in FIG. 17 and/or FIG. 18 above.

As shown in FIG. 19, the operation starts by receiving the logical parse of the natural language content with all conditions being converted to conjunctions, disjunctions, and negations (AND, OR, NOT) (step 1910). All nodes in the logical parse have their truth and falsity values (evidential support fuzzy logic values) initialized, such as by setting them to 0.0 (step 1920). Initial truth and falsity values are set using an external source of information as discussed above with regard to FIG. 18, e.g., by using an external ground truth source of information, a corpus of information, or the like (step 1930).

For evidential support values that changed due to the setting of the initial truth and falsity values, proposed changes to the surrounding nodes are calculated in accordance with propagation rules and the types of logical operators connected to the nodes whose evidential support values changed (step 1940). As described previously, the propagation of the evidential support values may be performed downwards, upwards, and/or sideways for AND and OR logical operators, and downwards and upwards for NOT logical operators (see FIG. 8).

The proposed changes to the surrounding nodes are applied if the proposed value exceeds the existing value of the corresponding node, otherwise the proposed change is not performed (step 1950). It should be appreciated that the operations in steps 1940 and 1950 may be repeated until no further changes to surrounding nodes are calculated.

Resulting evidential support values of the nodes are then evaluated for confliction and appropriate source-remediating actions are performed (step 1960). These evaluations of confliction and source-remediating actions attempt to resolve confliction in the case where two different sources are providing conflicting knowledge, e.g., source A provides the fact "patient does not have diabetes" and source B provides the fact that "patient does have diabetes." In such a case the system needs to resolve this confliction and determine which fact is correct and why. This is done by performing the source remediating actions where it is determined which source is the least credible in this confliction. Essentially, trust of the source is modified by reducing or increasing that source's relevance measure. It should be appreciated that the credibility of a source may be initially determined by a subject matter expert or other user. Eventually, through machine learning techniques, this initial credibility evaluation may be automatically adjusted such that the credibility of a source is increasingly more dependent upon evaluations made by the system based on the usage and influence of the source in the operation of the system. For example, credibility measures may be adjusted and determined based on the amount of use a source sees in the knowledge base, the amount of confliction the source generates, the amount of change in the knowledge base that would be required if the source were considered credible, and other factors.

As noted above, confliction may be determined by comparing the truth and falsity values of a node to see if they are both non-zero indicating a confliction. Source remediating actions may comprise the modification of relevance scores of the nodes associated with that source, or the like. The resulting evidential support reasoning results of the logical parse may be stored for later use and analysis to perform reasoning operations on the natural language content (step 1970). The operation then terminates.

Figure 20:
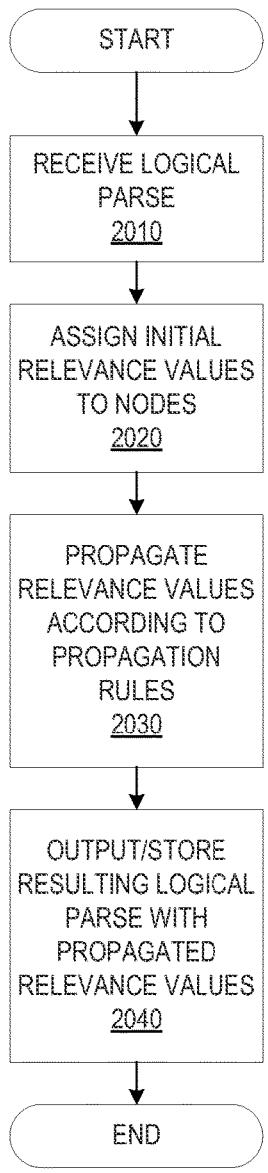
FIG. 20 is a flowchart outlining an example operation of a logical reasoning system with regard to propagation of relevance values in accordance with one illustrative embodiment.

FIG. 20 is a flowchart outlining an example operation of a logical reasoning system with regard to propagation of relevance values in accordance with one illustrative embodiment. The operation of FIG. 20 may be performed, for example, using a logical reasoner of the logical reasoning system, such as logical reasoner 1694, for example. The operation outlined in FIG. 20 assumes that a logical parse of natural language content has been generated using the operations outlined in FIG. 17 and/or FIG. 18 above.

As shown in FIG. 20, the operation starts with the acquisition of a logical parse (step 2010) and the assignment of initial relevance values to nodes of the logical parse (step 2020). These steps may correspond to the steps in FIG. 18 with regard to the generation of a logical parse and assignment of relevance values, such as based on annotation comparisons and/or the like.

The relevance values of nodes are then propagated throughout the logical parse in accordance with established relevance value propagation rules (step 2030). As discussed above, these rules may comprise a first rule that the relevance value of a parent node is set to the maximum relevance of its child nodes and a second rule that the relevance value of a child node must be less than or equal to the relevance value of its parent node. The application of these relevance value propagation rules is performed repeatedly for each node whose relevance value state was changed either through the initial setting of the relevance value or through a previous application of the propagation rules to another node. The resulting processed logical parse with propagated relevance values is then output and/or stored for further use in reasoning operations (step 2040). The operation then terminates.

Figure 21:
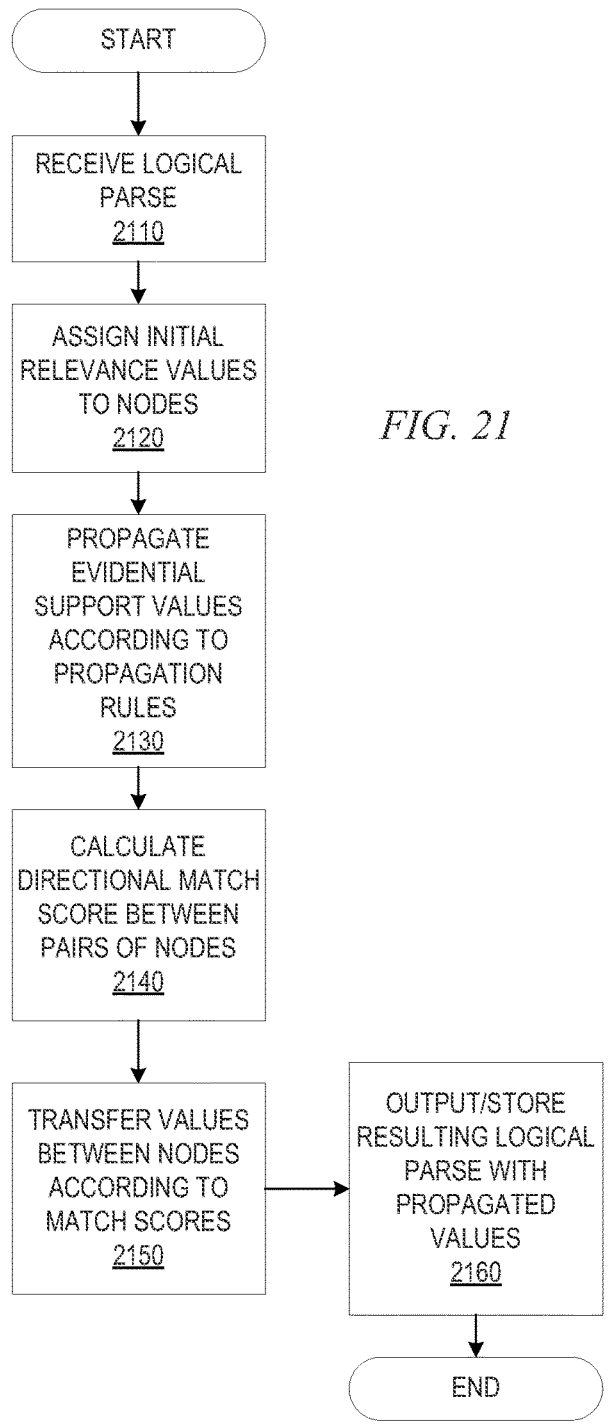
FIG. 21 is a flowchart outlining an example operation of a logical reasoning system with regard to co-reference resolution of knowledge in accordance with one illustrative embodiment.

FIG. 21 is a flowchart outlining an example operation of a logical reasoning system with regard to co-reference resolution of knowledge in accordance with one illustrative embodiment. The operation of FIG. 21 may be performed, for example, using a logical reasoner of the logical reasoning system, such as logical reasoner 1695, for example. The operation outlined in FIG. 21 assumes that a logical parse of natural language content has been generated using the operations outlined in FIG. 17 and/or FIG. 18 above.

As shown in FIG. 21, the operation starts with the obtaining of a logical parse (step 2110) and initial set of evidential support values and relevance values assigned to nodes of the logical parse (step 2120). These evidential support values and relevance values may be propagated throughout the logical parse in accordance with the operations outlined in FIGS. 19 and 20, for example (step 2130). A directional match score is calculated from each source node to each target node for every two nodes in the logical parse (step 2140). As discussed above, the match score may include a matchTrue and matchFalse value calculated based on a similarity of logical terms (for nodes corresponding to atomic logical terms) or application of matching rules for logical operator nodes.

Knowledge is transferred from the source node to the target node according to the match score between the source node and target node (step 2150). As described above, this may involve the application of a function of the evidential support values and relevance values of the source node to generate new corresponding values for the target node. This operation is repeated for each node whose knowledge state changes either initially or in response to a previous application of this operation to a node. The resulting logical parse with propagated evidential support values and relevance values may then be output and/or stored for further use during a reasoning operation (step 2160). The operation then terminates.

Figure 22:
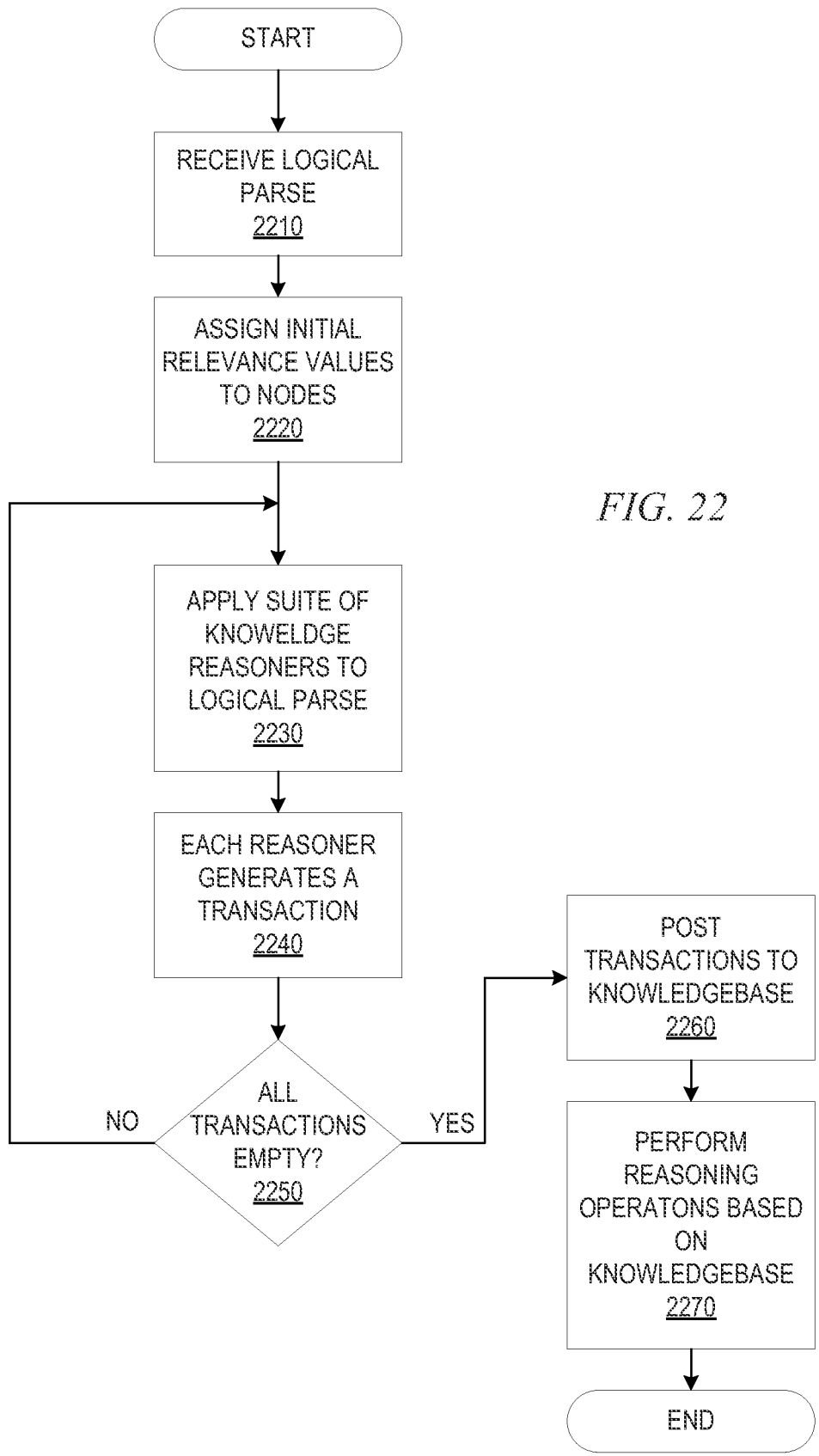
FIG. 22 is a flowchart outlining an example operation for generating a knowledgebase using a logical reasoning system and transaction-based knowledge representation in accordance with one illustrative embodiment.

FIG. 22 is a flowchart outlining an example operation for generating a knowledgebase using a logical reasoning system and transaction-based knowledge representation in accordance with one illustrative embodiment. The operation outlined in FIG. 22 may be implemented, for example, by a logical reasoning system (LRS), such as LRS 1690, that implements a transaction-based knowledge representation and extensible knowledge framework.

As shown in FIG. 22, a logical parse is generated (step 2210) using a logical parser and an initial set of evidential support values and relevance values are assigned to nodes of the logical parse (step 2220). A suite of knowledge reasoners are applied to the logical parse to thereby perform knowledge propagation by propagating knowledge tuples, e.g., evidential support values and relevance values, throughout the logical parse, such as described previously (step 2230). Each reasoner generates a transaction that is compiled into a set of transactions representing the spread of knowledge in the logical parse (step 2240). A determination is made as to whether all of the transactions generated by the reasoners in the suite of reasoners are empty transactions (step 2250). If not, the operation returns to step 2230 where the suite of reasoners are again applied to the now updated logical parse. If all of the transactions generated by the reasoners are empty transactions, then the set of transactions are posted to a knowledgebase (step 2260) which may then be used to perform reasoning operations for reasoning about the natural language content (step 2270). The operation then terminates.

Thus, the illustrative embodiments provide mechanisms for representing the latent logical relationships in natural language content and propagating knowledge throughout a logical parse's hierarchical representation of these latent logical relationships. The mechanisms of the illustrative embodiments facilitate the setting of initial evidential support values and relevance values, such as by way of a knowledge tuple, that are then propagated throughout the logical parse from node to node based on propagation rules associated with the different types of nodes being processed. The mechanisms of the illustrative embodiments further provide for the propagation of such values in accordance with degrees of matching of nodes so as to facilitated co-reference resolution in the logical parse. Moreover, the mechanisms of the illustrative embodiments may utilize a transaction-based representation and extensible knowledge framework that facilitates the utilization of new or different knowledge reasoners and accountability, traceability, and removal of knowledge contributions of the various knowledge reasoners.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one processor and at least one memory, the at least one memory comprising instructions executed by the at least one processor that configure the at least one processor to implement a natural language processing system that performs natural language processing on natural language content at least by processing logical relationships in the natural language content, the method comprising:

generating, by the natural language processing system of the data processing system, a logical parse hierarchical representation of a first parse of a natural language content by identifying latent logical operators within the first parse indicative of logical relationships between elements of the natural language content, wherein the logical parse hierarchical representation comprises nodes and edges linking nodes;

associating, by the natural language processing system, at least one knowledge value with each node in the logical parse hierarchical representation;

propagating, by the natural language processing system, the at least one knowledge value of at least a subset of the nodes in the logical parse hierarchical representation to one or more other nodes in the logical parse hierarchical representation based on propagation rules; and performing, by the natural language processing system, a reasoning operation on the logical parse hierarchical representation to generate a knowledge output indicative of knowledge associated with one or more of the logical relationships between elements of the natural language content.

2. The method of claim 1, wherein the at least one knowledge value associated with each node in the logical parse hierarchical representation comprises one or more supporting evidence measure knowledge values and a relevance knowledge value.

3. The method of claim 2, wherein the one or more supporting evidence measure knowledge values comprises a fuzzy logic truth supporting evidence value indicative of an amount of supporting evidence that an atomic logic term of a corresponding node is true/met, and a fuzzy logic falsity supporting evidence value indicative of an amount of supporting evidence that the atomic logic term is false/not met.

4. The method of claim 3, wherein the relevance knowledge value is a fuzzy logic value indicative of a measure of relevancy of the atomic logic term to reasoning operations operating on the natural language content.

5. The method of claim 3, wherein the fuzzy logic truth supporting evidence value and fuzzy logic falsity supporting evidence value for each node in the hierarchical representation are set according to results of one or more queries applied to a content of an external source to identify evidence in support of, or against, the atomic logical term associated with the node being true/met.

6. The method of claim 3, wherein propagating the at least one knowledge value of at least a subset of the nodes in the logical parse hierarchical representation to one or more other nodes in the logical parse hierarchical representation based on propagation rules comprises, for an OR logical operator node in the hierarchical representation:

propagating downward, in the hierarchical representation, a falsity supporting evidence value of the at least one knowledge value of a parent node to child nodes of the OR logical operator node and not propagating a truth supporting evidence value of the parent node to the child nodes of the OR logical operator;

propagating upward, in the hierarchical representation, a maximum truth supporting evidence value and a minimum falsity supporting evidence value, of the child nodes of the OR logical operator, to the parent node; and propagating sideways, to sibling nodes in the hierarchical representation, a product of a source node's falsity supporting evidence value and the parent node's truth supporting evidence value as a truth supporting evidence value for the sibling node.

7. The method of claim 3, wherein propagating the at least one knowledge value of at least a subset of the nodes in the logical parse hierarchical representation to one or more other nodes in the logical parse hierarchical representation based on propagation rules comprises, for an AND logical operator node in the hierarchical representation:

propagating downward, in the hierarchical representation, a truth supporting evidence value of the at least one knowledge value of a parent node to child nodes of the AND logical operator node and not propagating a falsity supporting evidence value of the parent node to the child nodes of the AND logical operator;

propagating upward, in the hierarchical representation, a minimum truth supporting evidence value and a maximum falsity supporting evidence value, of the child nodes of the AND logical operator, to the parent node; and propagating sideways, to sibling nodes in the hierarchical representation, a product of a source node's truth supporting evidence value and the parent node's falsity supporting evidence value as a falsity supporting evidence value for the sibling node.

8. The method of claim 3, wherein propagating the at least one knowledge value of at least a subset of the nodes in the logical parse hierarchical representation to one or more other nodes in the logical parse hierarchical representation based on propagation rules comprises, for a NOT logical operator node in the hierarchical representation:

propagating downward and upwards, in the hierarchical representation, a truth supporting evidence value and a falsity supporting evidence value of the at least one knowledge value of nodes associated with the NOT logical operator node by swapping the truth supporting evidence value and falsity supporting evidence value of parent nodes with child nodes; and preventing sideways propagation of knowledge values of nodes associated with the NOT logical operator.

9. The method of claim 1, wherein the at least one knowledge value for a subset of the nodes is set at least by:

associating at least one domain specific annotation, from a predetermined set of domain specific annotations, with the subset of the nodes;

performing a search of a corpus of content based on the at least one domain specific annotation and content of subset of the nodes to identify supporting content in the corpus of content;

setting at least one support knowledge value associated with the at least one domain specific annotation based on results of the search of the corpus;

determining whether there is at least one intersection of the at least one domain specific annotation with atomic logical terms of the subset of the nodes;

setting a relevance knowledge value associated with the at least one domain specific annotation based on results of determining whether there is at least one intersection; and transferring the at least one support knowledge value and relevance knowledge value to the subset of the nodes.

10. The method of claim 1, wherein propagating the at least one knowledge value of at least a subset of the nodes in the logical parse hierarchical representation to one or more other nodes in the logical parse hierarchical representation based on propagation rules comprises applying different propagation rules for different logical operator nodes in the logical parse hierarchical representation to propagate the at least one knowledge value upwards, downwards, and sideways in the hierarchical representation.

11. A computer program product comprising a non-transitory computer readable medium having a computer readable program stored therein, wherein the computer readable program, when executed in a data processing system, configures the data processing system to implement a natural language processing system that performs natural language processing on natural language content at least by processing logical relationships in the natural language content, wherein the natural language processing system operates to:

generate a logical parse hierarchical representation of a first parse of a natural language content by identifying latent logical operators within the first parse indicative of logical relationships between elements of the natural language content, wherein the logical parse hierarchical representation comprises nodes and edges linking nodes;

associate at least one knowledge value with each node in the logical parse hierarchical representation;

propagate the at least one knowledge value of at least a subset of the nodes in the logical parse hierarchical representation to one or more other nodes in the logical parse hierarchical representation based on propagation rules; and perform a reasoning operation on the logical parse hierarchical representation to generate a knowledge output indicative of knowledge associated with one or more of the logical relationships between elements of the natural language content.

12. The computer program product of claim 11, wherein the at least one knowledge value associated with each node in the logical parse hierarchical representation comprises one or more supporting evidence measure knowledge values and a relevance knowledge value.

13. The computer program product of claim 12, wherein the one or more supporting evidence measure knowledge values comprises a fuzzy logic truth supporting evidence value indicative of an amount of supporting evidence that an atomic logic term of a corresponding node is true/met, and a fuzzy logic falsity supporting evidence value indicative of an amount of supporting evidence that the atomic logic term is false/not met.

14. The computer program product of claim 13, wherein the fuzzy logic truth supporting evidence value and fuzzy logic falsity supporting evidence value for each node in the hierarchical representation are set according to results of one or more queries applied to a content of an external source to identify evidence in support of, or against, the atomic logical term associated with the node being true/met.

15. The computer program product of claim 13, wherein the relevance knowledge value is a fuzzy logic value indicative of a measure of relevancy of the atomic logic term to reasoning operations operating on the natural language content.

16. The computer program product of claim 13, wherein the computer readable program further causes the computing device to propagate the at least one knowledge value of at least a subset of the nodes in the logical parse hierarchical representation to one or more other nodes in the logical parse hierarchical representation based on propagation rules at least by, for an OR logical operator node in the hierarchical representation:
   propagating downward, in the hierarchical representation, a falsity supporting evidence value of the at least one knowledge value of a parent node to child nodes of the OR logical operator node and not propagating a truth supporting evidence value of the parent node to the child nodes of the OR logical operator;
   propagating upward, in the hierarchical representation, a maximum truth supporting evidence value and a minimum falsity supporting evidence value, of the child nodes of the OR logical operator, to the parent node; and
   propagating sideways, to sibling nodes in the hierarchical representation, a product of a source node's falsity supporting evidence value and the parent node's truth supporting evidence value as a truth supporting evidence value for the sibling node.

17. The computer program product of claim 13, wherein the computer readable program further causes the computing device to propagating the at least one knowledge value of at least a subset of the nodes in the logical parse hierarchical representation to one or more other nodes in the logical parse hierarchical representation based on propagation rules at least by, for an AND logical operator node in the hierarchical representation:
   propagating downward, in the hierarchical representation, a truth supporting evidence value of the at least one knowledge value of a parent node to child nodes of the AND logical operator node and not propagating a falsity supporting evidence value of the parent node to the child nodes of the AND logical operator;
   propagating upward, in the hierarchical representation, a minimum truth supporting evidence value and a maximum falsity supporting evidence value, of the child nodes of the AND logical operator, to the parent node; and
   propagating sideways, to sibling nodes in the hierarchical representation, a product of a source node's truth supporting evidence value and the parent node's falsity supporting evidence value as a falsity supporting evidence value for the sibling node.

18. The computer program product of claim 13, wherein the computer readable program further causes the computing device to propagating the at least one knowledge value of at least a subset of the nodes in the logical parse hierarchical representation to one or more other nodes in the logical parse hierarchical representation based on propagation rules at least by, for a NOT logical operator node in the hierarchical representation:
   propagating downward and upwards, in the hierarchical representation, a truth supporting evidence value and a falsity supporting evidence value of the at least one knowledge value of nodes associated with the NOT logical operator node by swapping the truth supporting evidence value and falsity supporting evidence value of parent nodes with child nodes; and
   preventing sideways propagation of knowledge values of nodes associated with the NOT logical operator.

19. The computer program product of claim 11, wherein the at least one knowledge value for a subset of the nodes is set at least by:
   associating at least one domain specific annotation, from a predetermined set of domain specific annotations, with the subset of the nodes;
   performing a search of a corpus of content based on the at least one domain specific annotation and content of subset of the nodes to identify supporting content in the corpus of content;
   setting at least one support knowledge value associated with the at least one domain specific annotation based on results of the search of the corpus;
   determining whether there is at least one intersection of the at least one domain specific annotation with atomic logical terms of the subset of the nodes;
   setting a relevance knowledge value associated with the at least one domain specific annotation based on results of determining whether there is at least one intersection; and
   transferring the at least one support knowledge value and relevance knowledge value to the subset of the nodes.

20. The computer program product of claim 11, wherein the computer readable program further causes the computing device to propagate the at least one knowledge value of at least a subset of the nodes in the logical parse hierarchical representation to one or more other nodes in the logical parse hierarchical representation based on propagation rules at least by applying different propagation rules for different logical operator nodes in the logical parse hierarchical representation to propagate the at least one knowledge value upwards, downwards, and sideways in the hierarchical representation.

21. An apparatus comprising:
   a processor; and
   a memory coupled to the processor, wherein the memory comprises instructions which, when executed by the processor, cause the processor to:
   generate a logical parse hierarchical representation of a first parse of a natural language content by identifying latent logical operators within the first parse indicative of logical relationships between elements of the natural language content, wherein the logical parse hierarchical representation comprises nodes and edges linking nodes;
   associate at least one knowledge value with each node in the logical parse hierarchical representation;
   propagate the at least one knowledge value of at least a subset of the nodes in the logical parse hierarchical representation to one or more other nodes in the logical parse hierarchical representation based on propagation rules; and
   perform a reasoning operation on the logical parse hierarchical representation to generate a knowledge output indicative of knowledge associated with one or more of the logical relationships between elements of the natural language content.

* * * * *